(12) United States Patent
Asagi et al.

(10) Patent No.: US 11,640,084 B2
(45) Date of Patent: May 2, 2023

(54) LIQUID CRYSTAL DISPLAY DEVICE

(71) Applicant: SHARP KABUSHIKI KAISHA, Sakai (JP)

(72) Inventors: Hiroaki Asagi, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/377,151

(22) Filed: Jul. 15, 2021

(65) Prior Publication Data

US 2022/0035205 A1 Feb. 3, 2022

(30) Foreign Application Priority Data

Jul. 28, 2020 (JP) .............................. JP2020-127443
Apr. 16, 2021 (JP) .............................. JP2021-069866

(51) Int. Cl.
*G02F 1/1337* (2006.01)
*G02F 1/13363* (2006.01)
*G02F 1/1335* (2006.01)

(52) U.S. Cl.
CPC .. *G02F 1/133738* (2021.01); *G02F 1/133553* (2013.01); *G02F 1/133638* (2021.01); *G02F 1/133711* (2013.01)

(58) Field of Classification Search
CPC ......... G02F 1/133738; G02F 1/133638; G02F 1/133553; G02F 1/133711
See application file for complete search history.

(56) References Cited

U.S. PATENT DOCUMENTS

| | | | | |
|---|---|---|---|---|
| 2003/0086044 A1* | 5/2003 | Inoue | ................ | G02F 1/134309 349/141 |
| 2005/0248702 A1* | 11/2005 | Hoshino | ........... | G02F 1/133553 349/113 |
| 2005/0253988 A1 | 11/2005 | Inoue et al. | | |
| 2005/0264730 A1* | 12/2005 | Kataoka | ............ | G02F 1/133555 349/114 |

(Continued)

FOREIGN PATENT DOCUMENTS

| | | |
|---|---|---|
| JP | 2003-177418 A | 6/2003 |
| JP | 2005-173209 A | 6/2005 |

(Continued)

*Primary Examiner* — Ryan Crockett
(74) *Attorney, Agent, or Firm* — ScienBiziP, P.C.

(57) ABSTRACT

Provided is a horizontal electric field mode reflective or transflective liquid crystal display device that achieves an increased reflectance. The liquid crystal display device sequentially includes: a first substrate; a first alignment layer; a liquid crystal layer containing liquid crystal molecules horizontally aligned with no voltage applied; a second alignment layer; and a second substrate including a pixel electrode and a common electrode, the liquid crystal display device further including a reflective layer disposed in at least part of a pixel at a position closer to a back surface than the first alignment layer, the liquid crystal layer, the second alignment layer, the pixel electrode, and the common electrode, at least one alignment layer of the first alignment layer or the second alignment layer having an azimuthal anchoring energy value of less than $1\times10^{-4}$ $J/m^2$.

21 Claims, 35 Drawing Sheets

(56) References Cited

U.S. PATENT DOCUMENTS

| | | | |
|---|---|---|---|
| 2007/0222932 A1* | 9/2007 | Sikharulidze | G02F 1/1391 |
| | | | 349/129 |
| 2008/0225193 A1* | 9/2008 | Katayama | H05K 1/0259 |
| | | | 349/40 |
| 2009/0168002 A1* | 7/2009 | Hirota | G02F 1/133555 |
| | | | 349/126 |
| 2013/0148066 A1* | 6/2013 | Iwata | G02F 1/134363 |
| | | | 349/130 |
| 2015/0268495 A1* | 9/2015 | Kizaki | G02F 1/133784 |
| | | | 349/33 |
| 2020/0249532 A1* | 8/2020 | Murata | G02F 1/1337 |
| 2020/0310201 A1* | 10/2020 | Murata | G02F 1/137 |
| 2022/0035205 A1* | 2/2022 | Asagi | G02F 1/133553 |

FOREIGN PATENT DOCUMENTS

| | | | |
|---|---|---|---|
| JP | 2009-162837 A | | 7/2009 |
| JP | 2009271390 A | * | 11/2009 |
| WO | 2020/230571 A1 | | 11/2020 |

\* cited by examiner (Viewing surface side)

(Back surface side)

Slow axis azimuth of $\lambda/4$ plate

45°

Transmission axis azimuth of linearly polarizing plate 0°
Alignment azimuth of first alignment layer 0°
Alignment azimuth of second alignment layer 0°

(Back surface side)

Scale value is expressed by changing voltage (Back surface side)

Liquid crystal molecules in this region mainly rotate

Liquid crystal molecules in wide region rotate

Liquid crystal molecules in wider region rotate

LIQUID CRYSTAL DISPLAY DEVICE

CROSS-REFERENCE TO RELATED APPLICATIONS

The present application claims priority under 35 U.S.C. § 119 to Japanese Patent Application No. 2020-127443 filed on Jul. 28, 2020 and Japanese Patent Application No. 2021-069866 filed on Apr. 16, 2021, the contents of which are incorporated herein by reference in their entirety.

BACKGROUND OF THE INVENTION

Field of the Invention

The following disclosure relates to liquid crystal display devices.

Description of Related Art

Liquid crystal display devices are display devices utilizing liquid crystal composition to display images. In a typical display mode thereof, light is applied to a liquid crystal layer sealed between a TFT substrate provided with thin film transistors (TFTs) and a counter substrate facing the TFT substrate, voltage is applied to liquid crystal molecules in the liquid crystal layer to change the alignment state of liquid crystal molecules, and thereby the amount of light transmitted is controlled. When the voltage applied to the liquid crystal layer is lower than a threshold voltage (including the case where no voltage is applied), the alignment of liquid crystal molecules in the liquid crystal layer is mainly controlled by the alignment films disposed on the liquid crystal layer side of the TFT substrate and the liquid crystal layer side of the counter substrate.

Liquid crystal display devices are roughly categorized into reflective liquid crystal display devices and transmissive liquid crystal display devices according to the method of transmitting light through a liquid crystal layer. A transmissive liquid crystal display device includes a backlight unit and displays an image by transmitting light emitted from the backlight unit through a liquid crystal layer. The transmissive liquid crystal display device includes a light source in the device and thus can provide good visibility even in a dark environment. A reflective liquid crystal display device includes a reflective layer in at least part of each pixel and displays an image by reflecting light entered from outside with the reflective layer and transmitting the reflected light through a liquid crystal layer. The reflective liquid crystal display device requires no backlight unit and thus can achieve low power consumption, thin profile, and light weight. Additionally, in consideration of the visibility in natural light in addition to the visibility in a room, a transflective liquid crystal display device has been recently proposed as a liquid crystal display device having both advantages of a reflective liquid crystal display device and a transmissive liquid crystal display device.

For example, JP 2005-173209 A, JP 2003-177418 A, JP 2009-162837 A, and WO 2020/230571 disclose techniques of reflective liquid crystal display devices and transflective liquid crystal display devices. JP 2005-173209 A discloses a bistable nematic liquid crystal display device including a liquid crystal cell that includes: a master substrate including a strong anchoring alignment film formed on a first substrate and a slave substrate including a weak anchoring alignment film formed on a second substrate with the alignment films being faced to each other; and a nematic liquid crystal layer between the alignment films, the alignment of liquid crystal molecules in the liquid crystal layer being configured to be one of bistable states in response to driving voltage, the master substrate including a color filter and a reflector.

JP 2003-177418 A discloses a reflective liquid crystal display device including: a pair of substrates faced to each other; a liquid crystal sealed between the paired substrates and containing a polymerizable component that is polymerized by light or heat; a reflective electrode disposed on one of the substrates; and a polymer layer that gives liquid crystal molecules a pre-tilt angle and is formed on the reflective electrode by polymerizing the polymerizable component under application of voltage to the liquid crystal.

JP 2009-162837 A discloses a liquid crystal display device including a plurality of pixels, the plurality of pixels being arranged in matrix and each having a signal electrode and a common electrode, the plurality of pixels each having a transmissive area and a reflective area, wherein each of the plurality of pixels has a first liquid crystal alignment region and a second liquid crystal alignment region each of which has a different liquid crystal alignment direction, wherein the first liquid crystal alignment region and the second liquid crystal alignment region are adjacent to each other within each of the plurality of pixels, wherein each of the plurality of pixels has a boundary region whose liquid crystal alignment direction shifts continuously from the liquid crystal alignment direction of the first liquid crystal alignment region to the liquid crystal alignment direction of the second liquid crystal alignment region between the adjacent first liquid crystal alignment region and second liquid crystal alignment region, and wherein the first liquid crystal alignment region is wider than the transmissive area, and the second liquid crystal alignment region is narrower than the reflective area.

WO 2020/230571 discloses a display device including: a reflective electrode; a counter electrode facing the reflective electrode; a color filter disposed on the counter electrode on a side not facing the reflective electrode; divided pixels each including a retention portion that holds a potential corresponding to an expressed scale value; and an inorganic illuminant disposed at a position closer to the counter electrode than the color filter and configured to emit light.

BRIEF SUMMARY OF THE INVENTION

In a reflective liquid crystal display device or a transflective liquid crystal display device, in which an image is displayed by reflecting light from the viewing surface side with a reflective layer in the device and transmitting the reflected light through a liquid crystal layer, the reflectance of light is controlled by modulating the in-plane retardation (hereinafter, also simply referred to as retardation) of the liquid crystal layer between zero and a ¼ wavelength according to applied voltage.

Liquid crystal display devices are roughly categorized into two groups according to the direction of an electric field applied for changing the alignment of liquid crystal molecules in a liquid crystal layer. A first group includes vertical electric field mode liquid crystal display devices in which an electric field is applied in a thickness direction (or out-of-plane direction) of the display device (liquid crystal layer). The vertical electric field mode includes the twisted nematic (TN) mode and the vertical alignment (VA) mode, for example. A second group includes horizontal electric field mode liquid crystal display devices in which an electric field is applied in a planar direction (or in-plane direction) of the display device (liquid crystal layer). The horizontal electric field mode includes the in-plane switching (IPS) mode and the fringe field switching (FFS) mode, for example.

In a vertical electric field mode liquid crystal display device, a uniform electric field generated between paired substrates sandwiching a liquid crystal layer changes the alignment of liquid crystal molecules. Thus, the liquid crystal molecules with voltage applied are uniformly aligned in a pixel plane. Accordingly, the liquid crystal layer has a uniform retardation Δnd in the plane, and the retardation Δnd of the liquid crystal layer has a large modulation width. Therefore, a vertical electric field mode reflective or transflective liquid crystal display device achieves a sufficient reflectance.

Meanwhile, in a horizontal electric field mode liquid crystal display device, a horizontal electric field (particularly a fringe electric field in the FFS mode) generated between a common electrode and pixel electrodes both disposed on one of paired substrates sandwiching a liquid crystal layer changes the alignment of liquid crystal molecules. The horizontal electric field mode liquid crystal display device is more specifically described with reference to a liquid crystal display device of Comparative Embodiment which is a conventional FFS mode liquid crystal display device. FIG. 49 shows a simulation result obtained by calculating the alignment state of liquid crystal molecules in a liquid crystal display device of Comparative Embodiment. As shown in FIG. 49, a liquid crystal display device 1R of Comparative Embodiment includes a first substrate 100, a liquid crystal layer 300 containing liquid crystal molecules 310, and a second substrate 500 including an insulating substrate 510, a common electrode 540, and pixel electrodes 560.

In the liquid crystal display device 1R of Comparative Embodiment, a fringe electric field generated between the common electrode 540 and the pixel electrodes 560 disposed in the second substrate 500 changes the alignment of the liquid crystal molecules 310. Thus, as shown in regions surrounded by dashed lines in FIG. 49, only the liquid crystal molecules 310 in the vicinity of the electrodes on the second substrate 500 side are mainly driven, and thus the alignment of the liquid crystal molecules 310 with voltage applied has distribution both in the thickness direction and in the in-plane direction. Accordingly, in the liquid crystal display device 1R of Comparative Embodiment which is a horizontal electric field mode liquid crystal display device, the retardation Δnd of the liquid crystal layer 300 has a smaller modulation width than that of a vertical electric field mode liquid crystal display device. Therefore, conventional horizontal electric field mode (e.g., FFS mode) reflective or transflective liquid crystal display devices have a lower reflectance than vertical electric field mode reflective or transflective liquid crystal display devices.

None of JP 2005-173209 A, JP 2003-177418 A, JP 2009-162837 A, and WO 2020/230571 discuss increasing the reflectance of a horizontal electric field mode reflective or transflective liquid crystal display device.

The present invention has been made under the current situation in the art, and aims to provide a horizontal electric field mode reflective or transflective liquid crystal display device that achieves an increased reflectance.

(1) One embodiment of the present invention is directed to a liquid crystal display device sequentially including: a first substrate; a first alignment layer; a liquid crystal layer containing liquid crystal molecules horizontally aligned with no voltage applied; a second alignment layer; and a second substrate including a pixel electrode and a common electrode, the liquid crystal display device further including a reflective layer disposed in at least part of a pixel at a position closer to a back surface than the first alignment layer, the liquid crystal layer, the second alignment layer, the pixel electrode, and the common electrode, at least one alignment layer of the first alignment layer or the second alignment layer having an azimuthal anchoring energy value of less than $1 \times 10^{-4}$ J/m$^2$.

(2) In an embodiment of the present invention, the liquid crystal display device includes the structure (1), the first alignment layer has an azimuthal anchoring energy value of less than $1 \times 10^{-4}$ J/m$^2$, and the second alignment layer has an azimuthal anchoring energy value of $1 \times 10^{-4}$ J/m$^2$ or more.

(3) In an embodiment of the present invention, the liquid crystal display device includes the structure (2), and the first alignment layer has an azimuthal anchoring energy value of less than $1 \times 10^{-5}$ J/m$^2$.

(4) In an embodiment of the present invention, the liquid crystal display device includes the structure (2) or (3), the pixel has a reflection region with the reflective layer and a transmission region without the reflective layer, and the liquid crystal layer has a retardation of 220 nm or greater and 320 nm or smaller in the transmission region.

(5) In an embodiment of the present invention, the liquid crystal display device includes the structure (2), (3), or (4), the device further includes a λ/4 plate, an alignment azimuth of the first alignment layer is parallel to an alignment azimuth of the second alignment layer, and the liquid crystal layer has a retardation of 80 nm or greater and 180 nm or smaller in a region superimposed with the reflective layer.

(6) In an embodiment of the present invention, the liquid crystal display device includes the structure (1), the second alignment layer has an azimuthal anchoring energy value of less than $1 \times 10^{-4}$ J/m$^2$, and the first alignment layer has an azimuthal anchoring energy value of $1 \times 10^{-4}$ J/m$^2$ or more.

(7) In an embodiment of the present invention, the liquid crystal display device includes the structure (6), and the second alignment layer has an azimuthal anchoring energy value of less than $1 \times 10^{-5}$ J/m$^2$.

(8) In an embodiment of the present invention, the liquid crystal display device includes the structure (6) or (7), the device further includes a λ/4 plate, an alignment azimuth of the first alignment layer is parallel to an alignment azimuth of the second alignment layer, and the liquid crystal layer has a retardation of 130 nm or greater and 230 nm or smaller in a region superimposed with the reflective layer.

(9) In an embodiment of the present invention, the liquid crystal display device includes the structure (1), (2), (3), (4), (5), (6), (7), or (8), an alignment azimuth of the first alignment layer is parallel to an alignment azimuth of the second alignment layer, and the liquid crystal layer has a retardation of 130 nm or greater and 145 nm or smaller in a region superimposed with the reflective layer.

(10) In an embodiment of the present invention, the liquid crystal display device includes the structure (1), (2), (3), (4), (6), or (7), an alignment azimuth of the first alignment layer is non-parallel to an alignment azimuth of the second alignment layer, and the liquid crystal layer has a retardation of 240 nm or greater and 260 nm or smaller in a region superimposed with the reflective layer.

(11) In an embodiment of the present invention, the liquid crystal display device includes the structure (1), (2), (3), (4), (5), (6), (7), (8), (9), or (10), and the second substrate further includes a color filter.

(12) In an embodiment of the present invention, the liquid crystal display device includes the structure (11), at least one of the first alignment layer or the second alignment layer contains a polymer containing at least one first photo-functional group selected from the group consisting of cyclobutane, azobenzene, chalcone, cinnamate, coumarin, stilbene, phenol ester, and phenyl benzoate groups and at least one second photo-functional group selected from the group consisting of acrylate, methacrylate, cinnamoyl, coumarin, vinyl, allyl, styryl, and maleimide groups, and the liquid crystal layer contains an additive containing at least one group selected from the group consisting of acrylate, methacrylate, cinnamoyl, coumarin, vinyl, allyl, styryl, and maleimide groups.

(13) In an embodiment of the present invention, the liquid crystal display device includes the structure (1), (2), (3), (4), (5), (6), (7), (8), (9), (10), (11), or (12), and further includes a $\lambda/2$ plate.

(14) In an embodiment of the present invention, the liquid crystal display device includes the structure (1), (2), (3), (4), (5), (6), (7), (8), (9), (10), (11), (12), or (13), and further includes a $\lambda/4$ plate.

(15) In an embodiment of the present invention, the liquid crystal display device includes the structure (1), (2), (3), (4), (5), (6), (7), (8), (9), (10), (11), (12), (13), or (14), and the pixel includes multiple sub-pixels.

(16) In an embodiment of the present invention, the liquid crystal display device includes the structure (1), (2), (3), (4), (5), (6), (7), (8), (9), (10), (11), (12), (13), (14), or (15), and the pixel includes a memory circuit.

The present invention can provide a horizontal electric field mode reflective or transflective liquid crystal display device that achieves an increased reflectance.

DETAILED DESCRIPTION OF THE INVENTION

Hereinafter, embodiments of the present invention are described. The embodiments, however, are not intended to limit the scope of the present invention. The designs in the embodiments may appropriately be modified within the spirit of the present invention. The configurations described in the embodiments may appropriately be combined with each other or may be modified within the spirit of the present invention.

Embodiment 1

Figure 1:
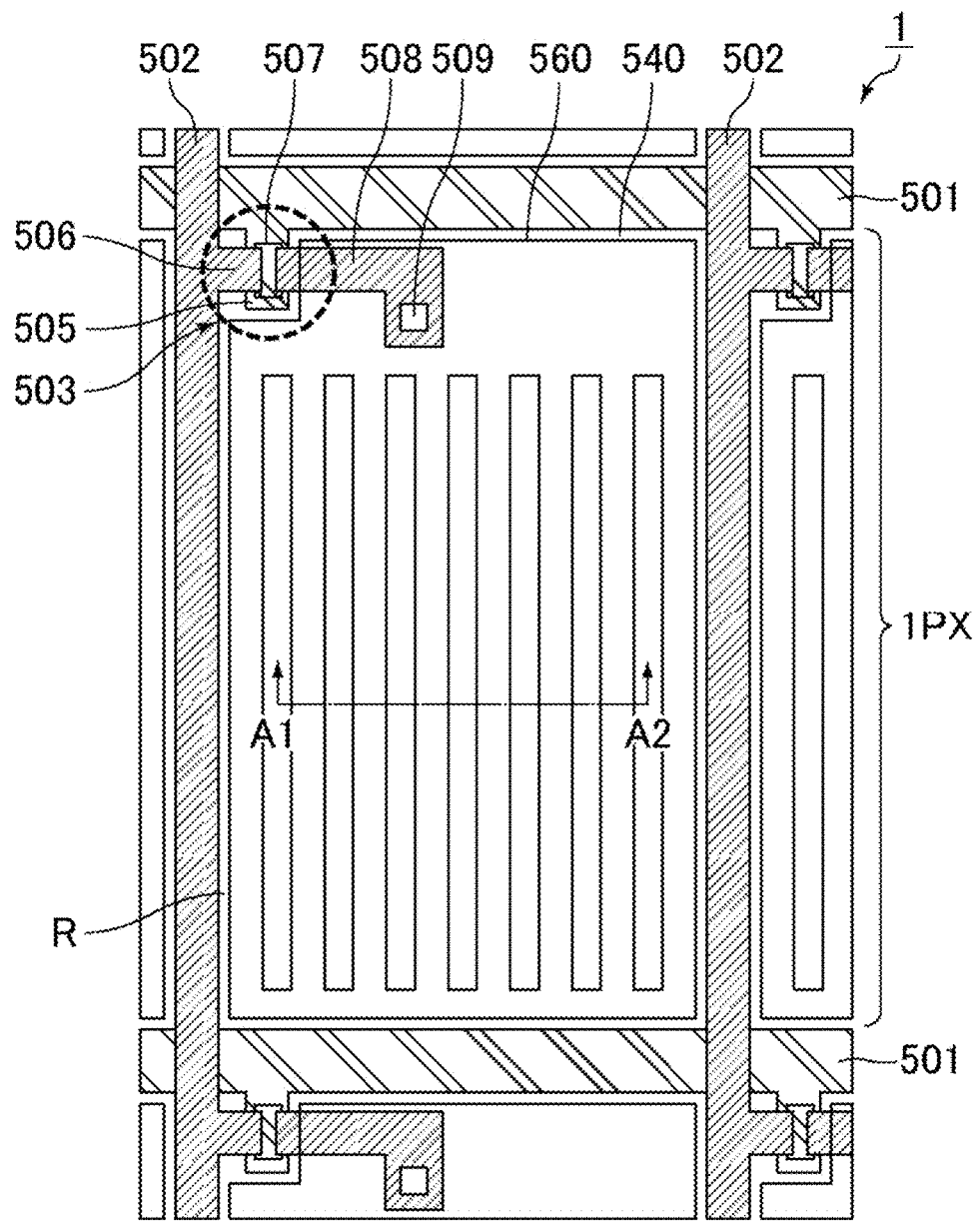
FIG. 1 is a schematic plan view of a liquid crystal display device of Embodiment 1.
Figure 2:
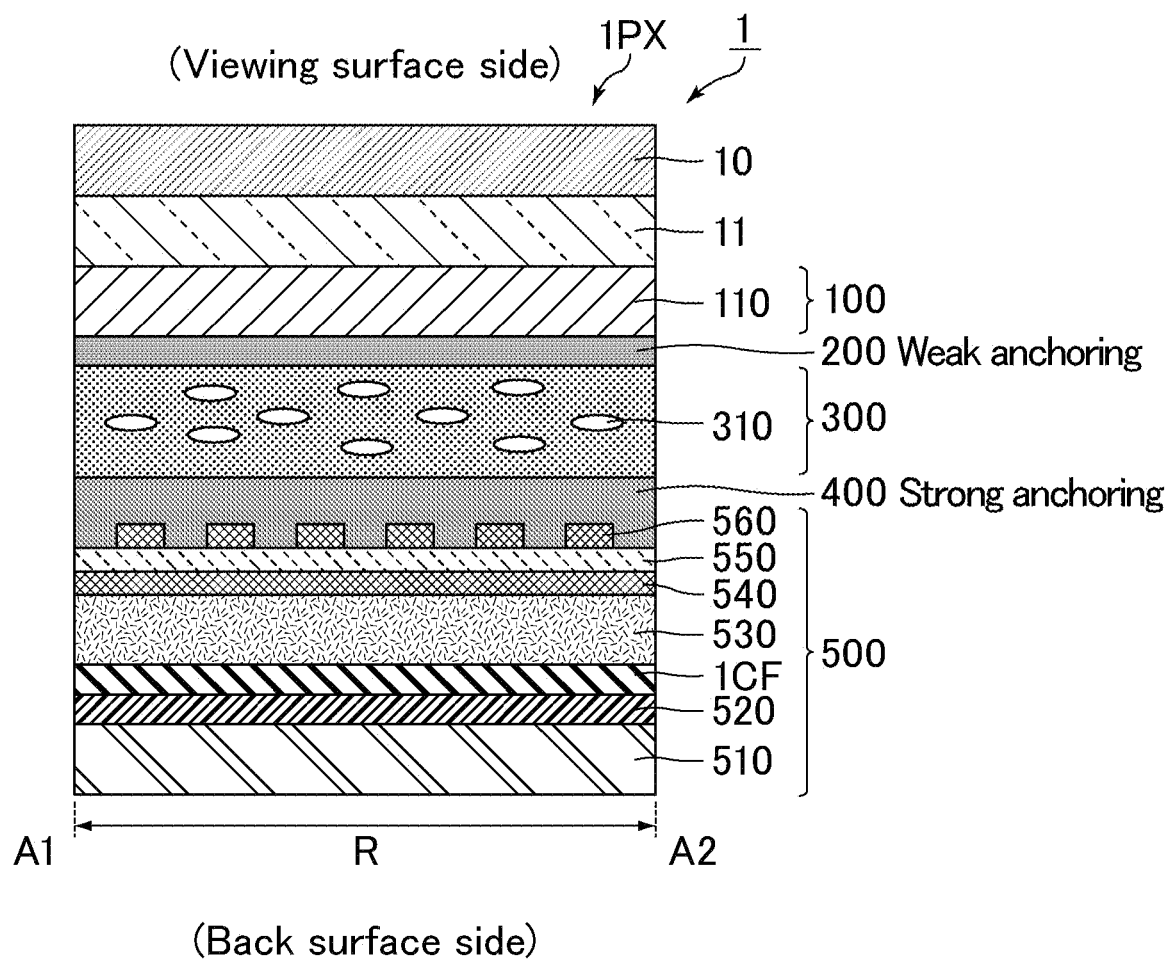
FIG. 2 is a schematic cross-sectional view taken along the line A1-A2 in FIG. 1.
Figure 3:
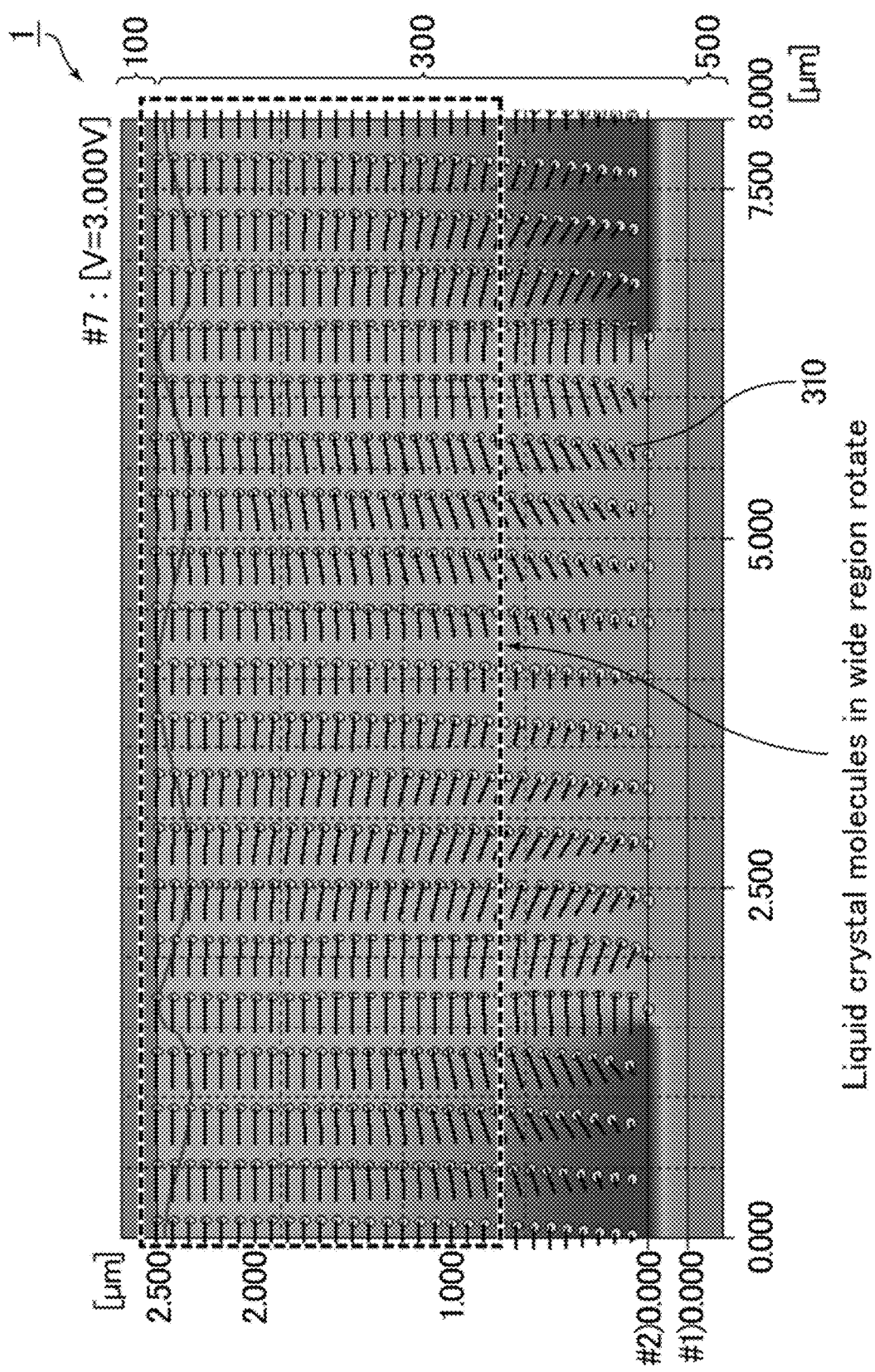
FIG. 3 shows a simulation result obtained by calculating the alignment state of liquid crystal molecules in the liquid crystal display device of Embodiment 1.

FIG. 1 is a schematic plan view of a liquid crystal display device of Embodiment 1. FIG. 2 is a schematic cross-sectional view taken along the line A1-A2 in FIG. 1. FIG. 3 shows a simulation result obtained by calculating the alignment state of liquid crystal molecules in the liquid crystal display device of Embodiment 1. As shown in FIG. 1, a liquid crystal display device 1 of the present embodiment includes on a second substrate parallel gate lines 501 and parallel source lines 502 intersecting the gate lines 501 with an insulating film in between. The gate lines 501 and the source lines 502 define each pixel 1PX and form a grid pattern as a whole. At each of the intersections of the gate lines 501 and the source lines 502 is disposed a thin film transistor (TFT) 503. A pixel electrode 560 is disposed in each region surrounded by two adjacent gate lines 501 and two adjacent source lines 502.

Each TFT 503 includes a gate electrode 505 extended from a gate line 501, a source electrode 506 extended from a source line 502, a semiconductor layer 507, and a drain electrode 508 disposed on the semiconductor layer 507 and facing the source electrode 506. The drain electrode 508 is electrically connected to the pixel electrode 560 via a contact hole 509 provided in an insulating film 550, a common electrode 540, a flattening film 530, and a color filter layer 1CF. No reflective layer 520 is disposed in a part connecting the drain electrode 508 to the pixel electrode 560.

As shown in FIG. 2 and FIG. 3, the liquid crystal display device 1 of the present embodiment includes a linearly polarizing plate 10, a $\lambda/2$ plate 11, a first substrate 100, a first alignment layer 200, a liquid crystal layer 300 containing liquid crystal molecules 310 horizontally aligned with no voltage applied, a second alignment layer 400, and a second substrate 500 in the stated order from the viewing surface side to the back surface side. The second substrate 500 is a TFT substrate including the TFTs 503, and the first substrate 100 is a counter substrate facing the second substrate 500.

The first alignment layer 200 has an azimuthal anchoring energy value of less than $1 \times 10^{-4}$ J/m², and the second alignment layer 400 has an azimuthal anchoring energy value of $1 \times 10^{-4}$ J/m² or more. Hereinafter, an alignment layer having an azimuthal anchoring energy value of less than $1 \times 10^{-4}$ J/m² is also referred to as a weak anchoring alignment layer, and an alignment layer having an azimuthal anchoring energy value of $1 \times 10^{-4}$ J/m² or more is also referred to as a strong anchoring alignment layer.

The second substrate 500 includes the insulating substrate 510, the reflective layer 520 disposed on the entire surface of the pixels 1PX, the color filter layer 1CF, the flattening film 530, the common electrode 540, the insulating film 550, and the pixel electrodes 560 provided with slits in the stated order from the back surface side to the viewing surface side. In a reflection region R provided with the reflective layer 520 in the liquid crystal display device 1, an image is displayed by reflecting light emitted from the viewing surface side with the reflective layer 520 and transmitting the reflected light through the liquid crystal layer 300. In other words, the liquid crystal display device 1 of the present embodiment is a horizontal electric field mode (specifically, FFS mode) reflective liquid crystal display device.

In a no-voltage applied state where no voltage is applied between the common electrode 540 and the pixel electrodes 560 in the liquid crystal display device 1 of the present embodiment which is an FFS mode reflective liquid crystal display device, linearly polarized light transmitted through the linearly polarizing plate 10 from the viewing surface side to the back surface side passes through the λ/2 plate 11 and the horizontally aligned liquid crystal layer 300 to be converted into circularly polarized light, and then the light reaches the reflective layer 520. The light having reached the reflective layer 520 is converted into opposite circularly polarized light by the reflective layer 520 and passes through the liquid crystal layer 300 and the λ/2 plate 11 in the order reverse to that at the light incidence to be converted into linearly polarized light that is perpendicular to the linearly polarized light at the light incidence, whereby a dark state is provided.

Meanwhile, in a voltage applied state where voltage is applied between the common electrode 540 and the pixel electrodes 560, the alignment state of the liquid crystal molecules 310 in the liquid crystal layer 300 changes, and thus the in-plane retardation of the liquid crystal layer 300 changes. Linearly polarized light transmitted through the linearly polarizing plate 10 passes through the λ/2 plate 11 and the liquid crystal layer 300 to be converted, ideally, into linearly polarized light, and then the light reaches the reflective layer 520. The light having reached the reflective layer 520 is reflected by the reflective layer 520 and passes through the liquid crystal layer 300 and the λ/2 plate 11 in the order reverse to that at the light incidence to be converted into linearly polarized light that is parallel to the linearly polarized light at the light incidence, whereby a bright state is provided.

Meanwhile, in a conventional FFS mode reflective liquid crystal display device, the retardation Δnd of the liquid crystal layer is insufficient in a voltage applied state. Thus, light having reached the reflective layer through the retardation layer and the liquid crystal layer is not ideal linearly polarized light but is rather close to elliptically polarized light. Accordingly, light reflected by the reflective layer is also close to elliptically polarized light, failing in providing a sufficient reflectance.

Figure 49:
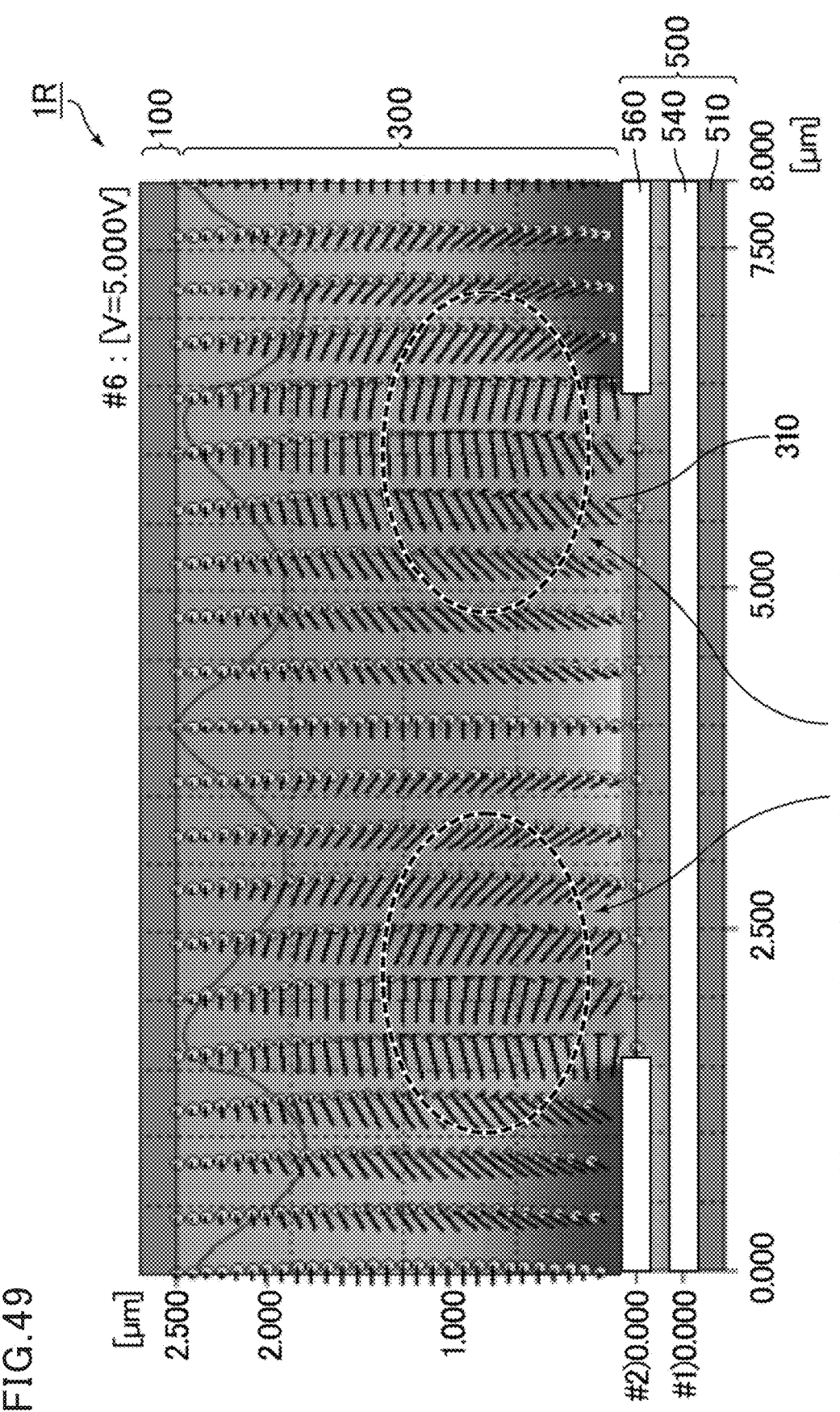
FIG. 49 shows a simulation result obtained by calculating the alignment state of liquid crystal molecules in the liquid crystal display device of Comparative Embodiment.

The relation between the anchoring force of an alignment layer and the reflectance is described with reference to the liquid crystal display device 1R of Comparative Embodiment. The liquid crystal display device 1R of Comparative Embodiment includes a strong anchoring alignment layer between the first substrate 100 and the liquid crystal layer 300 and between the second substrate 500 and the liquid crystal layer 300. The liquid crystal display device 1R of Comparative Embodiment includes the liquid crystal molecules 310 whose maximum displacement regions are located at a position closer to the second substrate 500 (the substrate provided with the common electrode 540 and the pixel electrode 560) than the center in the thickness of the liquid crystal layer 300, as shown in the regions surrounded by dashed lines in FIG. 49. Thus, the liquid crystal molecules 310 closer to the first substrate 100 are less likely to move in comparison to those closer to the second substrate 500. As a result, the retardation Δnd of the liquid crystal layer 300 fails to have a sufficient modulation width in the plane, having difficulty in providing a high reflectance.

In contrast, the liquid crystal display device 1 of the present embodiment includes the first alignment layer 200 that is a weak anchoring alignment layer. This embodiment allows easier movement of the liquid crystal molecules 310 on the first substrate 100 side in addition to those on the second substrate 500 side provided with the common electrode 540 and the pixel electrodes 560, widening the area where the liquid crystal molecules 310 are movable. Thus, as shown in the region surrounded by a dashed line in FIG. 3, the liquid crystal molecules 310 can rotate in a wider region than in the liquid crystal display device 1R of Comparative Embodiment, and the modulation width of the retardation Δnd of the liquid crystal layer 300 can be relatively uniformly increased in the plane, whereby a high reflectance can be achieved. In addition, the optimum cell thickness that provides a maximum reflectance can be reduced. This is also advantageous in terms of response time.

As described, the present embodiment can enhance the reflectance by increasing the modulation width of the Δnd of the liquid crystal layer 300 and allowing light reaching the reflective layer 520 to be close to linearly polarized light. According to a known phenomenon disclosed in JP H11-142836 A, when light is linearly polarized light with a certain azimuth on the reflective layer 520, a bright state is provided, while when light is right-handed or left-handed circularly polarized light on the reflective layer 520, a dark state is provided.

Also, the liquid crystal display device 1 of the present embodiment, which is a horizontal electric field mode liquid crystal display device, can have an in-cell touch panel function that is difficult to be installed in a vertical electric field mode liquid crystal display device. In a liquid crystal display device including an in-cell touch panel, electrodes disposed on the pixels of a display panel are also used as touch panel (hereinafter, also abbreviated as TP) electrodes. For example, a common electrode for applying a common voltage to the respective pixels is divided. The divided electrodes can function as a common electrode during a writing period for writing display signals (data signals) that are signals for display to the respective pixels, and can function as a TP electrode during a sensing period for detecting at least one of contact or approach of a pointer to the display region. In contrast, a vertical electric field mode liquid crystal display device includes a solid common electrode on the first substrate side. Thus, the common electrode unfortunately works as a shield and interrupts sensing. To mount an in-cell touch panel on a vertical electric field mode liquid crystal display device, electrodes for sensing need to be disposed on the first substrate side by patterning and stacking separately from the common electrode, which increases the thickness of the liquid crystal element and causes complication.

Hereinafter, the present embodiment is specifically described.

The liquid crystal display device 1 includes a gate driver electrically connected to the gate lines 501, a source driver electrically connected to the source lines 502, and a controller. The gate driver sequentially supplies the gate lines 501 with scanning signals based on the control by the controller. The source driver supplies the source lines 502 with data signals based on the control by the controller at a timing where the TFTs 503 are turned into a voltage applied state by the scanning signals. Each pixel electrode 560 is controlled to have a certain potential in response to the data signal supplied through the corresponding TFT 503. Then, a fringe electric field is generated between the common electrode 540 and the pixel electrodes 560, which rotates the liquid crystal molecules 310 in the liquid crystal layer 300. Thereby, the magnitude of the voltage applied between the common electrode 540 and the pixel electrodes 560 is controlled and the retardation of the liquid crystal layer 300 is changed, whereby transmission or non-transmission of light is controlled.

The first alignment layer 200 and the second alignment layer 400, which control the alignment of the liquid crystal molecules 310 in the liquid crystal layer 300, are respectively disposed between the first substrate 100 and the liquid crystal layer 300 and between the second substrate 500 and the liquid crystal layer 300. The first alignment layer 200 and the second alignment layer 400 have a function of aligning the liquid crystal molecules 310 in the liquid crystal layer 300 substantially parallel to the main surface of the first substrate 100 and the main surface of the second substrate 500, respectively, with no voltage applied to the liquid crystal layer 300 (when the voltage applied to the liquid crystal layer 300 is less than the threshold voltage). Here, the phrase "aligning liquid crystal molecules substantially parallel to the main surface of a substrate" means that the liquid crystal molecules have a pre-tilt angle of 0° to 5°, preferably 0° to 2°, more preferably 0° to 1°, with respect to the main surface of the substrate. The pre-tilt angle of a liquid crystal molecule indicates an angle of the major axis of the liquid crystal molecule inclining to the main surface of a substrate when no voltage is applied to a liquid crystal layer.

The first alignment layer 200 preferably has an azimuthal anchoring energy value of less than $1\times10^{-5}$ J/m$^2$. This embodiment allows easier movement of the liquid crystal molecules 310 closer to the first substrate 100, further widening the area where the liquid crystal molecules 310 are movable. Thus, the modulation width of the retardation Δnd of the liquid crystal layer 300 can be further increased, whereby a still higher reflectance can be achieved. In addition, the optimum cell thickness that provides a maximum reflectance can be further reduced.

The lower limit of the azimuthal anchoring energy value of the first alignment layer 200 is not limited and may be $1\times10^{-8}$ J/m$^2$ or more, for example.

The second alignment layer 400 of the present embodiment is a strong anchoring alignment layer. The second substrate 500 of the present embodiment includes the common electrode 540 and the pixel electrodes 560. Thus, the electric field is stronger on the second substrate 500 side than on the first substrate 100 side. The present embodiment employs the second alignment layer 400 that is a strong anchoring alignment layer on the second substrate 500 side having a stronger electric field, and thereby can reduce image sticking. Furthermore, the realignment property is improved, which can also improve the response time of the liquid crystal molecules 310. The lower limit of the azimuthal anchoring energy value of the second alignment layer 400 may be $1\times10^{-3}$ J/m$^2$ or more.

The upper limit of the azimuthal anchoring energy value of the second alignment layer 400 is not limited and may be 1 J/m$^2$ or less, for example.

The first alignment layer 200 and the second alignment layer 400 are each in contact with the liquid crystal layer 300. The term "azimuthal anchoring energy value of an alignment layer" herein means the azimuthal anchoring energy value of the alignment layer on the surface being in contact with the liquid crystal layer (the interface between the both layers).

The azimuthal anchoring energy value can be calculated by a known method such as the torque balance method, the Neel wall method, calculation from a threshold value of electric field response, or calculation from a rotating magnetic field. The azimuthal anchoring energy values shown in the present description are calculated from a threshold value of electric field response.

The weak anchoring alignment layer and the strong anchoring alignment layer have different alignment restricting forces for restricting the alignment direction of the liquid crystal molecules 310.

When the voltage applied between the common electrode 540 and the pixel electrodes 560 is equal to or exceeds the threshold value, the liquid crystal molecules 310 on the weak anchoring alignment layer side are released from the restriction by the weak anchoring alignment layer. Then, the liquid crystal molecules 310 change the alignment direction from the initial alignment azimuth in the plane that is parallel to the surfaces of the first substrate 100 and the second substrate 500, in response to the voltage applied between the common electrode 540 and the pixel electrodes 560. The weak anchoring alignment layer has a slippery interface (liquid interface) at the interface with the liquid crystal layer 300.

In contrast, the liquid crystal molecules 310 on the strong anchoring alignment layer side maintain the direction of the major axes almost at the initial alignment azimuth in the plane parallel to the surfaces of the first substrate 100 and the second substrate 500 even when a voltage equal to or exceeding the threshold value (e.g., white voltage) is applied between the common electrode 540 and the pixel electrodes 560.

As described, when a voltage is applied between the common electrode 540 and the pixel electrodes 560, the liquid crystal molecules 310 on the weak anchoring alignment layer side in the liquid crystal layer 300 are released from the alignment restraining force of the weak anchoring alignment layer and change the alignment direction, while the liquid crystal molecules 310 on the strong anchoring alignment layer side in the liquid crystal layer 300 almost maintain the alignment direction while receiving the alignment restraining force of the strong anchoring alignment layer.

The term "weak anchoring" as used herein may also be referred to as zero plane anchoring, a lubricant interface, or the like. The interface between the weak anchoring alignment layer and the liquid crystal layer is a slippery interface with almost no anchoring, such as a liquid layer, a gel layer, a low-alignment order layer, or a ultra-low viscous layer.

The strong anchoring alignment layer is formed by an alignment treatment. The weak anchoring alignment layer may be formed by an alignment treatment or may be formed without an alignment treatment. Specifically, the strong anchoring alignment layer may be a rubbed alignment layer formed by a rubbing treatment or a photo-alignment layer formed by a photo-alignment treatment. The weak anchoring alignment layer may be a rubbed alignment layer, a photo-alignment layer, or an untreated alignment layer formed without an alignment treatment.

A rubbed alignment layer may be obtained by, for example, forming on a substrate a film of an alignment layer material containing a polymer for a rubbed alignment layer, rotating a rubbing roller wrapped with rubbing cloth formed from a material such as rayon or cotton at a constant rotating speed while keeping a constant distance between the rubbing roller and the substrate, moving a stage having the substrate with the film of the alignment layer material, and rubbing the surface of the film containing the polymer for a rubbed alignment layer in a predetermined direction (rubbing method). Changing the conditions of the rubbing treatment can adjust the azimuthal anchoring energy value of the alignment layer and thus can provide a strong anchoring alignment layer and a weak anchoring alignment layer.

A rubbing strength L is typically represented by the following formula.

$$L = N \times a \times \{1+(2\times\pi\times r\times n)\}/(60\times v)$$

In the formula, N represents the number of rubbing actions, a represents the length of a portion where the rubbing cloth is in contact with the substrate, r represents the radius of the rubbing roller, n represents the rotating speed of the rubbing roller, and v represents the stage moving speed. The radius of the rubbing roller depends on the design of the device. Thus, the weak anchoring alignment layer can be formed by, for example, reducing the rotating speed of the rubbing roller or reducing the feeding amount so as to shorten the length where the rubbing cloth is in contact with the substrate.

The weak anchoring rubbed alignment layer can also be formed from, for example, a polymer for a rubbed alignment layer containing at least one group selected from the group consisting of a C2-C20 linear or branched alkyl group and a polyalkylene oxide group such as polyethylene glycol or polypropylene glycol.

The strong anchoring rubbed alignment layer can also be formed from, for example, a polymer for a rubbed alignment layer containing at least one structure selected from the group consisting of the structures represented by the following formulas (D1) to (D6).

[Chem. 1]

(D1)

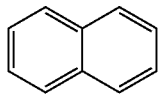
(D2)

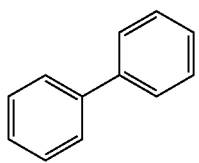
(D3)

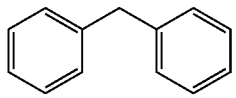
(D4)

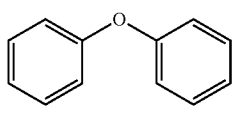
(D5)

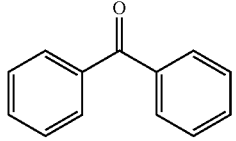
(D6)

An example of the polymer for a rubbed alignment layer is polyimide. The polymer for a rubbed alignment layer contained in the rubbed alignment layer may be one kind or two kinds or more.

The photo-alignment layer can be obtained by, for example, forming on a substrate a film of an alignment film material containing a photo-alignment polymer containing a photo-functional group, irradiating the film with polarized ultraviolet light so as to give anisotropy on the surface of the film containing the photo-alignment polymer (photo-alignment method). Changing the conditions of the photo-alignment treatment and the material structure and thereby adjusting the azimuthal anchoring energy value of the alignment layer can provide a strong anchoring alignment layer and a weak anchoring alignment layer.

The weak anchoring photo-alignment layer can also be formed from, for example, a photo-alignment polymer containing at least one group selected from the group consisting of a C2-C20 linear or branched alkyl group or a polyalkylene oxide group such as polyethylene glycol or polypropylene glycol.

Also, for example, using a photo-alignment polymer containing at least one of the structures represented by the above formulas (D1) to (D6) can form a strong anchoring photo-alignment layer.

Examples of the photo-alignment polymer include photo-alignment polymers containing at least one photo-functional group selected from the group consisting of cyclobutane, azobenzene, chalcone, cinnamate, coumarin, stilbene, phenol ester, and phenyl benzoate groups. The photo-alignment polymer contained in the photo-alignment layer may be one kind or two kinds or more. The photo-functional group contained in the photo-alignment polymer may be located in the main chain, in a side chain, or in both of the main chain and a side chain of the polymer.

The photo-alignment polymer may cause any type of photo-reaction and preferred examples of the polymer include a photolysis polymer, a photo-rearranging polymer (preferably, a photo-Fries rearranging polymer), a photoisomerizable polymer, a photodimerizable polymer, and a photo-crosslinking polymer. Any of these may be used alone or in combination of two or more thereof. In terms of the alignment stability, particularly preferred among these are a photolysis polymer having a reaction wavelength (main sensitive wavelength) around 254 nm and a photo-rearranging polymer having a reaction wavelength (main sensitive wavelength) around 254 nm. Also preferred are a photoisomerizable polymer containing a photo-functional group in a side chain and a photodimerizable polymer containing a photo-functional group in a side chain.

The photo-alignment polymer may contain any main chain structure, and suitable examples of the main chain structure include a polyamic acid structure, a polyimide structure, a poly(meth)acrylic acid structure, a polysiloxane structure, a polyethylene structure, a polystyrene structure, and a polyvinyl structure.

The untreated alignment layer may be obtained by, for example, forming on a substrate a film of an alignment film material containing a polymer for an alignment film. Examples of the polymer for an alignment film include polyimide and polyhexyl methacrylate. The polymer for an alignment film contained in the untreated alignment layer may be one kind or two kinds or more.

Also, examples of the polymer for an alignment film contained in an untreated alignment layer include polymers disclosed in WO 2017/034023 in addition to polyimide and polyhexyl methacrylate, and preferred are polyalkylene oxides such as polyethylene glycol and polypropylene glycol.

The first alignment layer 200 that is a weak anchoring alignment layer preferably contains a polymer containing at least one first photo-functional group selected from the group consisting of cyclobutane, azobenzene, chalcone, cinnamate, coumarin, stilbene, phenol ester, and phenyl benzoate groups and at least one second photo-functional group selected from the group consisting of acrylate (acryloyl), methacrylate (methacryloyl), cinnamoyl, coumarin, vinyl, allyl, styryl, and maleimide groups, and the liquid crystal layer 300 preferably contains an additive containing at least one group selected from the group consisting of acrylate (acryloyl), methacrylate (methacryloyl), cinnamoyl, coumarin, vinyl, allyl, styryl, and maleimide groups.

With such an embodiment, performing a photo-alignment treatment on a polymer containing the first photo-functional group and the second photo-functional group can form a strong anchoring alignment layer, and then performing supplemental irradiation from the viewing surface side of the liquid crystal panel can cause reaction of the second photo-functional group with an additive contained in the liquid crystal layer 300 to weaken the anchoring force given by the first photo-functional group, and can form a weak anchoring alignment layer.

The polymer containing the first photo-functional group and the second photo-functional group preferably has the structure represented by the following formula (A).

[Chem. 2]

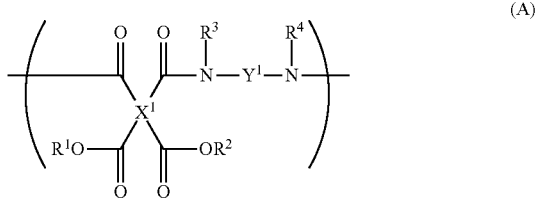

(A)

In the formula, $R^1$, $R^2$, $R^3$, and $R^4$ each independently represent a hydrogen atom or a hydrocarbon group; $X^1$ represents a tetravalent group containing a cyclobutane, azobenzene, chalcone, cinnamate, coumarin, stilbene, phenol ester, or phenyl benzoate group; and $Y^1$ represents a divalent group containing an acrylate, methacrylate, cinnamoyl, coumarin, vinyl, allyl, styryl, or maleimide group.

In the formula (A), $R^1$, $R^2$, $R^3$, and $R^4$ preferably each independently represent a hydrogen atom or a C1-C3 hydrocarbon group.

The first photo-functional group is a photo-alignment functional group. In terms of alignment stability, the polymer containing the first photo-functional group and the second photo-functional group preferably contains as the first photo-functional group a cyclobutane group in the main chain. The first photo-functional group may be located in the main chain, in a side chain, or in both the main chain and a side chain of the polymer.

The second photo-functional group is a polymerizable functional group. In terms of reactivity, the polymer containing the first photo-functional group and the second photo-functional group preferably contains as the second photo-functional group a (meth)acrylate group. The acrylate group and the methacrylate group as the second photo-functional group may be an acryloyloxy group and a methacryloyloxy group, respectively. The second photo-functional group may be located in the main chain, in a side chain, or in both the main chain and a side chain of the polymer, and is preferably located in the side chain.

The first photo-functional group and the second photo-functional group may have any reaction wavelength and preferably have different reaction wavelengths.

The additive contained in the liquid crystal layer 300 may be one kind or two or more kinds.

The amount of the additive introduced is preferably 0.1 to 10 wt %, more preferably 0.2 to 5 wt %, relative to the whole material of the liquid crystal layer 300 (liquid crystal materials).

The additive preferably contains an alkyl group. Such an embodiment can weaken the anchoring force. The alkyl group contained in the additive is preferably a C2-C20 alkyl group, particularly preferably a C4-C16 alkyl group. The alkyl group contained in the additive may have a linear structure, a branched structure, or a cyclic structure. An additive containing alkyl groups with different carbon numbers in the molecular structure is also preferred.

The specific kind of the additive is not limited, and suitable examples thereof include unsaturated fatty acid esters such as a methacrylic acid ester, an acrylic acid ester, an itaconic acid ester, a fumaric acid ester, a maleic acid ester, and a crotonic acid ester. Any of these may be used alone or in combination of two or more thereof.

The insulating substrates 110 and 510 respectively disposed on the first substrate 100 and the second substrate 500 are clear and colorless substrates with insulation properties. Examples of the insulating substrates 110 and 510 include substrates such as a glass substrate and a plastic substrate. Examples of the material for the glass substrate include glass such as float glass and soda-lime glass. Examples of the material for the plastic substrate include plastics such as polyethylene terephthalate, polybutylene terephthalate, polyethersulfone, polycarbonate, and alicyclic polyolefin.

The reflective layer 520 has a function of reflecting light entered from the viewing surface side to the viewing surface side. The reflective layer 520 has a surface structure with fine irregularities (micro reflective structure (MRS)). The MRS can be obtained by, for example, forming irregularities on an organic insulating film by photolithography, and forming a film of a highly specular metal such as Al or an Ag alloy. The MRS can scatter natural light in a specific angle range. This enables efficient use of surrounding light and thereby achieves bright reflective display.

The color filter layer 1CF includes red color filters, green color filters, and blue color filters. Each pixel 1PX has a stripe pattern of three sub-pixels, i.e., a sub-pixel provided with a red color filter, a sub-pixel provided with a green color filter, and a sub-pixel provided with a blue color filter. Also, a black matrix is disposed in a grid pattern and defines the respective color filters.

In the present embodiment, the second substrate 500 includes the color filter layer 1CF. With such an embodiment, light can be effectively transmitted from the first substrate 100 side to the liquid crystal layer 300 side, and thus the first alignment layer 200 that is a weak anchoring alignment layer can be formed by applying light from the first substrate 100 side and effectively reacting the polymer containing the first photo-functional group and the second photo-functional group with the additive contained in the liquid crystal layer 300.

The flattening film 530 has a function of flattening irregularities due to underlying members such as conductive lines and TFTs. The flattening film 530 is mainly formed from an organic insulating material.

The common electrode 540 is an electrode disposed on the almost entire surface beyond the boundaries of the pixels 1PX. The common electrode 540 receives a common signal at a constant value and thus has a constant potential. The pixel electrodes 560 are formed on the common electrode 540 with the insulating film 550 in between, are each disposed in a region surrounded by two adjacent gate lines 501 and two adjacent source lines 502, and are controlled to have a potential in response to a data signal supplied through the corresponding TFT 503.

The common electrode 540 and the pixel electrodes 560 can be formed by, for example, forming a single-layer or multilayer film of a transparent conductive material such as indium tin oxide (ITO), indium zinc oxide (IZO), zinc oxide (ZnO), tin oxide (SnO), or an alloy of any of these by sputtering and then patterning the film by photolithography.

The liquid crystal layer 300 contains liquid crystal material and controls the amount of light transmitted therethrough by applying a voltage to the liquid crystal layer 300 and changing the alignment state of the liquid crystal molecules 310 in the liquid crystal material in response to the applied voltage. The liquid crystal molecules 310 may have a positive or negative value of anisotropy of dielectric constant (Δε) represented by the following formula L. Liquid crystal molecules having a positive anisotropy of dielectric constant are also referred to as positive liquid crystal, while liquid crystal molecules having a negative anisotropy of dielectric constant are also referred to as negative liquid crystal. The major axis direction of liquid crystal molecules corresponds to the slow axis direction. Liquid crystal molecules are homogeneously aligned with no voltage applied (in a no-voltage applied state), and the major axis direction of liquid crystal molecules in a no-voltage applied state is also referred to as the initial alignment direction of liquid crystal molecules.

Δε=(dielectric constant in the major axis direction of liquid crystal molecules)−(dielectric constant in the minor axis direction of liquid crystal molecules)    (formula L)

The liquid crystal molecules 310 contained in the liquid crystal layer 300 are horizontally aligned with no voltage applied. The phrase "liquid crystal molecules 310 are horizontally aligned" means that the liquid crystal molecules 310 in the liquid crystal layer 300 are aligned substantially parallel to the main surfaces of the first substrate 100 and the second substrate 500 with no voltage applied to the liquid crystal layer 300 (when the voltage applied to the liquid crystal layer 300 is less than the threshold voltage). In the present description, a voltage applied state in which voltage is applied between a common electrode and pixel electrodes is also simply referred to as a "voltage applied state", and a no-voltage applied state in which no voltage is applied between the common electrode and the pixel electrode is also simply referred to as a "no-voltage applied state" or "with no-voltage applied".

The liquid crystal layer 300 of the present embodiment preferably has a retardation of 130 nm or greater and 145 nm or smaller in a region superimposed with the reflective layer 520. Such an embodiment can reduce or prevent light leakage and achieve favorable black display.

JP 2005-173209 A and JP 2003-177418 A fail to disclose a suitable range of the retardation of the liquid crystal layer 300 in a region superimposed with the reflective layer 520.

The linearly polarizing plate 10 is an absorptive polarizing plate and may be one of various linearly polarizing plates such as a linearly polarizing plate that includes a polarizer including a stretch film dyed with polyvinyl alcohol (PVA) and a triacetylcellulose (TAC) protective layer; a dye-based polarizing plate; and a polarizing plate formed by application.

The λ/2 plate 11 is a retardation layer giving an in-plane retardation of 245 nm to 305 nm to light having a wavelength of 550 nm. A retardation layer is a layer having a function of causing a retardation between two perpendicular polarized light components of incident polarized light utilizing a birefringent material or the like and thereby changing the state of the light. In a liquid crystal display device without the λ/2 plate 11, favorable black reflectance is achieved only to light having a wavelength of 550 nm (green light), while light leakage may occur to blue light and red light even in black display. This may resultantly cause a failure in sufficiently reducing the black luminance and a reduction in contrast ratio. Meanwhile, provision of the λ/2 plate 11 as in the present embodiment enables favorable black display in a visible region including blue light, green light, and red light without light leakage. As a result, the contrast ratio is improved. The λ/2 plate 11 is disposed between the first substrate 100 and the linearly polarizing plate 10, for example.

The in-plane retardation can be calculated according to the formula: $Re=(nx-ny) \times d$, wherein d represents the thickness (nm) of the layer (film). Here, "nx" represents the refractive index in the direction in which the in-plane refractive index is maximum (i.e., slow axis direction), "ny" represents the refractive index in the direction perpendicular to the slow axis in the plane, and "nz" represents the refractive index in the thickness direction. The refractive index indicates the value for light having a wavelength of 550 nm, unless otherwise noted.

The λ/2 plate 11 may be produced by stretching a polymer film, for example. Specific examples of the material for the polymer film include acyclic polyolefins such as polycarbonate and polypropylene, polyesters such as polyethylene terephthalate and polyethylene naphthalate, cyclic polyolefins such as polynorbornene, polyvinyl alcohol, polyvinyl butyral, polymethyl vinyl ether, polyhydroxyethyl acrylate, hydroxyethyl cellulose, hydroxypropyl cellulose, methyl cellulose, polyarylate, polysulfone, polyethersulfone, polyphenylene sulfide, polyphenylene oxide, polyallyl sulfone, polyvinyl alcohol, polyamide, polyimide, polyvinyl chloride, and cellulose. Any of these may be used alone or in combination. More specifically, the λ/2 plate 11 may be formed by stretching a polycarbonate film as disclosed in the paragraph 0123 in JP 2004-325468 A.

The angle between the transmission axis azimuth of the linearly polarizing plate 10 and the slow axis azimuth of the λ/2 plate 11 is preferably 5° or greater and 25° or smaller, more preferably 10° or greater and 20° or smaller.

The angle between the transmission axis azimuth of the linearly polarizing plate 10 and the alignment azimuth of the first alignment layer 200 is preferably 65° or greater and 85° or smaller, more preferably 70° or greater and 80° or smaller. The angle between the transmission axis azimuth of the linearly polarizing plate 10 and the alignment azimuth of the second alignment layer 400 is preferably 65° or greater and 85° or smaller, more preferably 70° or greater and 80° or smaller.

The angle between the slow axis azimuth of the λ/2 plate 11 and the alignment azimuth of the first alignment layer 200 is preferably 50° or greater and 70° or smaller, more preferably 55° or greater and 65° or smaller. The angle between the slow axis azimuth of the λ/2 plate 11 and the alignment azimuth of the second alignment layer 400 is preferably 50° or greater and 70° or smaller, more preferably 55° or greater and 65° or smaller.

The alignment azimuth of the first alignment layer 200 is parallel to the alignment azimuth of the second alignment layer 400. The phrase "the alignment azimuth of the first alignment layer 200 is parallel to the alignment azimuth of the second alignment layer 400" means that the angle (absolute value) between the azimuths is 0° or greater and 3° or smaller, preferably 0° or greater and 1° or smaller, more preferably 0° or greater and 0.5° or smaller, particularly preferably 0° (perfectly parallel).

The alignment azimuths of the first alignment layer 200 and the second alignment layer 400 can be determined by infrared spectroscopy, ellipsometry, second-harmonic generation (SHG), or X-ray diffractometry. The alignment azimuths shown in the present description are determined by ellipsometry.

Embodiment 2

Figure 4:
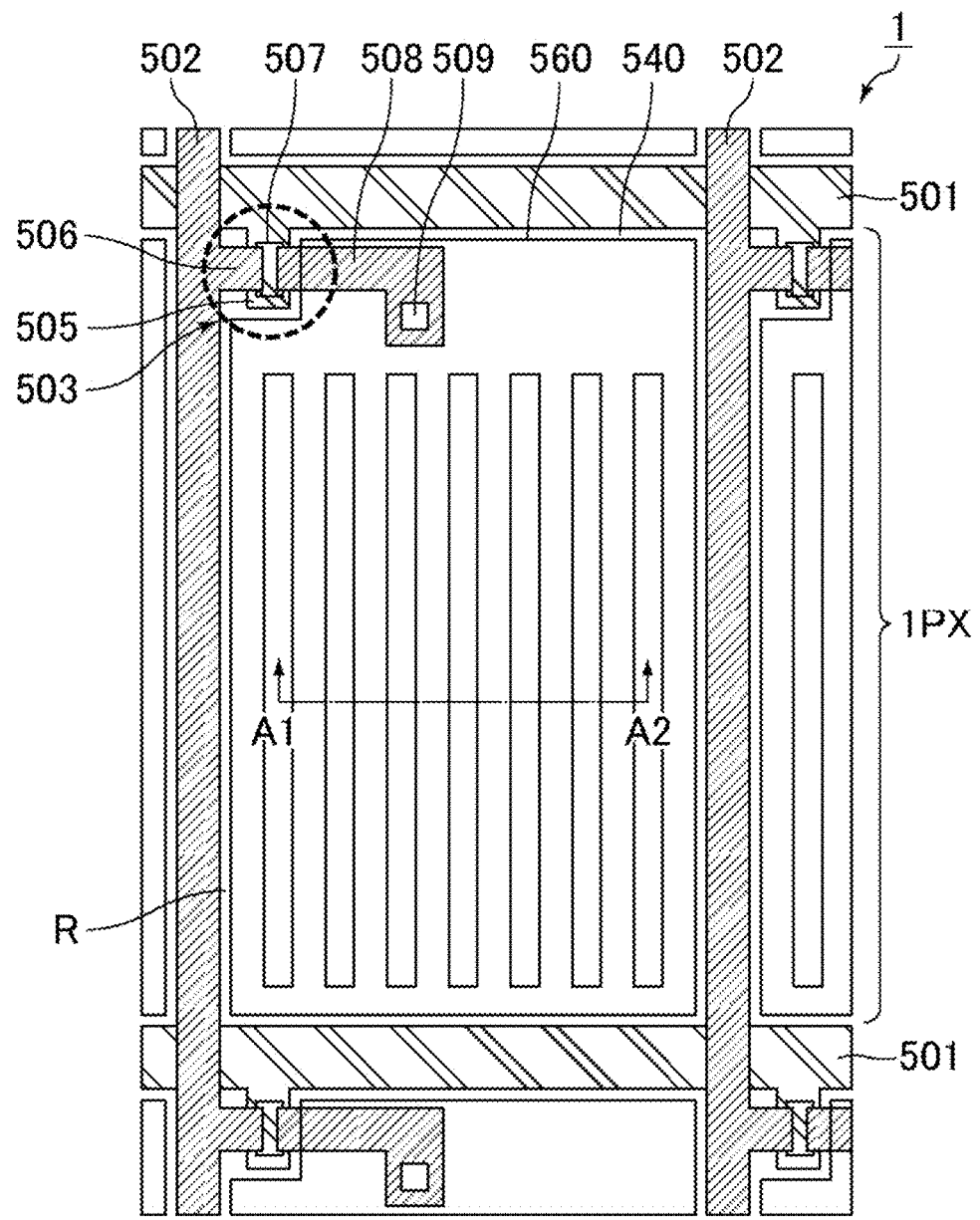
FIG. 4 is a schematic plan view of a liquid crystal display device of Embodiment 2.
Figure 5:
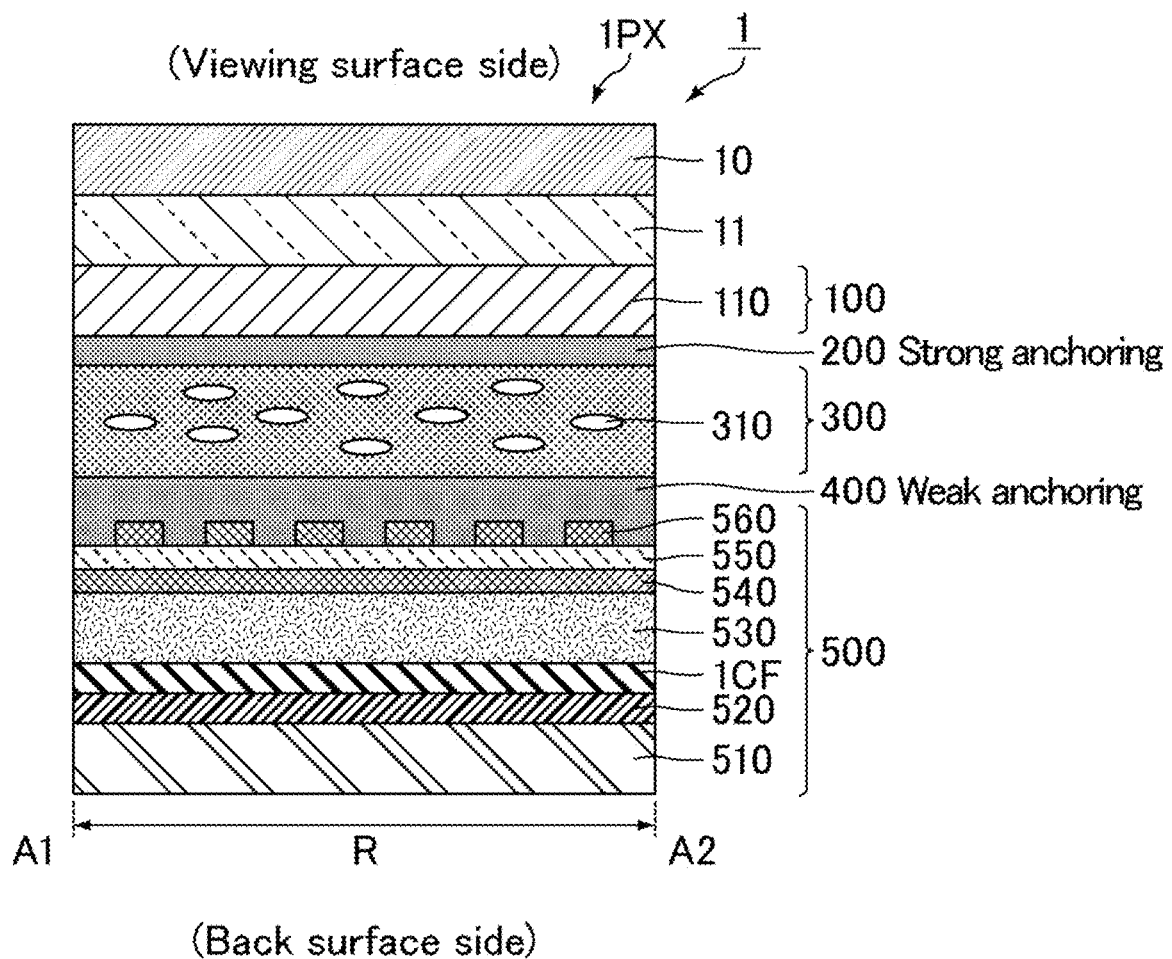
FIG. 5 is a schematic cross-sectional view taken along the line A1-A2 in FIG. 4.

The features unique to the present embodiment are mainly described in the present embodiment, and the same features as those in Embodiment 1 will not be elaborated upon here. The present embodiment is substantially the same as Embodiment 1 except that the first alignment layer 200 and the second alignment layer 400 have different anchoring energy values. FIG. 4 is a schematic plan view of a liquid crystal display device of Embodiment 2. FIG. 5 is a schematic cross-sectional view taken along the line A1-A2 in FIG. 4. In Embodiment 1, the first alignment layer 200 is a weak anchoring alignment layer and the second alignment layer 400 is a strong anchoring alignment layer. In contrast, in the liquid crystal display device 1 of the present embodiment, the second alignment layer 400 is a weak anchoring alignment layer and the first alignment layer 200 is a strong anchoring alignment layer as shown in FIG. 4 and FIG. 5. Such an embodiment allows easier movement of the liquid crystal molecules 310 in a wider range on the second substrate 500 side provided with the common electrode 540 and the pixel electrodes 560 in addition to the vicinity of the electrodes, and allows further increase in the modulation width of the retardation Δnd of the liquid crystal layer 300 in the plane, whereby a high reflectance can be achieved.

Here, a comparison is made between Embodiment 1 in which the first alignment layer 200 is a weak anchoring alignment layer and the present embodiment in which the second alignment layer 400 is a weak anchoring alignment layer. The present embodiment achieves easier movement of the liquid crystal molecules 310 on the second substrate 500 side provided with the common electrode 540 and the pixel electrodes 560, while in Embodiment 1, the region allowing easy movement of the liquid crystal molecules 310 spreads to the first substrate 100 side. Thus, Embodiment 1 achieves easy movement of the liquid crystal molecules 310 in a wider range than in the present embodiment and thus can more increase the reflectance. Also, in Embodiment 1, the optimum cell thickness that provides a maximum reflectance is smaller than that in the present embodiment, which is more advantageous in terms of response time.

Meanwhile, the present embodiment in which the second alignment layer 400 is a weak anchoring alignment layer has a weak anchoring force on the second substrate 500 side provided with the common electrode 540 and the pixel electrodes 560. Thus, the liquid crystal molecules 310 can be moved at a lower voltage. The present embodiment resultantly can increase the reflectance at a lower voltage than in Embodiment 1.

In the liquid crystal display device 1 of the present embodiment, the second substrate 500 includes the color filter layer 1CF as in Embodiment 1. With such an embodiment, light can be effectively transmitted from the first substrate 100 side to the liquid crystal layer 300 side, and thus the second alignment layer 400 that is a weak anchoring alignment layer can be formed by applying light from the first substrate 100 side and effectively reacting the polymer containing the first photo-functional group and the second photo-functional group with the additive contained in the liquid crystal layer 300.

The second alignment layer 400 of the present embodiment preferably has an azimuthal anchoring energy value of less than $1 \times 10^{-5}$ J/m². Such an embodiment allows much easier movement of the liquid crystal molecules 310 on the second substrate 500 side and allows a further increase in modulation width of the retardation Δnd of the liquid crystal layer 300 in the plane, whereby a high reflectance can be achieved.

The lower limit of the azimuthal anchoring energy value of the second alignment layer 400 is not limited and may be $1 \times 10^{-8}$ J/m² or more, for example.

The first alignment layer 200 of the present embodiment is a strong anchoring alignment layer. The lower limit of the azimuthal anchoring energy value of the first alignment layer 200 may be $1 \times 10^{-3}$ J/m² or more. The upper limit of the azimuthal anchoring energy value of the first alignment layer 200 is not limited and may be 1 J/m², for example.

The liquid crystal layer 300 of the present embodiment preferably has a retardation of 130 nm or greater and 145 nm or smaller in a region superimposed with the reflective layer 520. Such an embodiment can reduce or prevent light leakage and achieve favorable black display.

Embodiment 3

Figure 6:
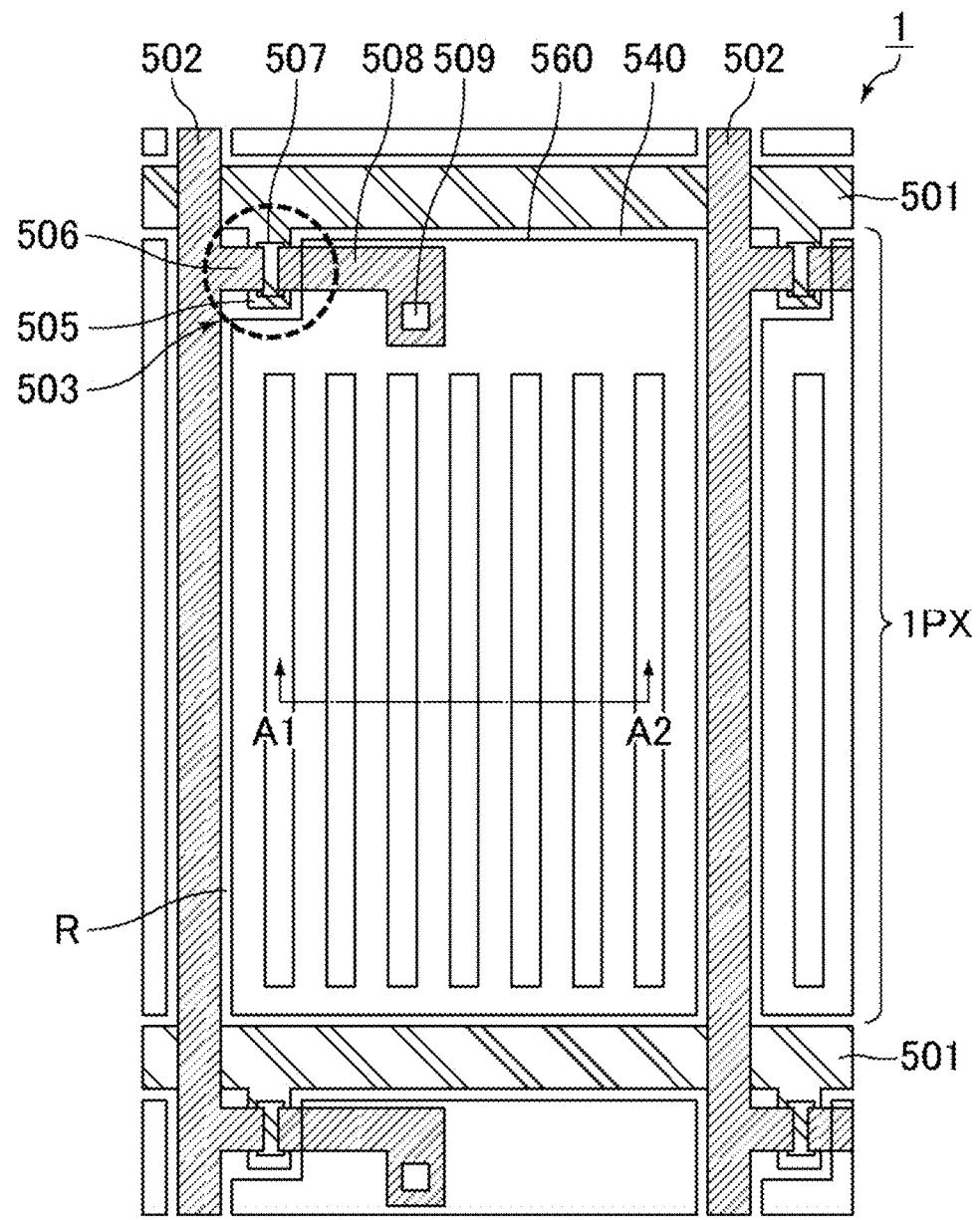
FIG. 6 is a schematic plan view of a liquid crystal display device of Embodiment 3.
Figure 7:
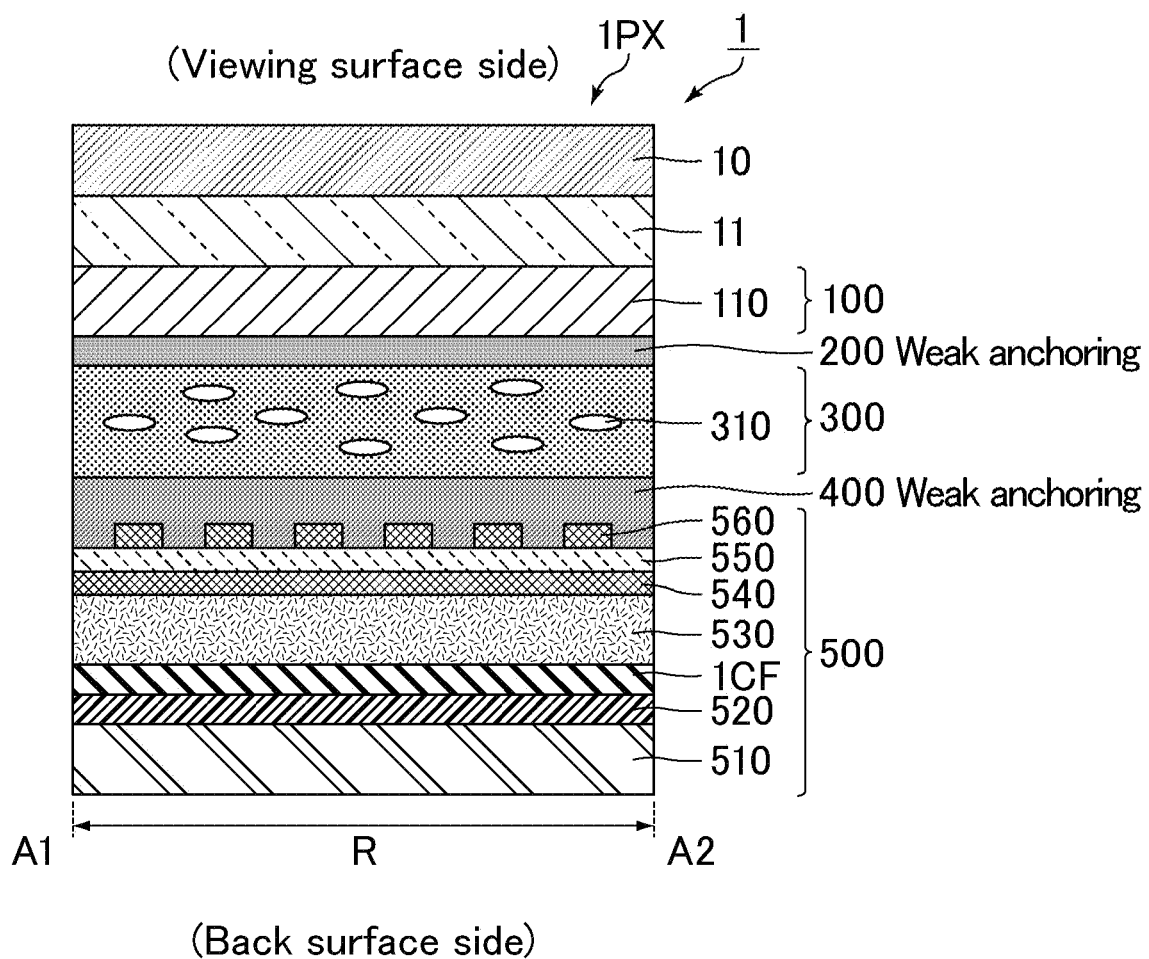
FIG. 7 is a schematic cross-sectional view taken along the line A1-A2 in FIG. 6.

The features unique to the present embodiment are mainly described in the present embodiment, and the same features as those in Embodiments 1 and 2 will not be elaborated upon here. The present embodiment is substantially the same as Embodiment 1 except that the first alignment layer 200 and the second alignment layer 400 have different anchoring energy values. FIG. 6 is a schematic plan view of a liquid crystal display device of Embodiment 3. FIG. 7 is a schematic cross-sectional view taken along the line A1-A2 in FIG. 6. In Embodiments 1 and 2, one of the first alignment layer 200 or the second alignment layer 400 is a weak anchoring alignment layer and the other is a strong anchoring alignment layer. In the liquid crystal display device 1 of the present embodiment, both of the first alignment layer 200 and the second alignment layer 400 are weak anchoring alignment layers as shown in FIG. 6 and FIG. 7. Such an embodiment allows easier movement of the liquid crystal molecules 310 on both of the first substrate 100 side and the second substrate 500 side and allows movement of the liquid crystal molecules 310 in a much wider range, whereby a still higher reflectance is achieved.

The first alignment layer 200 of the present embodiment preferably has an azimuthal anchoring energy value of less than $1 \times 10^{-5}$ J/m². This embodiment allows easier movement of the liquid crystal molecules 310 on the first substrate 100 side, further widening the area where the liquid crystal molecules 310 are movable. Thus, the modulation width of the retardation Δnd of the liquid crystal layer 300 can be further increased, whereby a still higher reflectance can be achieved. In addition, the optimum cell thickness that provides a maximum reflectance can be further reduced.

The lower limit of the azimuthal anchoring energy value of the first alignment layer 200 is not limited and may be $1 \times 10^{-10}$ J/m² or more, for example.

The second alignment layer 400 of the present embodiment preferably has an azimuthal anchoring energy value of less than $1 \times 10^{-5}$ J/m$^2$. Such an embodiment allows much easier movement of the liquid crystal molecules 310 on the second substrate 500 side and allows a further increase in modulation width of the retardation Δnd of the liquid crystal layer 300 in the plane, whereby a high reflectance is achieved. In addition, the optimum cell thickness that provides a maximum reflectance can be further reduced.

The lower limit of the azimuthal anchoring energy value of the second alignment layer 400 is not limited and may be $1 \times 10^{-10}$ J/m$^2$ or more, for example.

As shown in Embodiments 1 to 3, the structure in which at least one of the first alignment layer 200 or the second alignment layer 400 is a weak anchoring alignment layer reduces the anchoring force restricting the liquid crystal molecules 310 on the weak anchoring alignment layer side to achieve easier movement of the liquid crystal molecules 310. As a result, the liquid crystal molecules 310 can rotate in a wider region than in the liquid crystal display device 1R of Comparative Embodiment, and the modulation width of the retardation Δnd of the liquid crystal layer 300 can be relatively uniformly increased in the plane, whereby a high reflectance can be achieved. In other words, the structure in which at least one of the substrates of the liquid crystal panel has weak anchoring (zero in-plane anchoring, slippery interface) allows movement of the liquid crystal molecules 310 in the vicinity of the substrate, which has been difficult in conventional cases, and can relatively uniformly increase the modulation width of the resulting And in the plane. As a result, a horizontal electric field mode liquid crystal display device can achieve a high reflectance comparable to that of a vertical electric field mode liquid crystal display device. Besides, voltage reduction (low power consumption) can be achieved because the liquid crystal molecules 310 can be moved in a wider range at a lower voltage.

As described in Embodiments 1 to 3, the reflectance can be increased by increasing the modulation width of And of the liquid crystal layer 300 and making light reaching the reflective layer 520 to be closer to linearly polarized light.

JP 2005-173209 A discloses a bistable nematic liquid crystal display device but makes no discussion on horizontal electric field mode liquid crystal display devices. The liquid crystal display device of JP 2005-173209 A is a liquid crystal display device in which the twist angle of liquid crystal molecules is switched between two angles, i.e., 0° and 180°, by applying voltage pulses, and can only provide binary images consisting of white and black. In data rewriting, liquid crystal molecules are once set to a vertical alignment and then switched to a different stable alignment (at a twist angle of 0° or) 180°, which takes a long response time. Also, in the liquid crystal display device disclosed in JP 2005-173209 A, a pixel having a twist angle of 0° and a pixel having a twist angle of 180° may be adjacent to each other, and thus an alignment failure may occur at the boundary between the pixel with 0° twist and the pixel with 180° twist. In a display device not having high resolution, the alignment failure portion (display failure region) is small relative to the displayed region, and thus the alignment failure can be light-shielded with a black matrix portion. In a display device having high resolution, the area with the alignment failure is large. Thus, the liquid crystal display device disclosed in JP 2005-173209 A cannot have high resolution. In contrast, the liquid crystal display devices 1 of Embodiments 1 to 3 are FFS mode liquid crystal display devices and thus have short response time. Also, they can have high resolution.

In addition, the anchoring energy disclosed in JP 2005-173209 A is anchoring energy for stabilizing bistability. Thus, the weak anchoring alignment film has a polar angle anchoring energy value in the polar angle direction of $6 \times 10^{-5}$ to $2 \times 10^{-4}$ J/m$^2$ and an azimuthal anchoring energy value of $1 \times 10^{-5}$ to $5 \times 10^{-5}$ J/m$^2$. That is, the ranges of the polar angle anchoring energy value and the azimuthal anchoring energy value of the alignment film are set to be very small.

In contrast, in Embodiments 1 to 3, the polar angle anchoring energy has no limitation, and the azimuthal anchoring energy is set within the above range. That is, the material and production process for the alignment layers can be selected from a wider range of options.

JP 2003-177418 A employs the following technique. That is, while voltage is applied to a liquid crystal layer containing a polymerizable monomer, the monomer is polymerized into a polymer that is made to memorize the tilt of liquid crystal molecules (hereinafter, also referred to as a polymer-based pre-tilt angle giving technique). In the examples of JP 2003-177418 A, the polymer-based pre-tilt angle giving technique is used on an alignment film having a small anchoring energy to increase the anchoring energy, whereby a strong anchoring alignment film with strong alignment restricting force is obtained. When such an alignment film of JP 2003-177418 A is used in a horizontal electric field mode reflective liquid crystal display device or transflective liquid crystal display device, the alignment of liquid crystal molecules with voltage applied has distribution both in the thickness direction and in the in-plane direction, resulting in a reduced reflectance. In JP 2003-177418 A, every alignment film has strong anchoring force. Meanwhile, in Embodiments 1 to 3, at least one of the first alignment layer 200 or the second alignment layer 400 is a weak anchoring alignment layer, which is a different structure from that in JP 2003-177418 A.

In JP 2009-162837 A, when the anchoring strength of one of a first liquid crystal alignment region or a second liquid crystal alignment region is below an allowable value, a display failure such as an afterimage phenomenon is caused. Thus, the document advises that the difference in anchoring strength between these regions should be noted. This indicates that JP 2009-162837 A supposes use of strong anchoring alignment films. When this technique is applied to a horizontal electric field mode reflective or transflective liquid crystal display device, the alignment of liquid crystal molecules with voltage applied has distribution both in the thickness direction and in the in-plane direction, resulting in a reduced reflectance. Meanwhile, in Embodiments 1 to 3, at least one of the first alignment layer 200 or the second alignment layer 400 is a weak anchoring alignment layer, which is a different structure from that in JP 2009-162837 A.

Modified Example 1

Embodiments 1 to 3 describe reflective liquid crystal display devices. Similarly, a transflective liquid crystal display device in which each pixel 1PX includes a reflection region with the reflective layer 520 and a transmission region without the reflective layer 520 can have an increased modulation width of the retardation Δnd of the liquid crystal layer 300 and achieve a high reflectance by having a structure in which at least one of the first alignment layer 200 or the second alignment layer 400 is a weak anchoring alignment layer.

Figure 8:
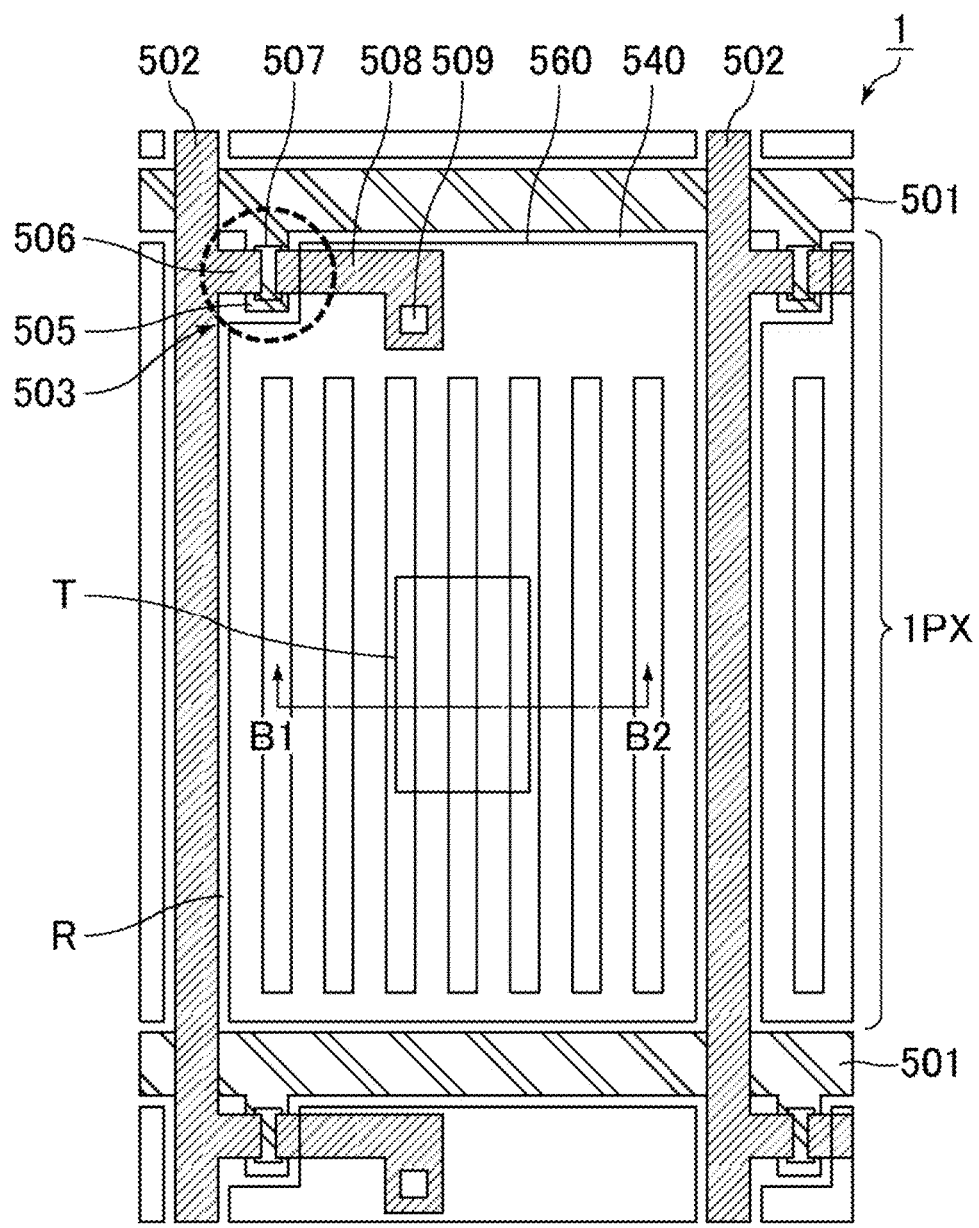
FIG. 8 is a schematic plan view of a liquid crystal display device of Modified Example 1.
Figure 9:
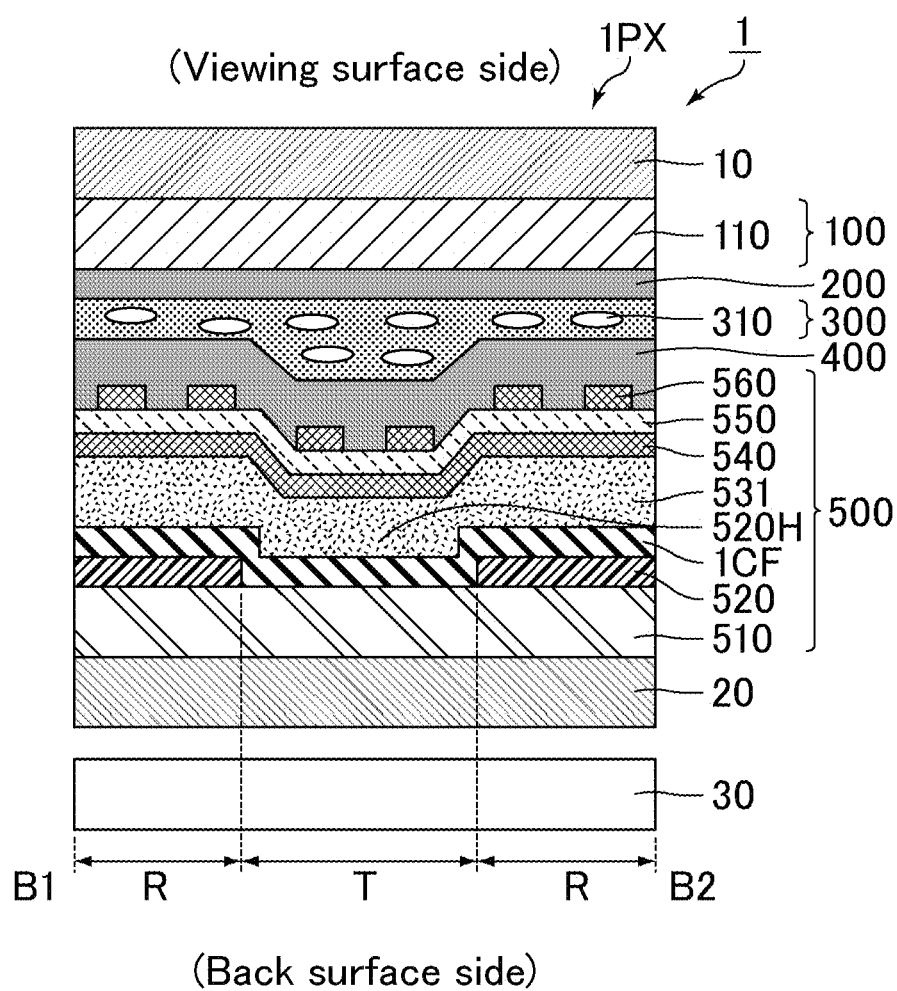
FIG. 9 is a schematic cross-sectional view taken along the line B1-B2 in FIG. 8.

FIG. 8 is a schematic plan view of a liquid crystal display device of Modified Example 1. FIG. 9 is a schematic cross-sectional view taken along the line B1-B2 in FIG. 8. As shown in FIG. 8 and FIG. 9, the liquid crystal display device 1 of the present modified example is substantially the same as those of Embodiments 1 to 3 except that the device includes: a linearly polarizing plate 20 and a backlight 30 on the back surface side of the second substrate 500; an unevenness control layer 531 including the flattening film 530 and a gap formation layer between the color filter layer 1CF and the common electrode 540; an aperture 520H in the reflective layer 520 at a predetermined proportion; and no λ/2 plate 11. The reflective layer 520 is partly disposed on each pixel 1PX. The liquid crystal display device 1 of the present modified example is a transflective liquid crystal display device including a reflection region R with the reflective layer 520 and a transmission region T without the reflective layer 520. In the transmission region T, light emitted from the backlight 30 is transmitted through the liquid crystal layer 300 to be emitted to the viewing surface side, whereby an image is displayed.

In the liquid crystal display device 1 of the present modified example, a gap formation layer is disposed at a position corresponding to the position between the flattening film 530 and the common electrode 540 of Embodiment 1, and the flattening film 530 and the gap formation layer constitute the unevenness control layer 531, whereby the liquid crystal layer 300 in the reflection region R has a thickness that is approximately a half of the thickness of the liquid crystal layer 300 in the transmission region T. The gap formation layer may be disposed not between the flattening film 530 and the common electrode 540 but between the insulating substrate 110 and the first alignment layer 200, whereby the liquid crystal layer 300 in the reflection region R has a thickness that is approximately a half of the thickness of the liquid crystal layer 300 in the transmission region T.

Hereinafter, the present modified example is specifically described with reference to Modified Examples 1-1 and 1-2. A liquid crystal display device of Modified Example 1-1 belongs to Modified Example 1 and corresponds to Embodiment 1. In the liquid crystal display device 1 of Modified Example 1-1, the first alignment layer 200 on the counter substrate side is a weak anchoring alignment layer and the second alignment layer 400 on the TFT substrate side is a strong anchoring alignment layer. A liquid crystal display device of Modified Example 1-2 belongs to Modified Example 1 and corresponds to Embodiment 2. In the liquid crystal display device 1 of Modified Example 1-2, the first alignment layer 200 on the counter substrate side is a strong anchoring alignment layer and the second alignment layer 400 on the TFT substrate side is a weak anchoring alignment layer.

Figure 10:
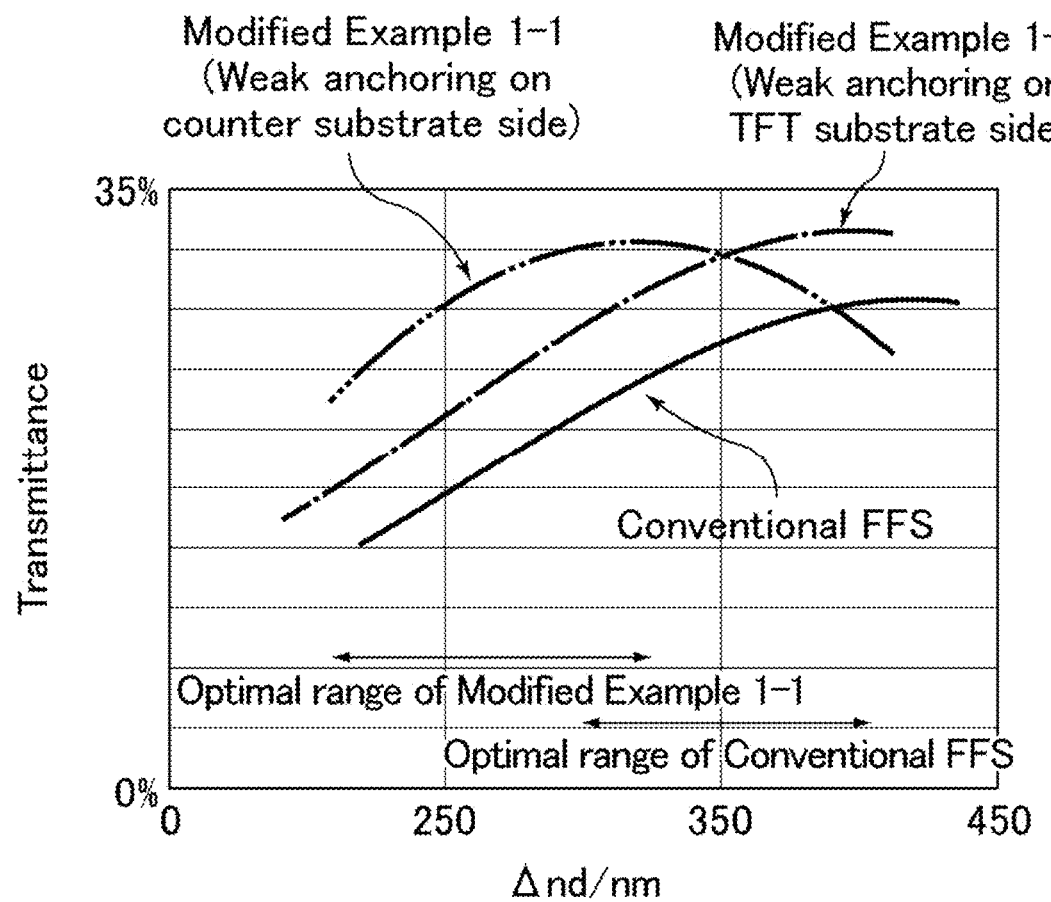
FIG. 10 includes graphs each showing the transmittance in a transmission region relative to the retardation of the liquid crystal layer in each of the liquid crystal display devices of Modified Examples 1-1 and 1-2 and a conventional FFS mode transmissive liquid crystal display device.

FIG. 10 includes graphs each showing the transmittance in a transmission region relative to the retardation of the liquid crystal layer in each of the liquid crystal display devices of Modified Examples 1-1 and 1-2 and a conventional FFS mode transmissive liquid crystal display device. A conventional FFS mode transmissive liquid crystal display device has the same structure as the liquid crystal display devices of Modified Examples 1-1 and 1-2 except that no reflective layer 520 is provided and both of the first alignment layer and the second alignment layer are strong anchoring alignment layers. In each of the conventional FFS mode liquid crystal display device and the liquid crystal display devices of Modified Examples 1-1 and 1-2, the alignment azimuth of the first alignment layer is parallel to the alignment azimuth of the second alignment layer.

A conventional FFS mode transmissive liquid crystal display device typically has a retardation Δnd of a liquid crystal layer of around 300 to 400 nm, often around 330 to 350 nm, because an excessively high retardation Δnd causes yellowing of displayed color. In Modified Example 1-1 in which the first alignment layer 200 is a weak anchoring alignment layer (the counter substrate side has weak anchoring), setting the retardation Δnd of the liquid crystal layer 300 in the transmission region T to 220 nm or greater and 320 nm or smaller as shown in FIG. 10 can avoid yellowing of the chromaticity of white, which can increase the transmittance. Furthermore, the cell thickness can be reduced, which can improve the response time. In terms of increasing the transmittance, the retardation Δnd of the liquid crystal layer 300 in the transmission region T in Modified Example 1-1 is preferably 250 nm or greater and 310 nm or smaller.

In a typical transflective liquid crystal display device, the thickness of the liquid crystal layer 300 in the reflection region R is set to about a half of the thickness of the liquid crystal layer 300 in the transmission region T. In terms of increasing the transmittance, the retardation of the liquid crystal layer 300 in the transmission region T in the present modified example is preferably set to 220 nm or greater and 320 nm or smaller. Also, as described in Embodiment 1, in terms of achieving a favorable white reflectance, the retardation of the liquid crystal layer 300 in the reflection region R is preferably set to 80 nm or greater and 180 nm or smaller. As described, the retardations of the liquid crystal layer 300 in the reflection region R and in the transmission region T in Modified Example 1-1 may be set in different viewpoints from those in a conventional transflective liquid crystal display device. In a conventional transflective FFS display device, preferably, the liquid crystal layer retardation in a transmission region is set to 330 nm, and the liquid crystal layer retardation in a reflection region is set to 137.5 nm. Thus, the difference in thickness of the liquid crystal layer, which corresponds to a retardation of 192.5 nm, need to be provided between the transmission region and the reflection region. In contrast, in Modified Example 1-1, preferably, the liquid crystal layer retardation in the transmission region is set to 280 nm, and the liquid crystal layer retardation in the reflection region is set to 137.5 nm, for example. The difference is thus 142.5 nm. The difference smaller than in the conventional display device can reduce the unevenness for gap control, which leads to thin profile of the panel and simplicity of the producing process.

As shown in FIG. 10, the liquid crystal display device 1 of Modified Example 1-2 in which the second alignment layer 400 is a weak anchoring alignment layer (the TFT substrate side has weak anchoring) can also achieve a higher transmittance relative to the retardation Δnd of the liquid crystal layer 300 than in a conventional FFS mode transmissive liquid crystal display device. As shown in FIG. 10, setting the retardation Δnd of the liquid crystal layer 300 in the transmission region T to 330 nm or greater and 350 nm or smaller in Modified Example 1-2 can avoid yellowing of the chromaticity of white, which can increase the transmittance. In terms of improving the response time, the retardation Δnd of the liquid crystal layer 300 in the transmission region T is preferably set to 300 nm or greater and 330 nm or smaller.

The range of the retardation Δnd of the liquid crystal layer 300 indicates the range when the alignment azimuth of the first alignment layer 200 is parallel to the alignment azimuth of the second alignment layer 400. In the case where the alignment azimuth of the first alignment layer 200 is non-parallel to the alignment azimuth of the second alignment layer 400, the range of the retardation Δnd of the liquid crystal layer 300 is not limited to the above range. Still, the structure in which the first alignment layer 200 is a weak anchoring alignment layer can achieve the effect of reducing the cell thickness.

Although the liquid crystal display device 1 of the present modified example does not include the λ/2 plate 11, the λ/2 plate 11 may be disposed as in Embodiments 1 to 3.

The linearly polarizing plate 20 is an absorptive polarizing plate and may be one of various linearly polarizing plates such as a linearly polarizing plate that includes a polarizer including a stretch film dyed with polyvinyl alcohol (PVA) and a triacetylcellulose (TAC) protective layer; a dye-based polarizing plate; and a polarizing plate formed by application.

The angle between the transmission axis azimuth of the linearly polarizing plate 10 and the transmission axis azimuth of the linearly polarizing plate 20 is preferably 87° or greater and 93° or smaller, more preferably 89° or greater and 91° or smaller, still more preferably 90°.

The angle between the transmission axis azimuth of the linearly polarizing plate 10 and the alignment azimuth of the first alignment layer 200 is preferably 35° or greater and 55° or smaller, more preferably 40° or greater and 50° or smaller, particularly preferably 45°. The angle between the transmission axis azimuth of the linearly polarizing plate 10 and the alignment azimuth of the second alignment layer 400 is preferably 35° or greater and 55° or smaller, more preferably 40° or greater and 50° or smaller, particularly preferably 45°.

Modified Example 2

Embodiments 1 to 3 and Modified Example 1 each describe the case where the alignment azimuth of the first alignment layer 200 is parallel to the alignment azimuth of the second alignment layer 400. Still, the alignment azimuth of the first alignment layer 200 may be non-parallel to the alignment azimuth of the second alignment layer 400. In this case, the liquid crystal layer 300 preferably has a retardation of 240 nm or greater and 260 nm or smaller in a region superimposed with the reflective layer 520. Such an embodiment can achieve favorable black display.

In the present modified example, the angle between the alignment azimuth of the first alignment layer 200 and the alignment azimuth of the second alignment layer 400 is preferably 60° or greater and 80° or smaller, more preferably 65° or greater and 75° or smaller.

The angle between the transmission axis azimuth of the linearly polarizing plate 10 and the alignment azimuth of the first alignment layer 200 is preferably 125° or greater and 145° or smaller, more preferably 130° or greater and 140° or smaller. The angle between the transmission axis azimuth of the linearly polarizing plate 10 and the alignment azimuth of the second alignment layer 400 is preferably 55° or greater and 75° or smaller, more preferably 60° or greater and 70° or smaller.

The angle between the slow axis azimuth of the λ/2 plate 11 and the alignment azimuth of the first alignment layer 200 is preferably 110° or greater and 130° or smaller, more preferably 115° or greater and 125° or smaller. The angle between the slow axis azimuth of the λ/2 plate 11 and the alignment azimuth of the second alignment layer 400 is preferably 40° or greater and 60° or smaller, more preferably 45° or greater and 55° or smaller.

Modified Example 3

Figure 12:
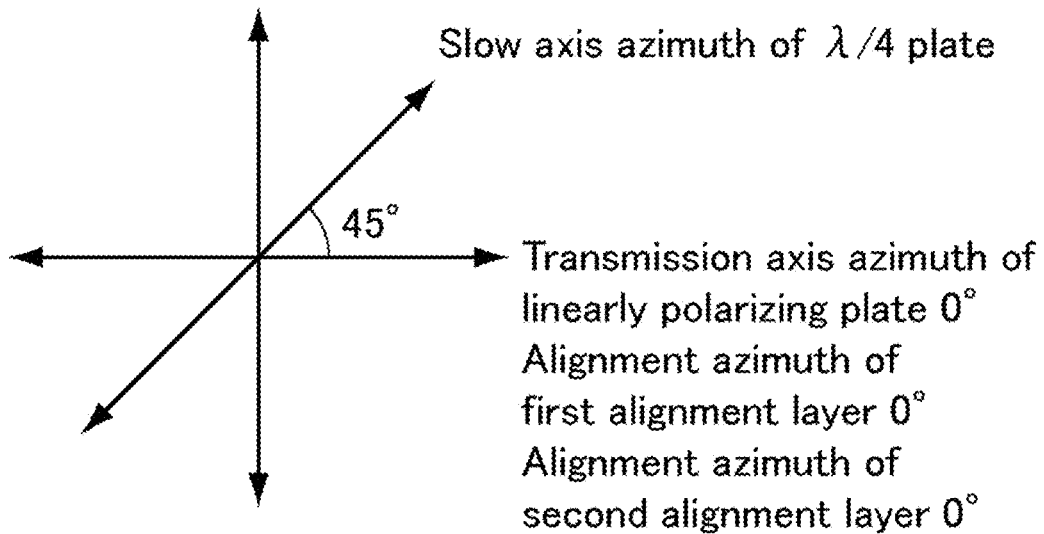
FIG. 12 is an exemplary figure showing the transmission axis azimuth of a polarizing plate, the alignment azimuth of first and second alignment layers, and the slow axis azimuth of a $\lambda/4$ plate of the liquid crystal display device of Modified Example 3.

Although Embodiments 1 to 3 and Modified Example 2 each describe an embodiment in which the λ/2 plate 11 is disposed, a structure is also applicable in which no λ/2 plate 11 is disposed but a λ/4 plate 12 is disposed. Also, the λ/4 plate 12 may be disposed in Modified Example 1. Disposing the λ/4 plate 12 and setting the slow axis azimuth as shown in FIG. 12, for example, can provide favorable black display independently from the retardation of the liquid crystal layer 300. The λ/4 plate 12 may be disposed at any position as long as it is closer to the viewing surface than the reflective layer 520 and closer to the back surface than the linearly polarizing plate 10.

Figure 11:
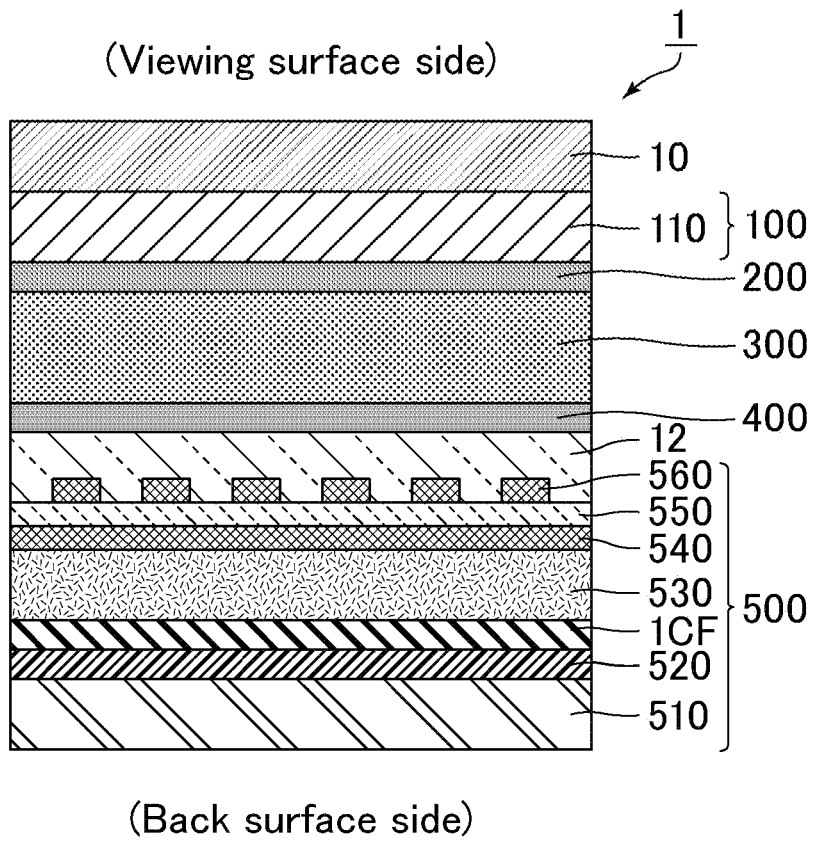
FIG. 11 is an exemplary schematic cross-sectional view of a liquid crystal display device of Modified Example 3, showing the case where no $\lambda/2$ plate is disposed but a $\lambda/4$ plate differently from Embodiments 1 to 3.

FIG. 11 is an exemplary schematic cross-sectional view of a liquid crystal display device of Modified Example 3, showing the case where no λ/2 plate is disposed but a λ/4 plate differently from Embodiments 1 to 3. FIG. 12 is an exemplary figure showing the transmission axis azimuth of a polarizing plate, the alignment azimuths of first and second alignment layers, and the slow axis azimuth of the λ/4 plate of the liquid crystal display device of Modified Example 3. As shown in FIG. 11 and FIG. 12, in the liquid crystal display device 1 of the present modified example, the λ/2 plate 11 is not disposed between the linearly polarizing plate 10 and the first substrate 100, the λ/4 plate 12 is disposed between the second alignment layer 400 and the second substrate 500, and the alignment azimuth of the first alignment layer 200 and the alignment azimuth of the second alignment layer 400 are set as shown in FIG. 12, for example.

The λ/4 plate 12 is a retardation layer giving an in-plane retardation of 107.5 nm to 167.5 nm to light having a wavelength of 550 nm.

An example of the material for the λ/4 plate 12 is a photopolymerizable liquid crystal material. An example of the structure of the photopolymerizable liquid crystal material is a structure in which liquid crystal molecules have at an end of the backbone a photopolymerizable group such as an acrylate group or a methacrylate group.

The λ/4 plate 12 may be formed by the following method, for example. First, a photopolymerizable liquid crystal material is melted in an organic solvent such as propyleneglycol monomethyl ether acetate (PGMEA). The resulting solution is then applied to a surface of a substrate (e.g., a polyethylene terephthalate (PET) film) and a coating film of the solution is formed. Then, the coating film of the solution is sequentially subjected to pre-baking, light irradiation (e.g., ultraviolet irradiation), and post-baking, whereby a λ/4 plate is formed.

The λ/4 plate 12 may also be a stretched polymer film, for example. Examples of the material for the polymer film include a cycloolefin polymer, polycarbonate, polysulfone, polyethersulfone, polyethylene terephthalate, polyethylene, polyvinyl alcohol, norbornene, triacetylcellulose, and diatyl cellulose.

The angle between the transmission axis azimuth of the linearly polarizing plate 10 and the slow axis azimuth of the λ/4 plate 12 is preferably 35° or greater and 55° or smaller, more preferably 40° or greater and 50° or smaller, particularly preferably 45° as shown in FIG. 12.

The angle between the transmission axis azimuth of the linearly polarizing plate 10 and the alignment azimuth of the first alignment layer 200 is preferably 0° or greater and 10° or smaller, more preferably 0° or greater and 5° or smaller, particularly preferably 0° as shown in FIG. 12. The angle between the transmission axis azimuth of the linearly polarizing plate 10 and the alignment azimuth of the second alignment layer 400 is preferably 0° or greater and 10° or smaller, more preferably 0° or greater and 5° or smaller, particularly preferably 0° as shown in FIG. 12.

The angle between the slow axis azimuth of the λ/4 plate 12 and the alignment azimuth of the first alignment layer 200 is preferably 35° or greater and 55° or smaller, more preferably 40° or greater and 50° or smaller, particularly preferably 45° as shown in FIG. 12. The angle between the slow axis azimuth of the λ/4 plate 12 and the alignment azimuth of the second alignment layer 400 is preferably 35° or greater and 55° or smaller, more preferably 40° or greater and 50° or smaller, particularly preferably 45° as shown in FIG. 12.

Hereinafter, the present modified example is specifically described with reference to Modified Examples 3-1 and 3-2. A liquid crystal display device of Modified Example 3-1 belongs to Modified Example 3 and corresponds to Embodiment 1. In the liquid crystal display device 1 of Modified Example 3-1, the first alignment layer 200 on the counter substrate side is a weak anchoring alignment layer and the second alignment layer 400 on the TFT substrate side is a strong anchoring alignment layer. The liquid crystal display device 1 of Modified Example 3-2 belongs to Modified Example 3 and corresponds to Embodiment 2. In the liquid crystal display device of Modified Example 3-2, the first alignment layer 200 on the counter substrate side is a strong anchoring alignment layer and the second alignment layer 400 on the TFT substrate side is a weak anchoring alignment layer.

Figure 13:
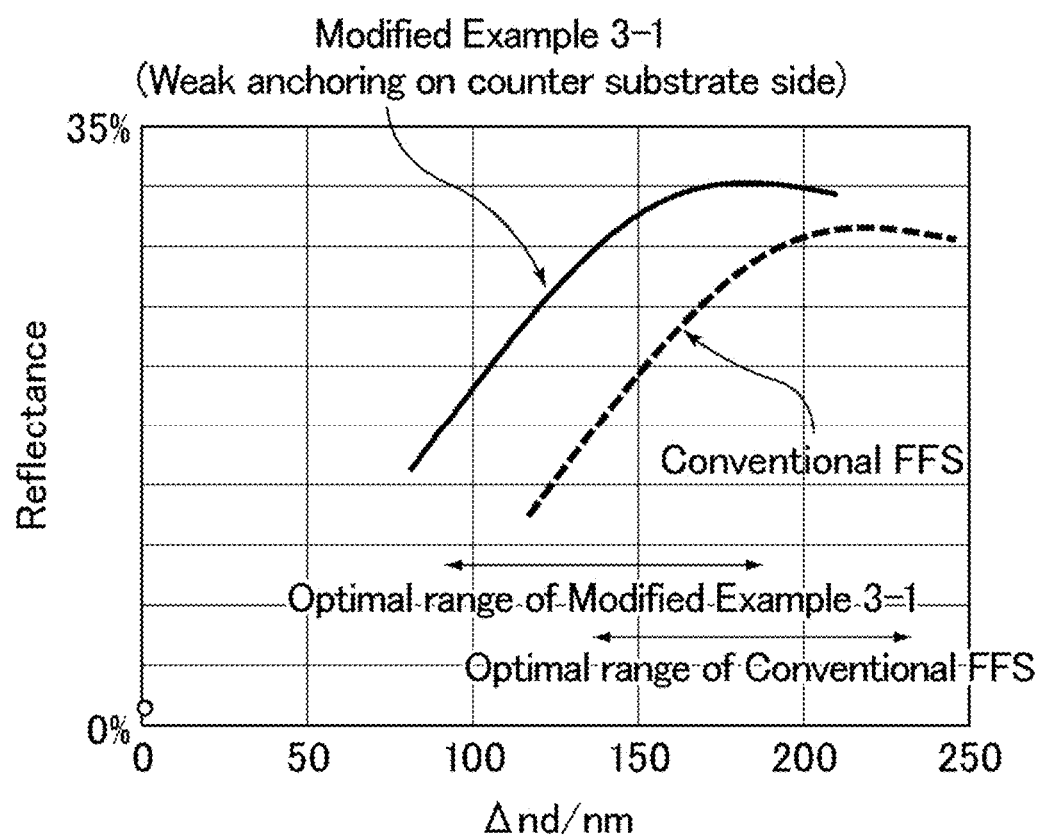
FIG. 13 includes graphs of the reflectances plotted relative to the retardation of the liquid crystal layer in each of the liquid crystal display devices of Modified Example 3-1 and a conventional FFS mode reflective liquid crystal display device.

FIG. 13 includes graphs of the reflectances plotted relative to the retardation of the liquid crystal layer in each of the liquid crystal display devices of Modified Example 3-1 and a conventional FFS mode reflective liquid crystal display device. In order to obtain favorable white reflectance in a conventional FFS mode reflective liquid crystal display device in which the first alignment layer 200 is a strong anchoring alignment layer, with the alignment azimuth of the first alignment layer 200 being parallel to the alignment azimuth of the second alignment layer 400, the liquid crystal layer 300 preferably has a retardation of 130 nm or greater and 230 nm or smaller in a region superimposed with the reflective layer 520, as shown in FIG. 13. Meanwhile, in the liquid crystal display device 1 of Modified Example 3-1 in which the first alignment layer 200 is a weak anchoring alignment layer, with the alignment azimuth of the first alignment layer 200 being parallel to the alignment azimuth of the second alignment layer 400, the liquid crystal layer 300 preferably has a retardation of 80 nm or greater and 180 nm or smaller in a region superimposed with the reflective layer 520 as shown in FIG. 13. Such an embodiment can achieve a favorable white reflectance (high white reflectance). In terms of achieving a favorable white reflectance, the liquid crystal layer 300 more preferably has a retardation of 150 nm or greater and 180 nm or smaller in a region superimposed with the reflective layer 520.

Here, the retardation Δnd of the liquid crystal layer is the multiplication of the refractive index anisotropy Δn of the liquid crystal material and the thickness d of the liquid crystal layer. Thus, that the retardation Δnd can be reduced means that the thickness d of the liquid crystal layer can be reduced. Since the response time of liquid crystal is proportional to the square of the cell thickness, the capability of reducing the cell thickness is very advantageous in terms of response time. In the present modified example, as described, disposing the λ/4 plate 12 and setting the slow axis azimuth as shown in FIG. 12, for example, can provide favorable black display independently from the retardation of the liquid crystal layer 300. Thus, the liquid crystal display device of Modified Example 3-1 can have an excellent black luminance (contrast ratio), an excellent maximum white reflectance, and excellent response time.

The preferred range of the retardation of the liquid crystal layer 300 giving a favorable white reflectance shown above indicates a preferred range when the alignment azimuth of the first alignment layer 200 is parallel to the alignment azimuth of the second alignment layer 400. Thus, a preferred range of the retardation of the liquid crystal layer 300 giving a favorable white reflectance is not limited to the above range in the cases such as the case where the alignment azimuth of the first alignment layer 200 is non-parallel to the alignment azimuth of the second alignment layer 400 and the case where a retarder other than the retarder of the present modified example is disposed. Still, any of these embodiments can achieve the effect of reducing the cell thickness by the structure in which the first alignment layer 200 is a weak anchoring alignment layer.

Also, in the liquid crystal display device 1 of Modified Example 3-2 in which the second alignment layer 400 is a weak anchoring alignment layer, with the alignment azimuth of the first alignment layer 200 being parallel to the alignment azimuth of the second alignment layer 400, the liquid crystal layer 300 preferably has a retardation of 130 nm or greater and 230 nm or smaller in a region superimposed with the reflective layer 520. Such an embodiment can achieve a favorable white reflectance. In terms of achieving a favorable white reflectance, the liquid crystal layer 300 more preferably has a retardation of 200 nm or greater and 230 nm or smaller in a region superimposed with the reflective layer 520.

Modified Example 4

Figure 14:
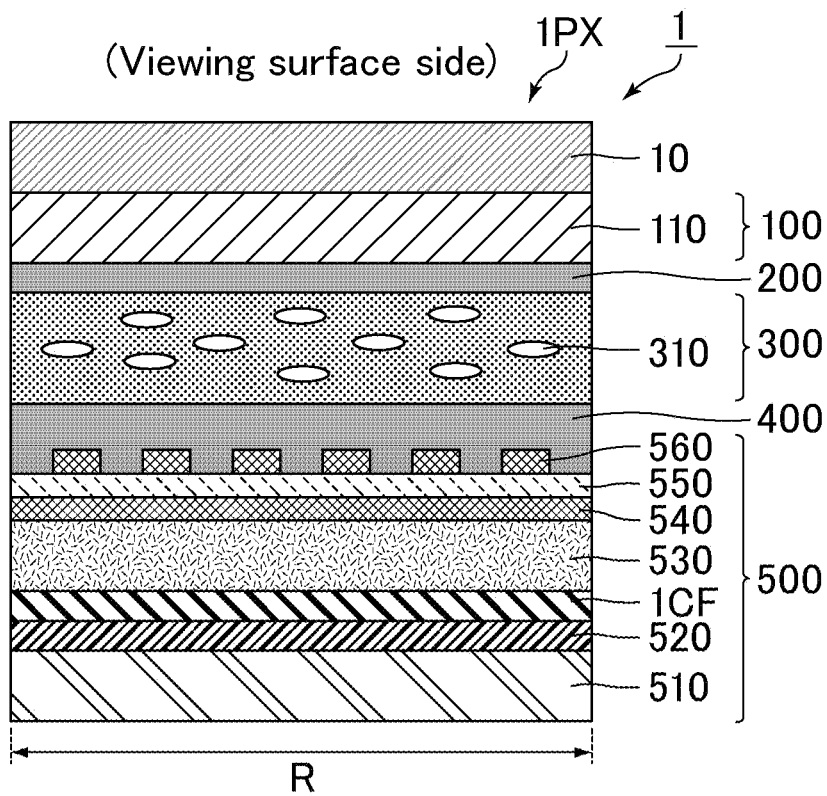
FIG. 14 is a schematic cross-sectional view of a liquid crystal display device of Modified Example 4.
Figure 15:
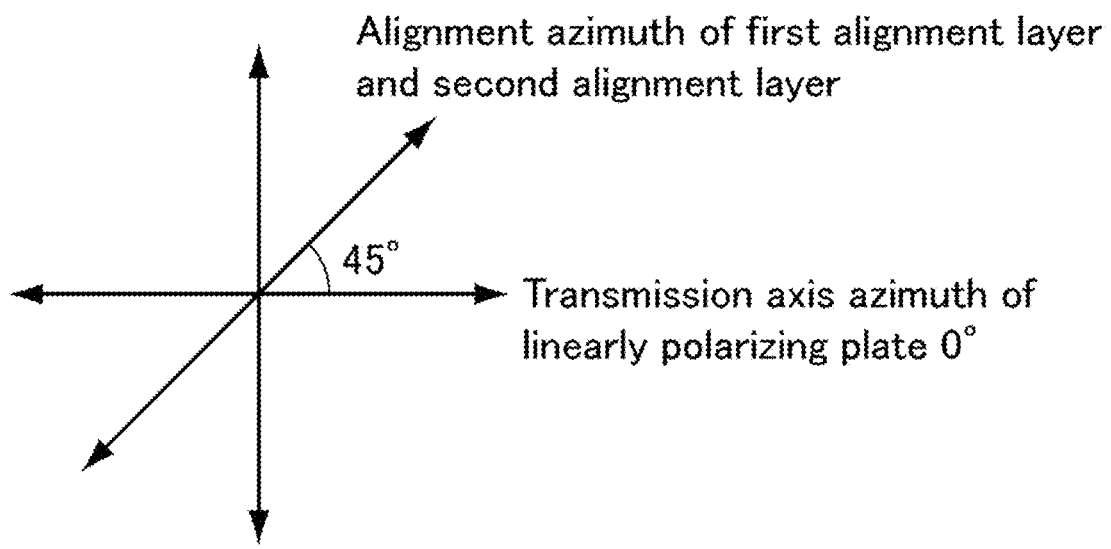
FIG. 15 is an exemplary figure showing the transmission axis azimuth of a polarizing plate and the alignment azimuth of first and second alignment layers of the liquid crystal display device of Modified Example 4.

FIG. 14 is a schematic cross-sectional view of a liquid crystal display device of Modified Example 4. FIG. 15 is an exemplary figure showing the transmission axis azimuth of a polarizing plate and the alignment azimuth of first and second alignment layers of the liquid crystal display device of Modified Example 4. In Embodiments 1 to 3 and Modified Example 2, the λ/2 plate 11 is disposed between the linearly polarizing plate 10 and the first substrate 100. The λ/2 plate 11 may not be disposed as shown in FIG. 14. In this case, the angle between the transmission axis azimuth of the linearly polarizing plate 10 and the alignment azimuth of the first alignment layer 200 is preferably 35° or greater and 55° or smaller, more preferably 40° or greater and 50° or smaller, particularly preferably 45° as shown in FIG. 15. The angle between the transmission axis azimuth of the linearly polarizing plate 10 and the alignment azimuth of the second alignment layer 400 is preferably 35° or greater and 55° or smaller, more preferably 40° or greater and 50° or smaller, particularly preferably 45° as shown in FIG. 15.

Modified Example 5

Figure 16:
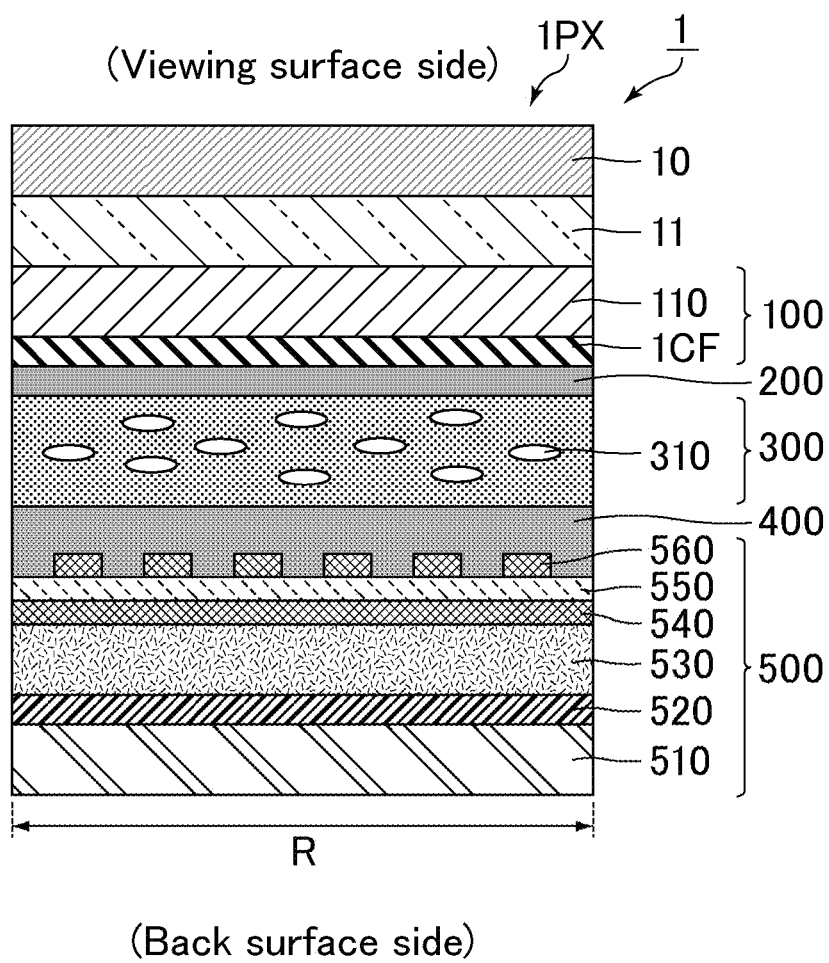
FIG. 16 is an exemplary schematic cross-sectional view of a liquid crystal display device of Modified Example 5, showing the case where a color filter layer is disposed on the first substrate side in Embodiment 1.

In Embodiments 1 to 3 and Modified Examples 1 to 4, the second substrate 500 includes the color filter layer 1CF. Alternatively, the first substrate 100 may include the color filter layer 1CF. In the case where the color filter layer 1CF and the reflective layer 520 are disposed on different substrates, the color filter layer 1CF or the reflective layer 520 absorbs or reflects light even when supplemental irradiation is performed from either of the first substrate 100 side and the second substrate 500 side, which resultantly causes a failure in providing reaction of the photo-alignment polymer contained in the alignment layer with the additive contained in the liquid crystal layer 300. Thus, supplemental irradiation cannot form a weak anchoring alignment layer. In the present modified example, a weak anchoring alignment layer can be formed by performing a rubbing treatment on a film containing a polymer for a rubbed alignment layer or by forming a film of an alignment film material containing a polymer for an alignment film without performing alignment treatment. FIG. 16 is an exemplary schematic cross-sectional view of a liquid crystal display device of Modified Example 5, showing the case where a color filter layer is disposed on the first substrate side in Embodiment 1. As shown in FIG. 16, in the liquid crystal display device 1 of the present modified example, the first substrate 100 may include the insulating substrate 110 and the color filter layer 1CF, and the second substrate 500 may include the reflective layer 520.

Modified Example 6

In Embodiments 1 to 3 and Modified Examples 1 to 5, the pixel electrodes 560 provided with slits are disposed on the common electrode 540 having a planar shape with the insulating film 550 in between. Alternatively, the positions of the common electrode 540 and the pixel electrodes 560 may be switched. In such a case, the common electrode 540 provided with slits is disposed on the pixel electrodes 560 having a planar shape occupying the respective pixel regions with the insulating film 550 in between.

Modified Example 7

Each of the liquid crystal display devices according to Embodiments 1 to 3 and Modified Examples 1 to 6 is an FFS mode liquid crystal display device in which the pixel electrodes 560 provided with slits are disposed on the common electrode 540 having a planar shape with the insulating film 550 in between. Alternatively, an in-plane switching (IPS) mode liquid crystal display device is employable in which the common electrode 540 and the pixel electrodes 560 are comb-teeth electrodes and are disposed on the same electrode layer in such a manner that the comb-teeth of the common electrode 540 and the pixel electrode 560 fit in each other.

Modified Example 8

Figure 17:
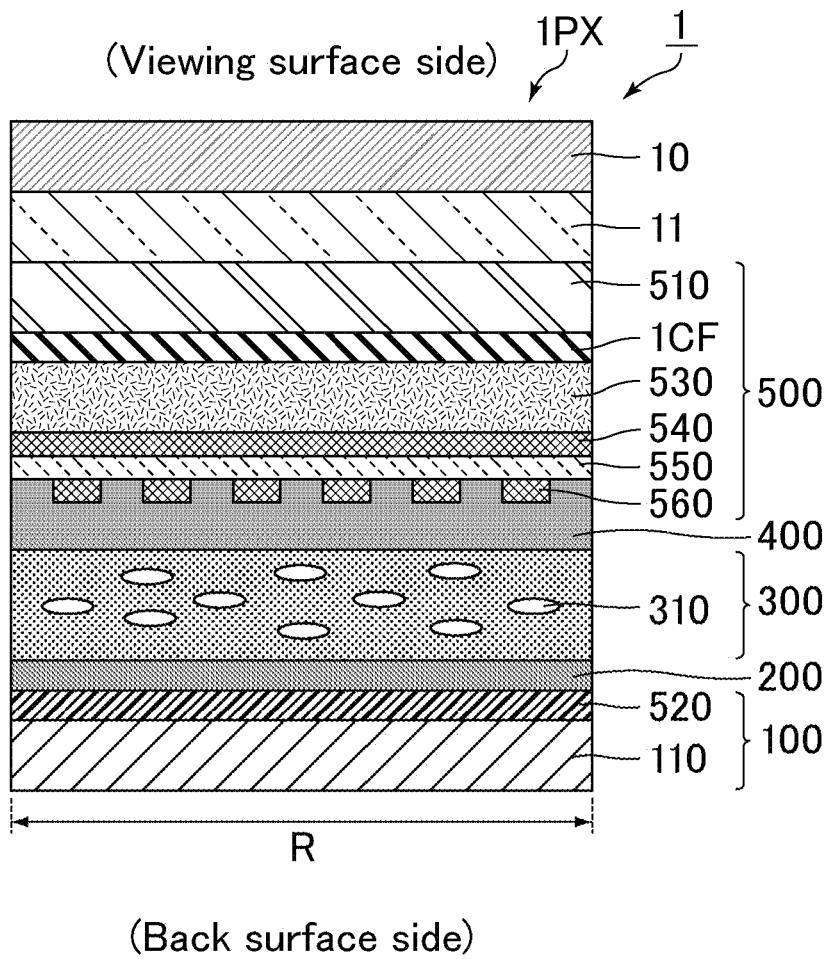
FIG. 17 is an exemplary schematic cross-sectional view of a liquid crystal display device of Modified Example 8, showing the case where the members of Embodiments 1 to 3 are disposed in the reverse order.

In Embodiments 1 to 3 and Modified Examples 1 to 7, the first substrate 100, the first alignment layer 200, the liquid crystal layer 300, the second alignment layer 400, and the second substrate 500 are disposed in the stated order from the viewing surface side to the back surface side. Alternatively, these members may be disposed in the reverse order. Such an embodiment can also increase the reflectance by the structure in which at least one alignment layer of the first alignment layer 200 or the second alignment layer 400 is a weak anchoring alignment layer. FIG. 17 is an exemplary schematic cross-sectional view of a liquid crystal display device of Modified Example 8, showing the case where the members of Embodiments 1 to 3 are disposed in the reverse order. As shown in FIG. 17, the liquid crystal display device 1 of the present modified example may include the linearly polarizing plate 10, the λ/2 plate 11, the second substrate 500, the second alignment layer 400, the liquid crystal layer 300, the first alignment layer 200, and the first substrate 100 in the stated order from the viewing surface side to the back surface side, and the first substrate 100 may include the insulating substrate 110 and the reflective layer 520 disposed on the liquid crystal layer 300 side of the insulating substrate 110.

Modified Example 9

In Embodiments 1 to 3 and Modified Examples 1 to 8, the slits provided in the pixel electrodes 560 or the common electrode 540 have a linear shape. Alternatively, the slits may have an L-shape (a shape in which a straight line has a bend). Such an embodiment allows a structure in which one pixel includes two liquid crystal domains where liquid crystal molecules are aligned in different directions from each other in a voltage applied state, which is called a dual domain structure, and thereby can improve the viewing angle.

Modified Example 10

In Embodiments 1 to 3 and Modified Examples 1 to 9, each pixel 1PX is not divided. Alternatively, each pixel 1PX may be divided into sub-pixels and an intermediate scale image may be provided by area coverage modulation.

A horizontal electric field mode liquid crystal display device including a weak anchoring alignment layer may have worse image sticking properties than a conventional horizontal electric field mode liquid crystal display device. Specifically, image sticking may be observed when an intermediate scale image is displayed after an image sticking test.

Figure 18:
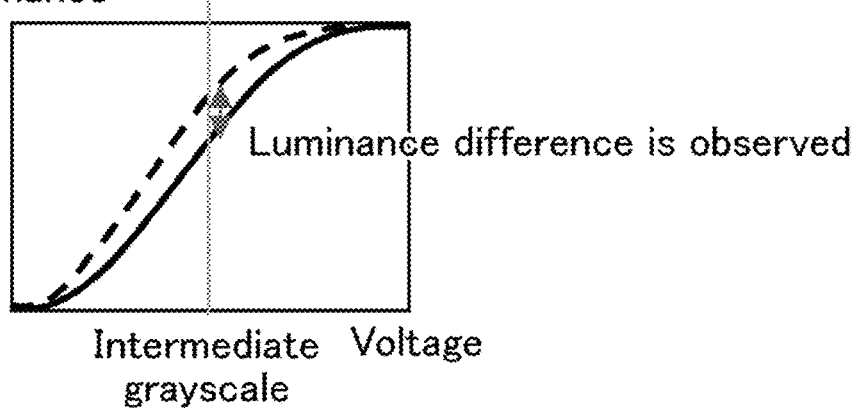
FIG. 18 includes graphs each showing the VR property of a horizontal electric field mode liquid crystal display device including a weak anchoring alignment layer.

FIG. 18 is a graph showing the VR property of a horizontal electric field mode liquid crystal display device including a weak anchoring alignment layer. A horizontal electric field mode liquid crystal display device including a weak anchoring alignment layer has a steeply changing VR property as shown in FIG. 18. Thus, when the VR property shifts due to accumulation of electric charge caused by continuous driving of the liquid crystal display device or due to alignment distortion, difference in luminance occurs even when the same scale voltage is applied, which tends to be observed as image sticking.

Figure 19:
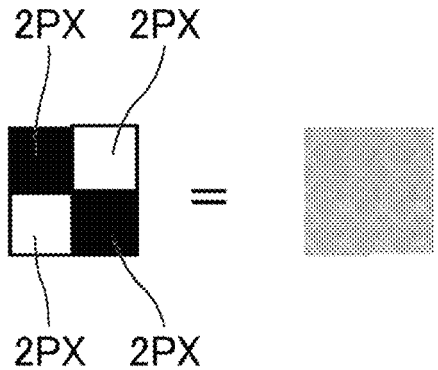
FIG. 19 is a schematic view illustrating display of an intermediate scale value in a liquid crystal display device of Modified Example 10.
Figure 20:
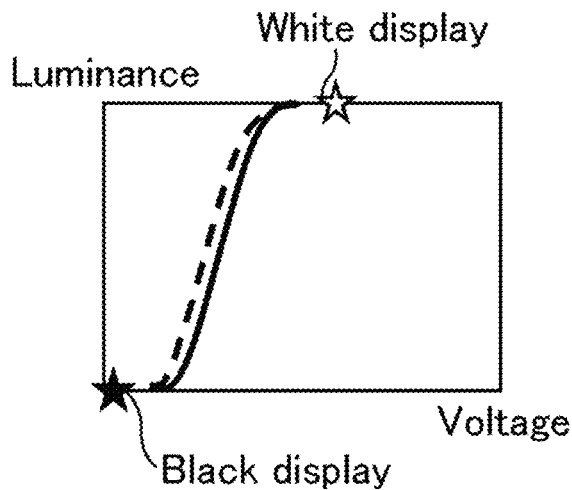
FIG. 20 is a figure illustrating white display and black display in a graph showing the VR property of a liquid crystal display device.

FIG. 19 is a schematic view illustrating display of an intermediate scale value in a liquid crystal display device of Modified Example 10. FIG. 20 is a figure illustrating white display and black display in a graph showing the VR property of a liquid crystal display device. As shown in FIG. 19, in the present modified example, each pixel 1PX is divided into sub-pixels 2PX, and an intermediate scale image is displayed by area coverage modulation. In area coverage modulation driving, each sub-pixel provides only one of white display or black display, and an intermediate image is displayed by the area ratio between black and white. In other words, an intermediate image (gray scale image) is expressed only with white and black. As shown in FIG. 20, both white display and black display are each positioned at a saturation point in the graph of VR property. Thus, no luminance difference is caused even after image sticking, whereby image sticking is less likely to be observed. In other words, the area coverage modulation of the present modified example can use only voltages causing no luminance difference, whereby image sticking is less likely to be observed.

Area coverage modulation driving may be performed by 0/1 binary display using the memory in pixel (MIP) driving or by white/black binary display using usual holding driving.

In area coverage modulation in which one pixel is divided into four sub-pixels, for example, five scale patterns can be displayed including: (black, black, black, black), (black, black, black, white), (black, black, white, white), (black, white, white, white), and (white, white, white, white). Use of a color filter allows display with 125 colors because red (R), green (G), and blue (B) can each provide five scale patterns.

When a color filter is used for three-part pixels in which each pixel is divided into three sub-pixels, 64 colors can be displayed because each of R, G, and B can provide four scale patterns, i.e., 4×4×4=64 colors. Even in the case of two-part pixels, 64 colors can be displayed by having an area ratio of 1:2, for example.

In a transflective liquid crystal display device, area coverage modulation may be applied to transmitting portions only, reflective portions only, or both portions.

WO 2020/230571 discloses a technique of enriching expression of color tones using an inorganic phosphor in an MIP mode reflective liquid crystal display device that provides color tones by area coverage modulation, and an FFS mode liquid crystal display device is disclosed as an embodiment.

A typical FFS mode liquid crystal display device has a low reflectance and thus is impractical for a reflective liquid crystal display device. However, WO 2020/230571 fails to disclose specific description on the FFS mode. Additionally, a reflective liquid crystal display device has a small cell thickness and thus has relatively high driving voltage, whereby usable drivers and integrated circuits (ICs) are limited. WO 2020/230571 also fails to disclose the details of the FFS mode in this point. Furthermore, WO 2020/230571 fails to disclose materials for alignment films and liquid crystals and design information applicable to an FFS mode liquid crystal display device. Currently practical reflective liquid crystal display devices are almost of the vertical electric field mode, and the horizontal electric field modes such as the FFS mode are not employed.

In the present modified example, use of a weak anchoring alignment layer, which is not disclosed in WO 2020/230571, can achieve low voltage driving (low power consumption) and a high reflectance in an FFS mode liquid crystal display device, and thus this structure is suitably applicable to a reflective liquid crystal display device. Also, as described above, a horizontal electric field mode liquid crystal display device including a weak anchoring alignment layer has a steeply changing VR property. Accordingly, in the present modified example, each pixel is divided into sub-pixels and area coverage modulation is employed in which each sub-pixel is displayed by a binary value, i.e., white or black, which allows use of only voltages not causing a luminance difference and thereby can reduce image sticking. Thus, the present modified example can achieve low voltage drive, low power consumption, and reduction of image sticking in a horizontal electric field mode reflective liquid crystal display device, specific means for which are not disclosed in WO 2020/230571.

Figure 21:
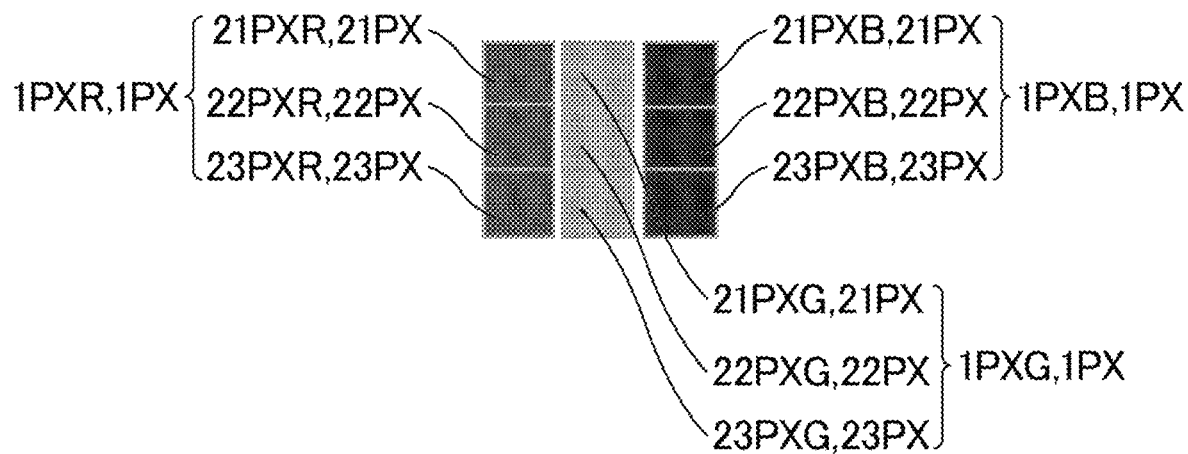
FIG. 21 is a schematic view illustrating pixels of the liquid crystal display device of Modified Example 10.
Figure 22:
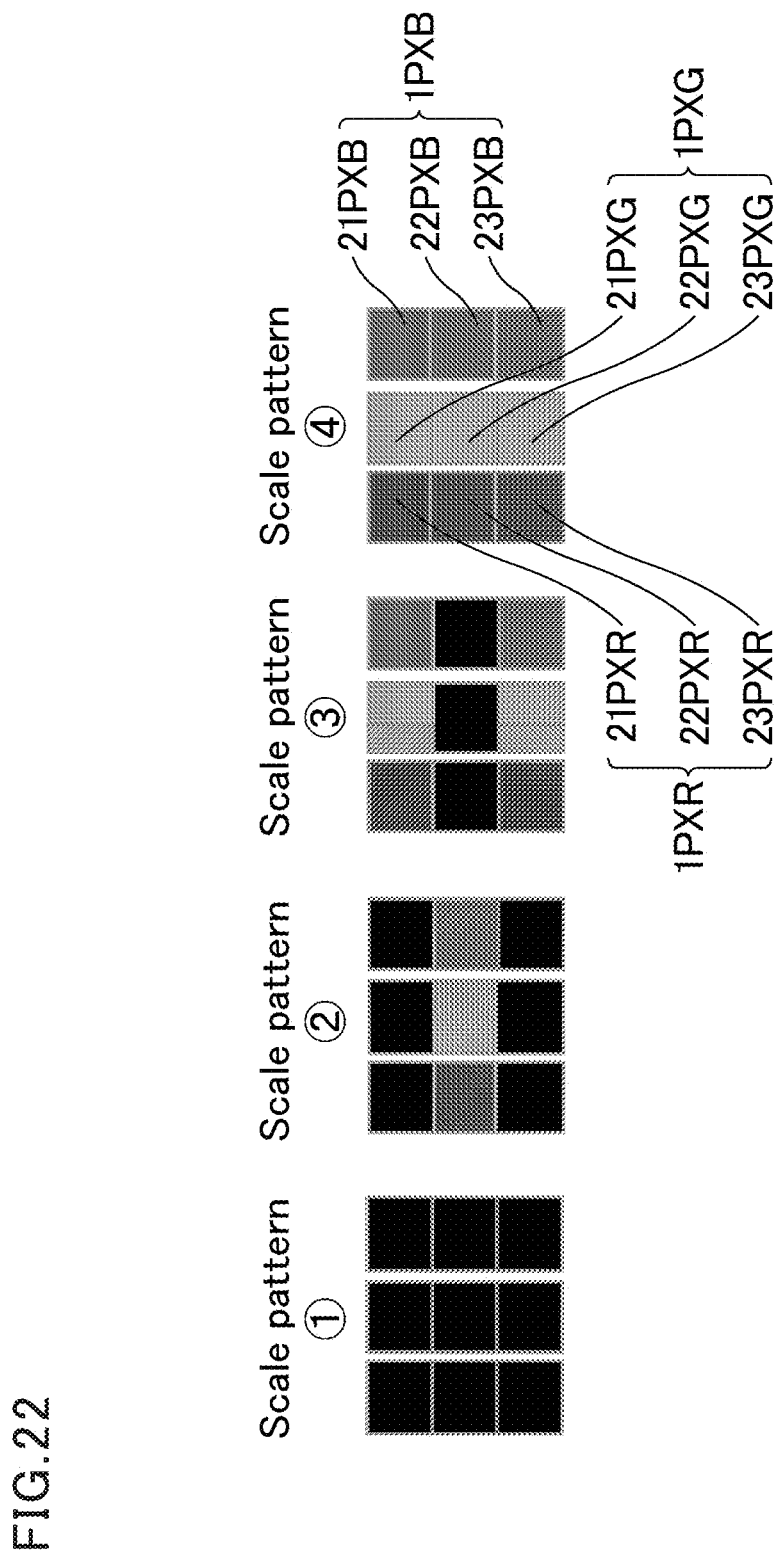
FIG. 22 is a schematic view illustrating the scale patterns of pixels in the liquid crystal display device of Modified Example 10.

FIG. 21 is a schematic view illustrating pixels of the liquid crystal display device of Modified Example 10. FIG. 22 is a schematic view illustrating the scale patterns of pixels in the liquid crystal display device of Modified Example 10. In the liquid crystal display device 1 of the present modified example, each pixel 1PX is divided into three sub-pixels. Specifically, as shown in FIG. 21 and FIG. 22, a red pixel 1PXR is divided into a first sub-pixel 21PXR, a second sub-pixel 22PXR, and a third sub-pixel 23PXR; a green pixel 1PXG is divided into a first sub-pixel 21PXG, a second sub-pixel 22PXG, and a third sub-pixel 23PXG; and a blue pixel 1PXB is divided into a first sub-pixel 21PXB, a second sub-pixel 22PXB, and a third sub-pixel 23PXB.

Here, the first sub-pixels 21PXR, 21PXG, and 21PXB and the third sub-pixels 23PXR, 23PXG, and 23PXB are respectively connected to each other, whereby the area of each pixel is substantially divided into two sections at an area ratio of 1:2. Thereby, as shown in FIG. 22, 64 colors can be displayed based on the calculation: 4 scale patterns×4 scale patterns×4 scale patterns=64 colors.

Figure 23:
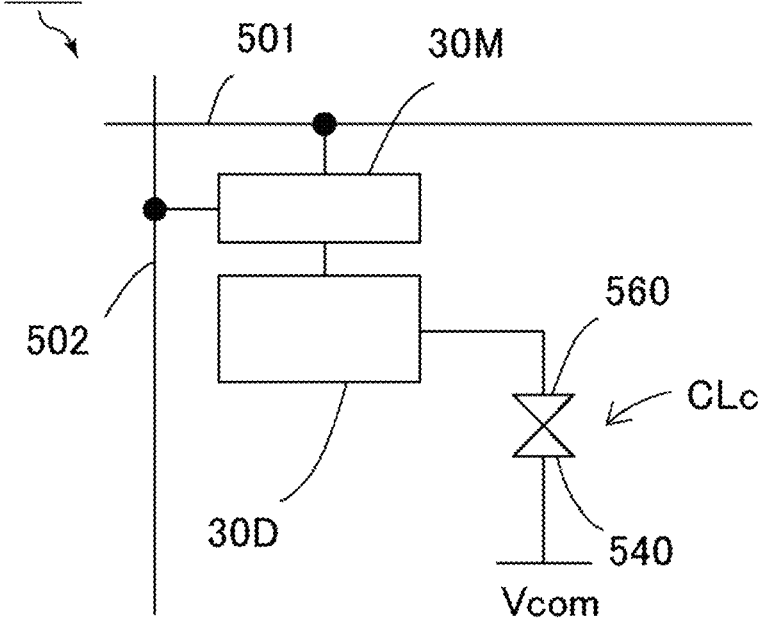
FIG. 23 is a circuit diagram simply showing an exemplary circuit structure of a pixel of the liquid crystal display device of Modified Example 10.
Figure 24:
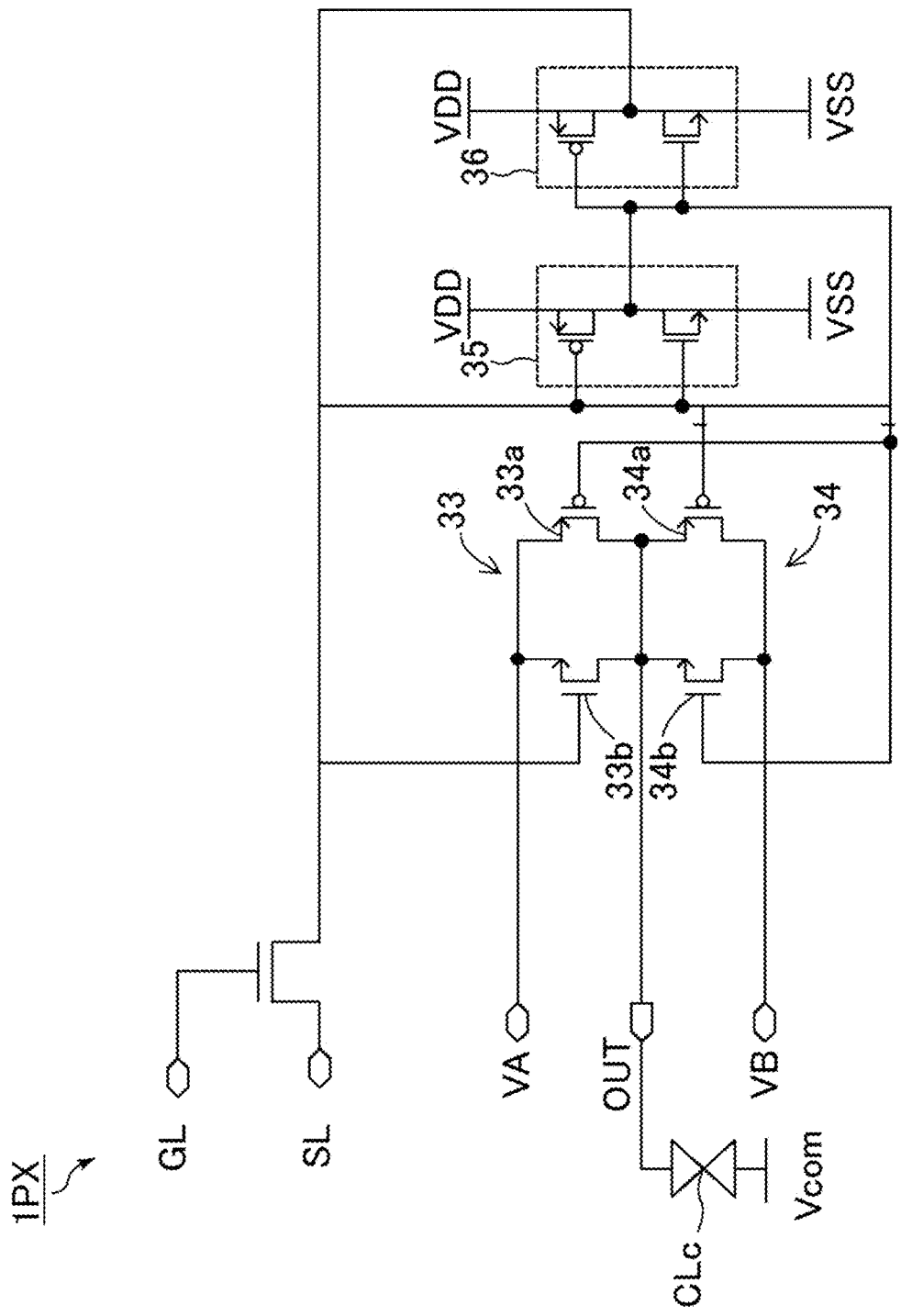
FIG. 24 is a circuit diagram specifically showing an exemplary circuit structure of a pixel of the liquid crystal display device of Modified Example 10.

FIG. 23 is a circuit diagram simply showing an exemplary circuit structure of a pixel of the liquid crystal display device of Modified Example 10. FIG. 24 is a circuit diagram specifically showing an exemplary circuit structure of a pixel of the liquid crystal display device of Modified Example 10. The second substrate 500 in the liquid crystal display device 1 of the present modified example is a TFT substrate, for example, and includes, as schematically shown in FIG. 23, the gate line 501, the source line 502, a memory circuit (memory circuit portion) 30M, and a display voltage supplying circuit (display voltage supplying circuit portion) 30D. The memory circuit 30M is a one-bit SRAM circuit, for example, and is disposed for each pixel. Specific structures and operations of the members such as the memory circuit 30M are described later.

The liquid crystal display device 1 of the present modified example is a reflective liquid crystal display device in which each pixel includes the memory circuit 30M. A liquid crystal display device in which each pixel includes a memory circuit is also referred to as a "memory liquid crystal display device" or a "MIP liquid crystal display device". An MIP mode reflective liquid crystal display device includes a memory (memory circuit 30M) for memorizing data in each pixel 1PX and thereby can provide analog display mode display and memory display mode display. The analog display mode herein means a display mode in which the scale values of pixels are displayed in an analog manner. The memory display mode herein means a display mode in which the scale values of the pixels 1PX are displayed in a digital manner based on binary information (logic "1"/logic "0") memorized in the memories of the pixels 1PX.

In the case of the memory display mode, the information stored in the memories is used, which eliminates the need for writing a signal potential (potential according to a data signal) reflecting the scale value for each frame period. Accordingly, in the memory display mode, consumed power is smaller than in the analog display mode which requires writing of a signal potential reflecting the scale value for each frame period, and thus the liquid crystal display device can achieve low power consumption. In other words, the memory liquid crystal can reduce the refresh rate (also referred to as a frame rate or driving frequency) and is thus excellent in low power consumption.

The liquid crystal display device 1 includes a drive circuit that applies a black voltage or a white voltage to the liquid crystal layer 300 at a frame rate of 1 fps or less. This drive circuit, when applying a white voltage to the liquid crystal layer 300 over multiple frames, applies a white display voltage that inverts the polarity relative to the potential (Vcom) of the common electrode 540 for each frame. In other words, the liquid crystal display device 1 performs frame-reversal driving. In the liquid crystal display device 1, each pixel performs display with two scale values (black and white). Here, use of a color filter and the area coverage modulation method can provide color display. The liquid crystal display device 1 displays black with no voltage applied (including the cases where a voltage lower than the threshold value voltage is applied).

As shown in FIG. 24, each pixel 1PX includes a gate line output GL, a source line output SL, a liquid crystal capacity CLc, analog switches 33 and 34, and inverters 35 and 36. The liquid crystal capacity CLc is formed from the liquid crystal layer 300 disposed between the pixel electrode 560 and the common electrode 540 and is designed to supply the pixel electrode 560 with polarity output OUT and the common electrode 540 with common output Vcom. The analog switches 33 and 34 and the inverters 35 and 36 are formed from a CMOS circuit.

The output of the inverter 35 is connected to the input of the inverter 36. The inverters 35 and 36 use a power supply VDD as a High side power supply and a power supply VSS as a Low side power supply.

The analog switch 33 is inserted between the output for white polarity VA and the polarity output OUT. The gate of a PMOS transistor 33a of the analog switch 33 is connected to the output of the inverter 35, and the gate of an NMOS transistor 33b of the analog switch 33 is connected to the input of the inverter 35. The analog switch 34 is inserted between the output for black polarity VB and the polarity output OUT. The gate of a PMOS transistor 34a of the analog switch 34 is connected to the input of the inverter 35, and the gate of an NMOS transistor 34b of the analog switch 34 is connected to the output of the inverter 35.

Figure 25A:
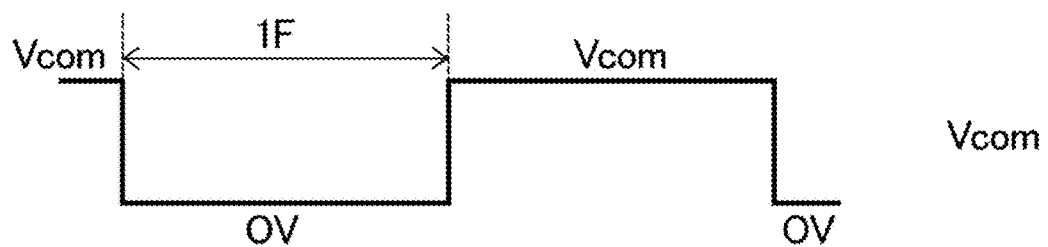
FIG. 25A shows exemplary schematic waveforms of signal voltages for driving the liquid crystal display device and voltages applied to the liquid crystal layer in Modified Example 10.
Figure 25B:
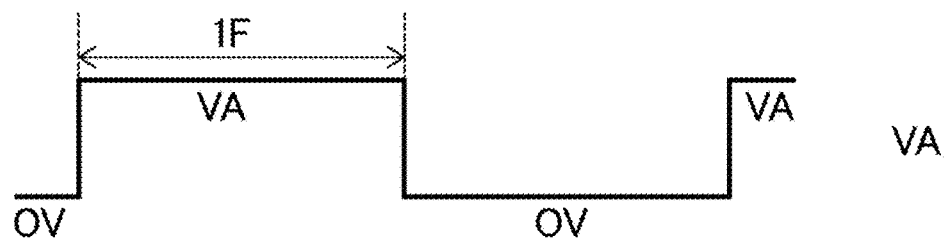
FIG. 25B shows exemplary schematic waveforms of signal voltages for driving the liquid crystal display device and voltages applied to the liquid crystal layer in Modified Example 10.
Figure 25C:
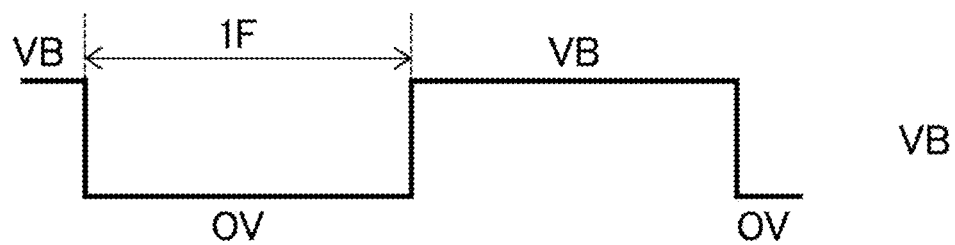
FIG. 25C shows exemplary schematic waveforms of signal voltages for driving the liquid crystal display device and voltages applied to the liquid crystal layer in Modified Example 10.
Figure 25D:
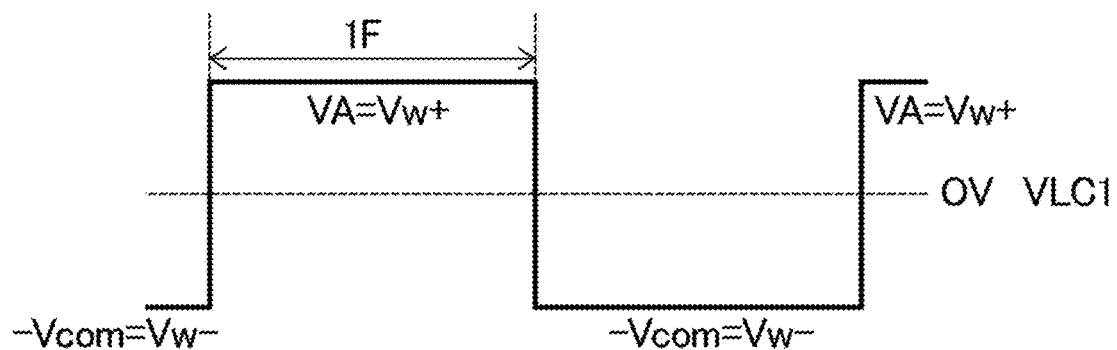
FIG. 25D shows exemplary schematic waveforms of signal voltages for driving the liquid crystal display device and voltages applied to the liquid crystal layer in Modified Example 10.
Figure 25E:
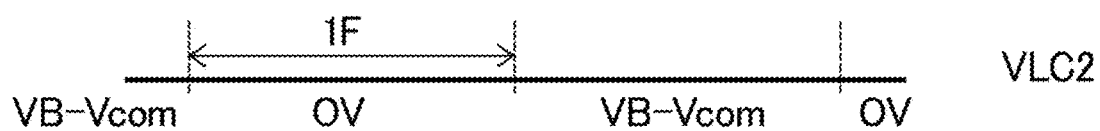
FIG. 25E shows exemplary schematic waveforms of signal voltages for driving the liquid crystal display device and voltages applied to the liquid crystal layer in Modified Example 10.

FIG. 25A shows exemplary schematic waveforms of signal voltages for driving the liquid crystal display device and voltages applied to the liquid crystal layer in Modified Example 10. FIG. 25B shows exemplary schematic waveforms of signal voltages for driving the liquid crystal display device and voltages applied to the liquid crystal layer in Modified Example 10. FIG. 25C shows exemplary schematic waveforms of signal voltages for driving the liquid crystal display device and voltages applied to the liquid crystal layer in Modified Example 10. FIG. 25D shows exemplary schematic waveforms of signal voltages for driving the liquid crystal display device and voltages applied to the liquid crystal layer in Modified Example 10. FIG. 25E shows exemplary schematic waveforms of signal voltages for driving the liquid crystal display device and voltages applied to the liquid crystal layer in Modified Example 10. FIG. 25A indicates the waveform of the common output Vcom, FIG. 25B indicates the waveform of the output for white polarity VA, and FIG. 25C indicates the waveform of the output for black polarity VB. These voltages can be supplied from a known driver. The common output Vcom is a voltage (vibration period: 2 frames (2F)) vibrating between 0 V and Vcom (positive polarity). In FIG. 25D indicates white voltage VLC1 applied to the liquid crystal layer, and FIG. 25E indicates black voltage VLC2 applied to the liquid crystal layer. The white voltage VLC1 corresponds to VA−Vcom, and the black voltage VLC2 corresponds to VB−Vcom.

Figure 26:
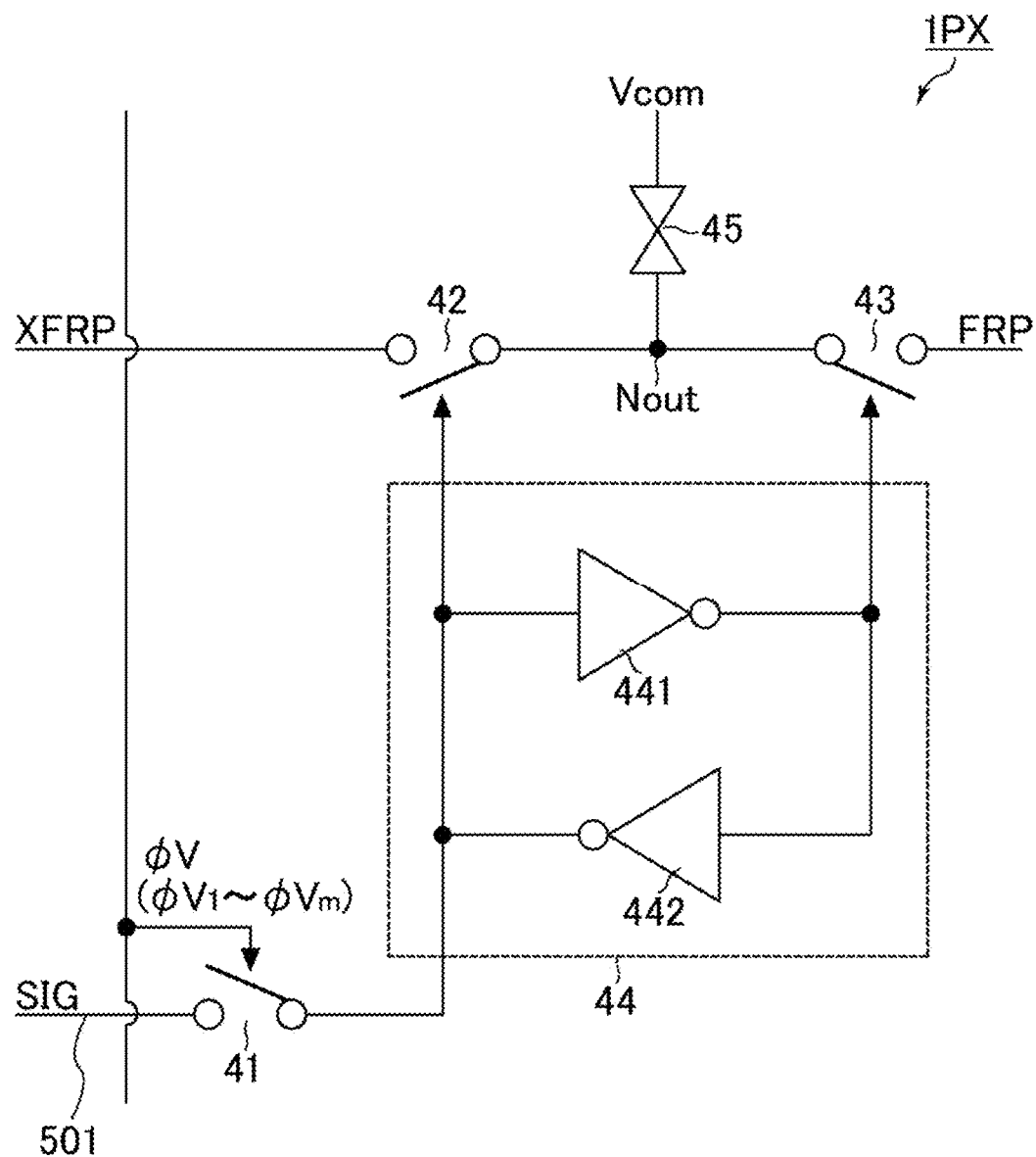
FIG. 26 is a circuit diagram showing an exemplary circuit structure of a pixel of the liquid crystal display device of Modified Example 10.
Figure 27:
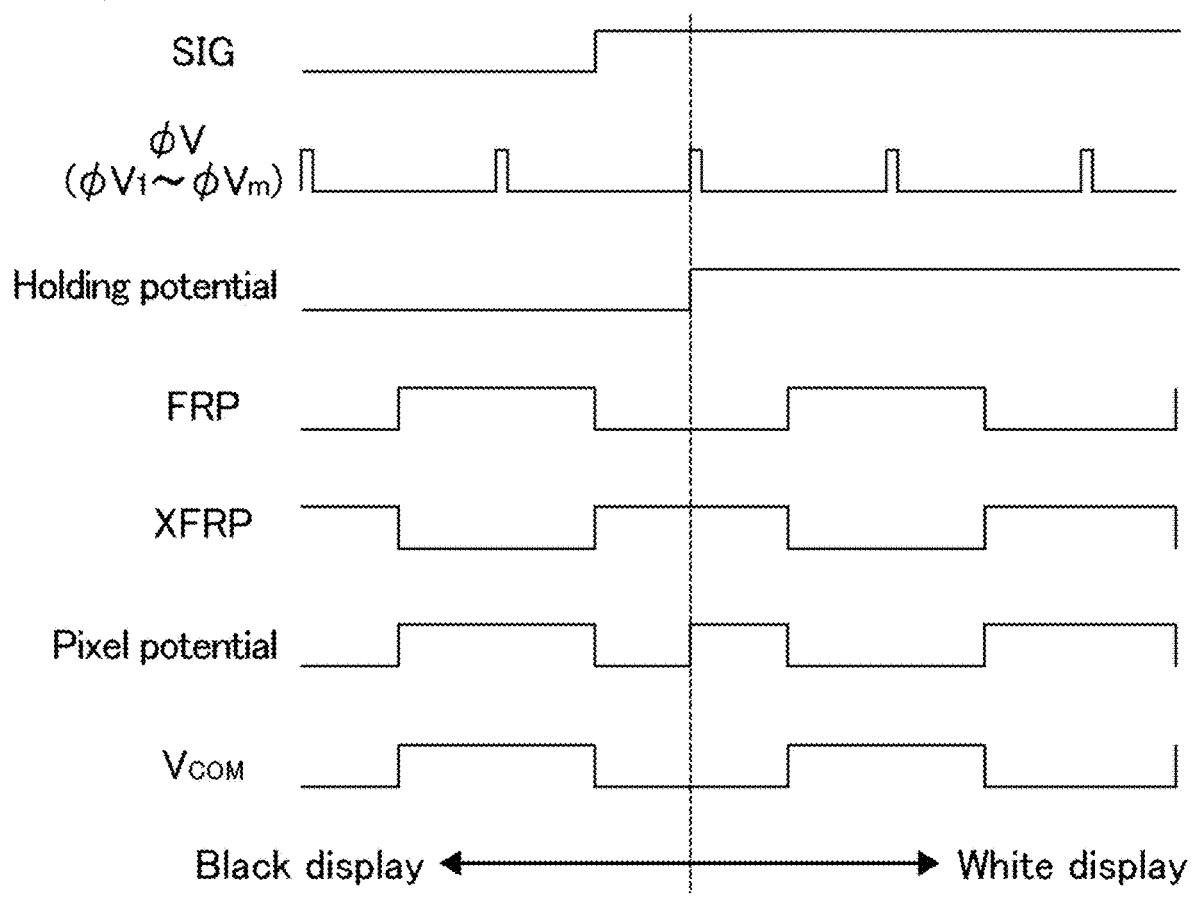
FIG. 27 shows exemplary schematic waveforms of signal voltages for driving the liquid crystal display device and voltages applied to the liquid crystal layer in Modified Example 10.

An MIP mode reflective liquid crystal display device can be achieved by the following structure. FIG. 26 is a circuit diagram showing an exemplary circuit structure of a pixel of the liquid crystal display device of Modified Example 10. FIG. 27 shows exemplary schematic waveforms of signal voltages for driving the liquid crystal display device and voltages applied to the liquid crystal layer in Modified Example 10.

As shown in FIG. 26, each pixel 1PX has a pixel structure including three switching elements 41 to 43, a latch 44, and a liquid crystal cell 45 and having an SRAM function. Here, the liquid crystal cell 45 means a liquid crystal capacity generated between the pixel electrode 560 and the common electrode 540 facing the pixel electrode 560.

The switching element 41 has an end connected to the gate line 501 and is turned on (closed) when receiving a scanning signal ϕV (ϕ1 to ϕVm) to import data SIG supplied through the gate line 501. The latch 44 includes antiparallel-connected inverters 441 and 442 and holds (latches) the potential according to the data SIG imported by the switching element 41.

One of the switching elements 42 or 43 is turned on according to the polarity of the potential held by the latch 44 and then provides, in the liquid crystal cell 45 where the common potential (common output) Vcom is applied to the common electrode 540, the pixel electrode 560 with a control pulse FRP that is in the same phase as the common potential Vcom or a control pulse XFRP that is in the reverse phase to the common potential Vcom. The node commonly connecting an end of the switching element 42 and an end of the switching element 43 is an output node Nout of the present pixel circuit.

As clearly shown in FIG. 27, when the latch 44 holds a negative holding potential, black display is provided because the pixel potential of the liquid crystal cell 45 is in the same phase as the common potential Vcom, while when the latch 44 holds a positive holding potential, white display is provided because the pixel potential of the liquid crystal cell 45 is in the reverse phase to the common potential Vcom.

The present modified example shows a case using SRAM memories as memories implemented in pixels as an example. For example, a structure using different memories such as DRAM memories is also applicable.

This MIP mode active matrix liquid crystal display device includes a memory for each pixel 1PX and thus achieves both analog display mode display and memory display mode display as described. Additionally, the liquid crystal display device can advantageously reduce the power consumption in the memory display mode because display is performed using the pixel data stored in the memories and has no need for writing a signal potential reflecting the scale value for each frame period.

Meanwhile, there is a need for partly rewriting the display screen, i.e., rewriting only a part of the display screen. In this case, the pixel data is partly rewritten. Partly rewriting the display screen, i.e., rewriting a part of the pixel data can eliminate the need for sending the pixel data not to be rewritten. Accordingly, the amount of data to be sent can be reduced, which can advantageously cause low power consumption of the liquid crystal display device.

The present invention is described below in more detail based on examples and comparative examples. The examples, however, are not intended to limit the scope of the present invention.

Example 1

Figure 28:
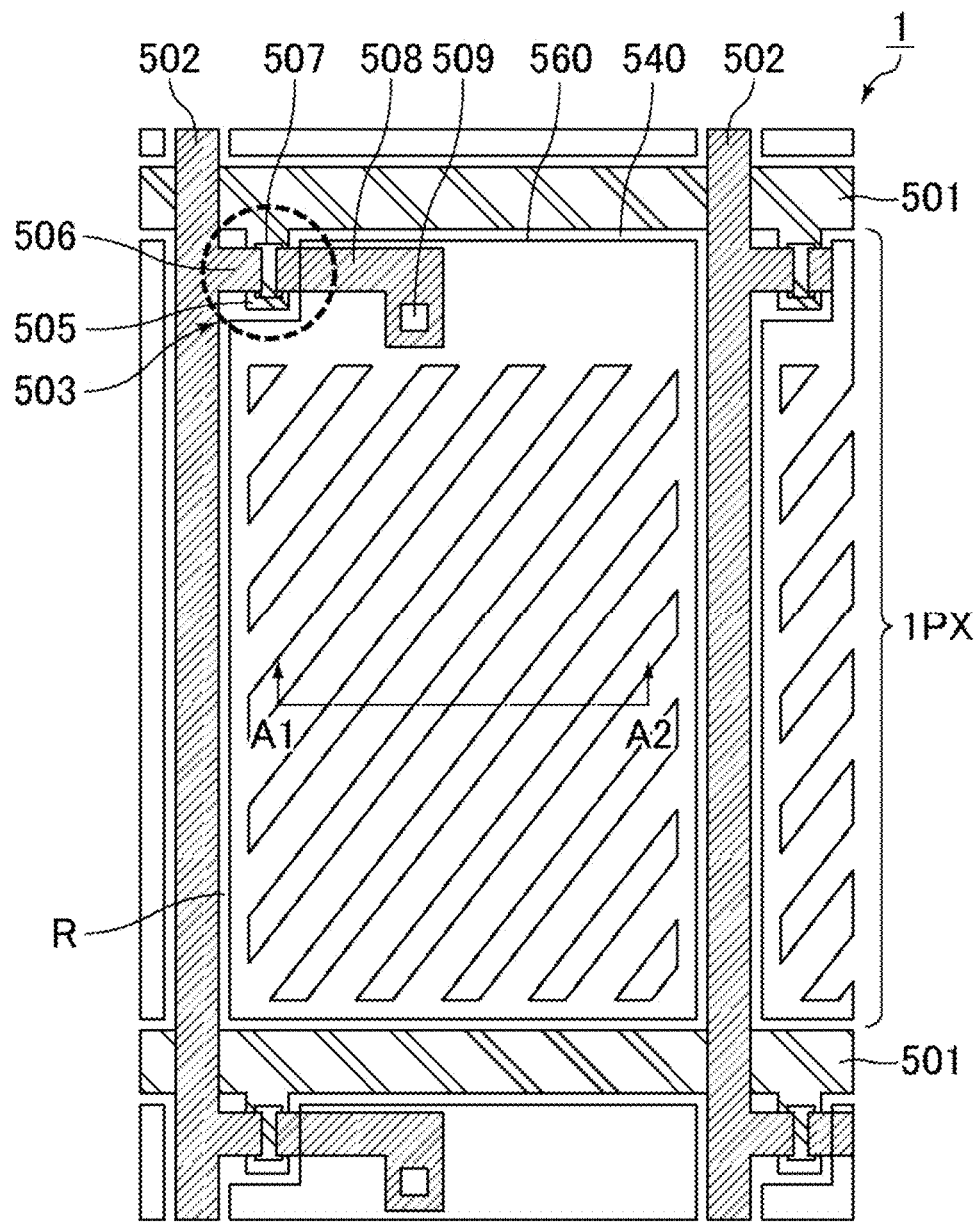
FIG. 28 is a schematic plan view of a liquid crystal display device of Example 1.
Figure 29:
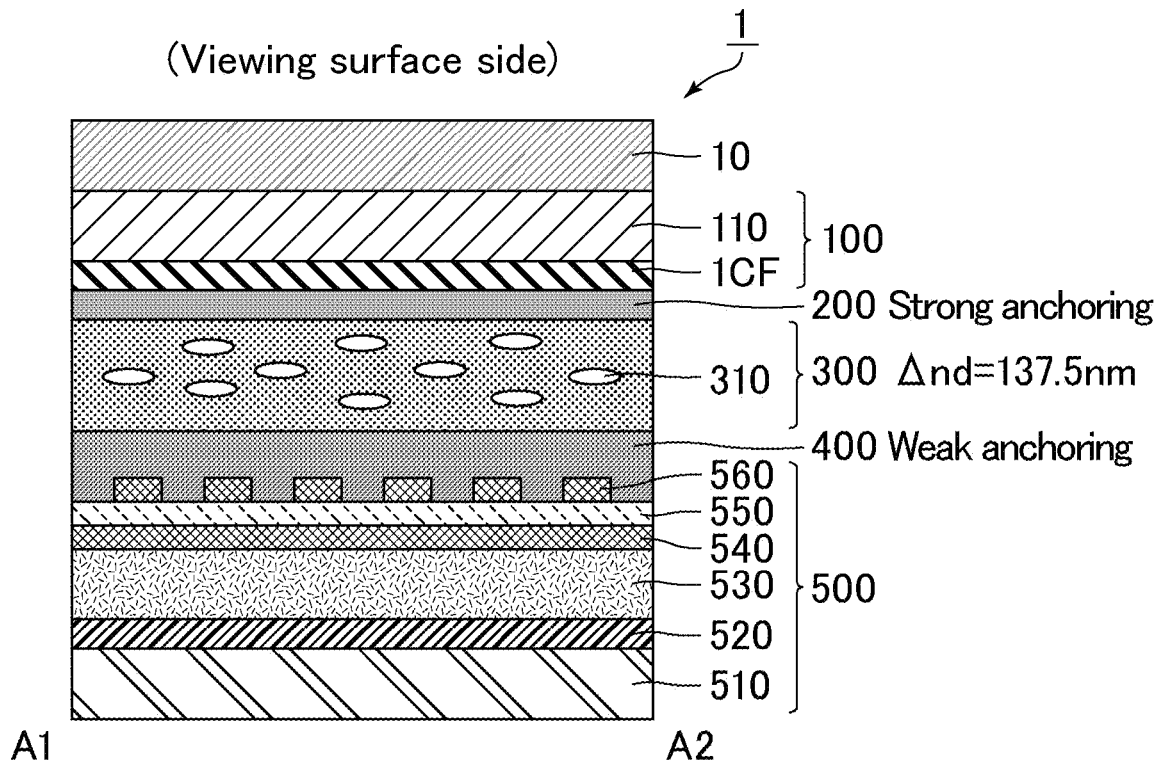
FIG. 29 is a schematic cross-sectional view of the liquid crystal display device of Example 1.
Figure 30:
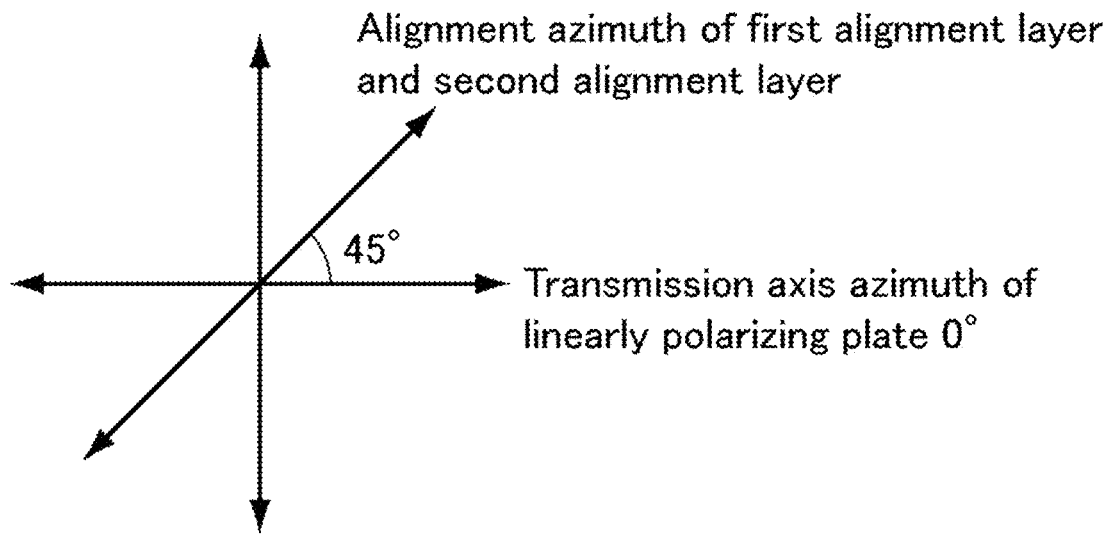
FIG. 30 is a figure showing the transmission axis azimuth of a polarizing plate and the alignment azimuth of first and second alignment layers of each of liquid crystal display devices of Examples 1 and 2.

FIG. 28 is a schematic plan view of a liquid crystal display device of Example 1. FIG. 29 is a schematic cross-sectional view of the liquid crystal display device of Example 1. FIG. 30 is a figure showing the transmission axis azimuth of a polarizing plate and the alignment azimuth of first and second alignment layers of each of liquid crystal display devices of Examples 1 and 2. Prepared were the second substrate 500 including the insulating substrate 510, the reflective layer 520, the flattening film 530, the common electrode 540, the insulating film 550, and the pixel electrodes 560 and the first substrate 100 including the insulating substrate 110, the color filter layer 1CF, and photo spacers. Furthermore, on the first substrate 100 was formed the first alignment layer 200 (rubbed alignment layer) by forming a film of an alignment film material containing polyimide as the polymer for a rubbed alignment layer and rubbing the film. Also, on the second substrate 500 was formed the second alignment layer 400 (untreated alignment layer) by forming a film of an alignment film material containing polyhexyl methacrylate (PHMA) as the polymer for an alignment film.

Subsequently, a pattern was formed on the second substrate 500 with a sealing material curable by heat and UV light using a dispenser, and the first substrate 100 and the second substrate 500 were attached to each other with the liquid crystal layer 300 in between to produce a cell. The attaching seal was UV cured with the part other than the seal pattern covered with a mask for blocking UV light. The liquid crystal material used was positive liquid crystal having a positive anisotropy of dielectric constant ($\Delta\varepsilon$=6.9, $\Delta$n=0.068).

Then, the cell was heated at 130° C. for 40 minutes to realign liquid crystal molecules, whereby an FFS liquid crystal panel was obtained in which liquid crystal molecules were aligned uniformly and uniaxially. Furthermore, the linearly polarizing plate 10 was disposed on the viewing surface side of the first substrate 100 of the above-obtained liquid crystal panel, whereby the liquid crystal display device 1 of Example 1 as shown in FIG. 28 to FIG. 30 was obtained. When an azimuth is defined to be positive in the counterclockwise direction from the horizontally right direction of the display surface of the liquid crystal display device 1 as a reference azimuth (0°), the transmission axis azimuth of the linearly polarizing plate 10 was 0°, the alignment azimuth of the first alignment layer 200 and the alignment azimuth of the second alignment layer 400 were 45°, and the extending direction of the slits in the pixel electrodes 560 was 52°.

In Example 1, the first alignment layer 200 was a strong anchoring alignment layer, and the azimuthal anchoring energy value of the first alignment layer 200 was 6×10$^{-3}$ J/m$^2$. The second alignment layer 400 was a weak anchoring alignment layer, and the azimuthal anchoring energy value of the second alignment layer 400 was 6×10$^{-6}$ J/m$^2$. The retardation $\Delta$nd of the liquid crystal layer 300 in the reflection region was 137.5 nm.

The azimuthal anchoring energy value of each alignment layer used in the examples and comparative examples was quantified through the following steps.

1) A reference liquid crystal cell is produced in which reference strong anchoring alignment layers sandwich a liquid crystal layer. The reference strong anchoring alignment layers are, for example, alignment layers having an azimuthal anchoring energy value of 1×10$^{-3}$ J/m$^2$ or more and are more specifically commercially available products such as AL1254, AL3046, and AL16301 (available from JSR Corporation) and SE2414 and SE6414 (available from Nissan Chemical Corporation). In the examples and comparative examples in the present description, AL16301 available from JSR Corporation was used, and the alignment layer was subjected to a rubbing treatment under the conditions of a stage moving speed of 15 mm/s, a rubbing roller rotating speed of 500 rpm, and a feeding amount of 0.4 mm.

2) An object liquid crystal cell is produced which has the same structure as the reference liquid crystal cell except that the liquid crystal layer is sandwiched by alignment layers that are objects for calculating the azimuthal anchoring energy.

3) In each of the reference liquid crystal cell and the object liquid crystal cell, the voltage-transmittance property (VT property) is determined, and the threshold voltage corresponding to 10% transmittance is determined.

4) The azimuthal anchoring energy A is calculated according to the following formula.

$$A = 2 \times K_{22} / [\{(V_{ths}/V_{thw}) - 1\} \times d]$$

In the formula, $K_{22}$ represents the twist elastic constant of liquid crystal, $V_{ths}$ represents the threshold voltage corresponding to 10% transmittance of the reference cell, $V_{thw}$ represents the threshold voltage corresponding to 10% transmittance of the object liquid crystal cell, and d represents the cell thickness.

The liquid crystal display device of Example 1 had a maximum reflectance of 24.3%, a contrast ratio of 27, and an image-sticking luminance ratio of 1.24. The maximum reflectance of the liquid crystal display device was calculated by measuring the reflectance under application of voltage to the liquid crystal display device and normalizing the highest reflectance with respect to the reflectance of the second substrate. The determination was performed with CM700d available from KONICA MINOLTA, INC. Hereinafter, the highest reflectance is referred to as white reflectance, and the reflectance in the state of black display is referred to as black reflectance. The contrast ratio of the liquid crystal display device was calculated by dividing the white reflectance with the black reflectance. The image-sticking luminance ratio of the liquid crystal display device was determined by performing a current test in which a white-and-black check pattern was displayed on the liquid crystal display device for 24 hours, an image with a scale value of 32 was then displayed on the whole screen (maximum scale value: 255), and the luminance ratio between the white display portion and the black display portion was determined, which was taken as an image-sticking luminance ratio. The luminance was determined with a spectroradiometer SR-UL2 available from Topcon Technohouse Corporation.

Example 2

Figure 31:
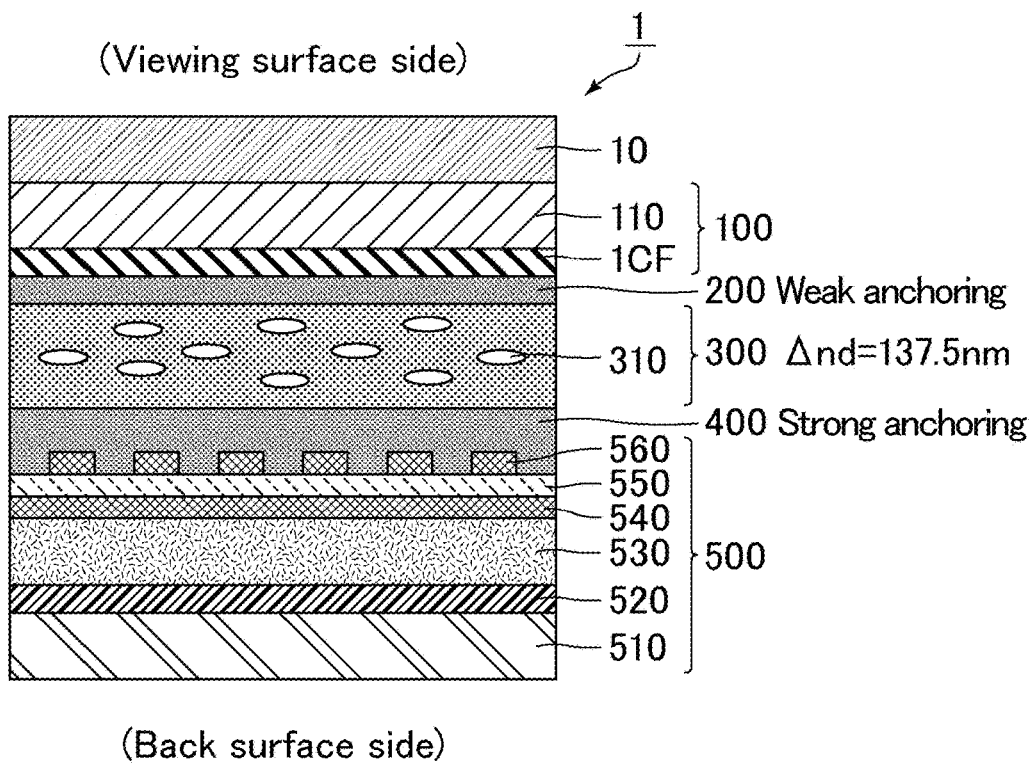
FIG. 31 is a schematic cross-sectional view of the liquid crystal display device of Example 2.

FIG. 31 is a schematic cross-sectional view of the liquid crystal display device of Example 2. The liquid crystal display device 1 of Example 2 as shown in FIG. 30 and FIG. 31 was obtained as in Example 1, except that the first alignment layer 200 (untreated alignment layer) was formed by forming on the first substrate 100 a film of an alignment film material containing PHMA as the polymer for an alignment film and the second alignment layer 400 (rubbed alignment layer) was formed by forming on the second substrate 500 a film of an alignment film material containing polyimide as the polymer for a rubbed alignment layer and performing a rubbing treatment on the film.

In Example 2, the first alignment layer 200 was a weak anchoring alignment layer, and the azimuthal anchoring energy value of the first alignment layer 200 was 6×10$^{-6}$ J/m$^2$. The second alignment layer 400 was a strong anchoring alignment layer, and the azimuthal anchoring energy value of the second alignment layer 400 was 6×10$^{-3}$ J/m$^2$. The retardation $\Delta$nd of the liquid crystal layer 300 in the reflection region was 137.5 nm.

The liquid crystal display device 1 of Example 2 had a maximum reflectance of 27.1%, a contrast ratio of 32, and an image-sticking luminance ratio of 1.13.

Here, the liquid crystal molecules 310 on the side of the substrate provided with the common electrode 540 and the pixel electrodes 560 (hereinafter, the common electrode and the pixel electrodes are also collectively referred to as FFS electrodes) are more influenced by the electric field than the liquid crystal molecules 310 on the side of the substrate not provided with the FFS electrodes and thus are likely to move, while the liquid crystal molecules 310 on the side of the substrate not provided with the FFS electrodes are less likely to move. In Example 1, the first alignment layer 200 on the side of the substrate (first substrate 100) not provided with the FFS electrodes was a strong anchoring alignment layer. In contrast, in Example 2, the first alignment layer 200 was a weak anchoring alignment layer. Thus, Example 2 succeeded in better moving of the first substrate 100 side liquid crystal molecules, which had been less likely to be influenced by the electric field and thus had been less likely to move, than Example 1. This presumably resulted in that the liquid crystal molecules 310 in a wider range were moved and a higher reflectance was achieved in Example 2 than in Example 1.

In addition, the second substrate 500 included the FFS electrodes, and thus the strength of the electric field was greater on the second substrate 500 side than on the first substrate 100 side. In Example 2, the second alignment layer 400, which was located on the second substrate 500 side with a greater electric field strength than the first substrate 100 side, was a strong anchoring alignment layer, which presumably achieved less image sticking than in Example 1.

Example 3

Figure 32:
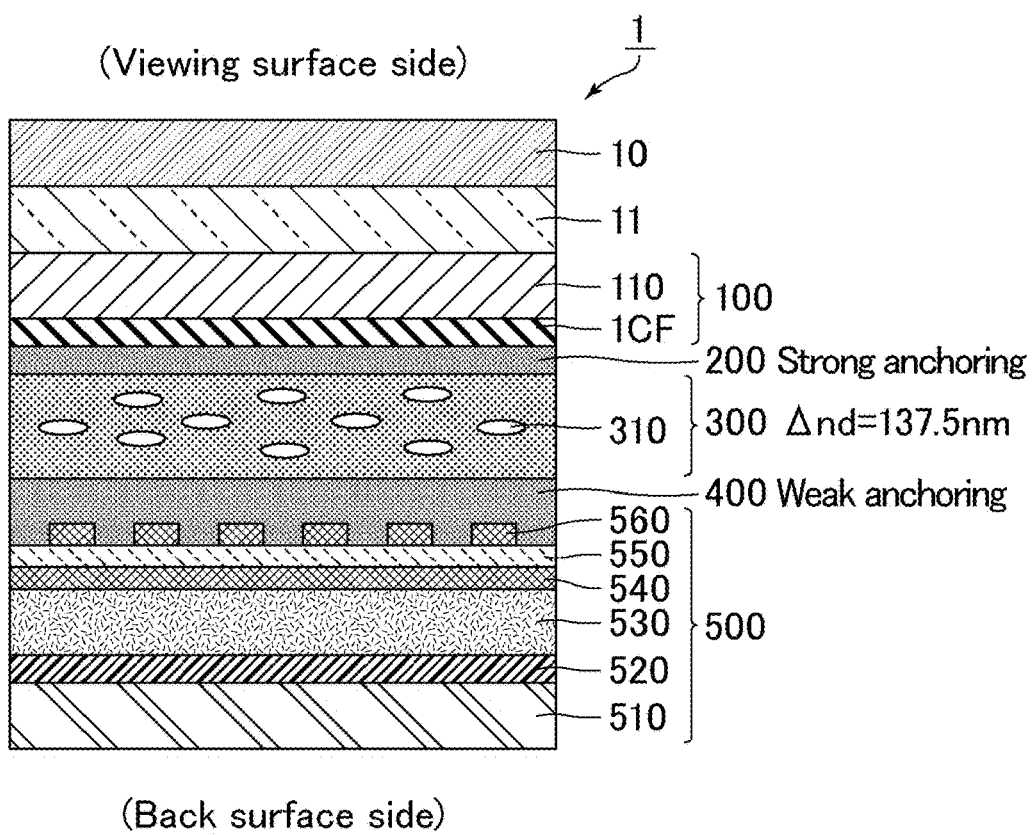
FIG. 32 is a schematic cross-sectional view of a liquid crystal display device of Example 3.
Figure 33:
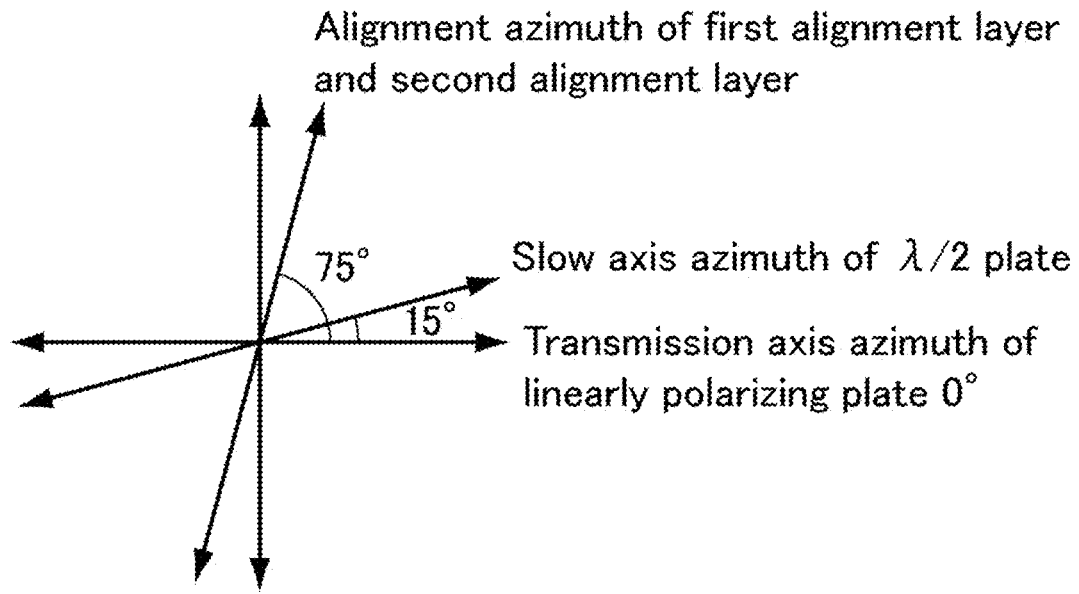
FIG. 33 is a figure showing the transmission axis azimuth of a polarizing plate, the alignment azimuth of first and second alignment layers, and the slow axis azimuth of a $\lambda/2$ plate of each of liquid crystal display devices of Examples 3 and 4.

FIG. 32 is a schematic cross-sectional view of a liquid crystal display device of Example 3. FIG. 33 is a figure showing the transmission axis azimuth of a polarizing plate, the alignment azimuth of first and second alignment layers, and the slow axis azimuth of a λ/2 plate of each of liquid crystal display devices of Examples 3 and 4. The liquid crystal display device 1 of Example 3 as shown in FIG. 32 and FIG. 33 was obtained as in Example 1, except that the alignment azimuths of the first alignment layer 200 and the second alignment layer 400 were changed and the λ/2 plate 11 was disposed on the viewing surface side of the first substrate 100 after obtaining the liquid crystal panel. When an azimuth is defined to be positive in the counterclockwise direction from the horizontally right direction of the display surface of the liquid crystal display device 1 as a reference azimuth (0°), the transmission axis azimuth of the linearly polarizing plate 10 was 0°, the slow axis azimuth of the λ/2 plate 11 was 15°, the alignment azimuth of the first alignment layer 200 and the alignment azimuth of the second alignment layer 400 were 75°, and the extending direction of the slits in the pixel electrodes 560 was 85°.

In Example 3, the first alignment layer 200 was a strong anchoring alignment layer, and the azimuthal anchoring energy value of the first alignment layer 200 was $6 \times 10^{-3}$ J/m². The second alignment layer 400 was a weak anchoring alignment layer, and the azimuthal anchoring energy value of the second alignment layer 400 was $6 \times 10^{-6}$ J/m². The retardation Δnd of the liquid crystal layer 300 in the reflection region was 137.5 nm.

The liquid crystal display device of Example 3 had a maximum reflectance of 24.1%, a contrast ratio of 75, and an image-sticking luminance ratio of 1.24. Example 3 employed the λ/2 plate 11 between the first substrate 100 and the linearly polarizing plate 10 and thereby more increased the contrast ratio than Example 1.

Example 4

Figure 34:
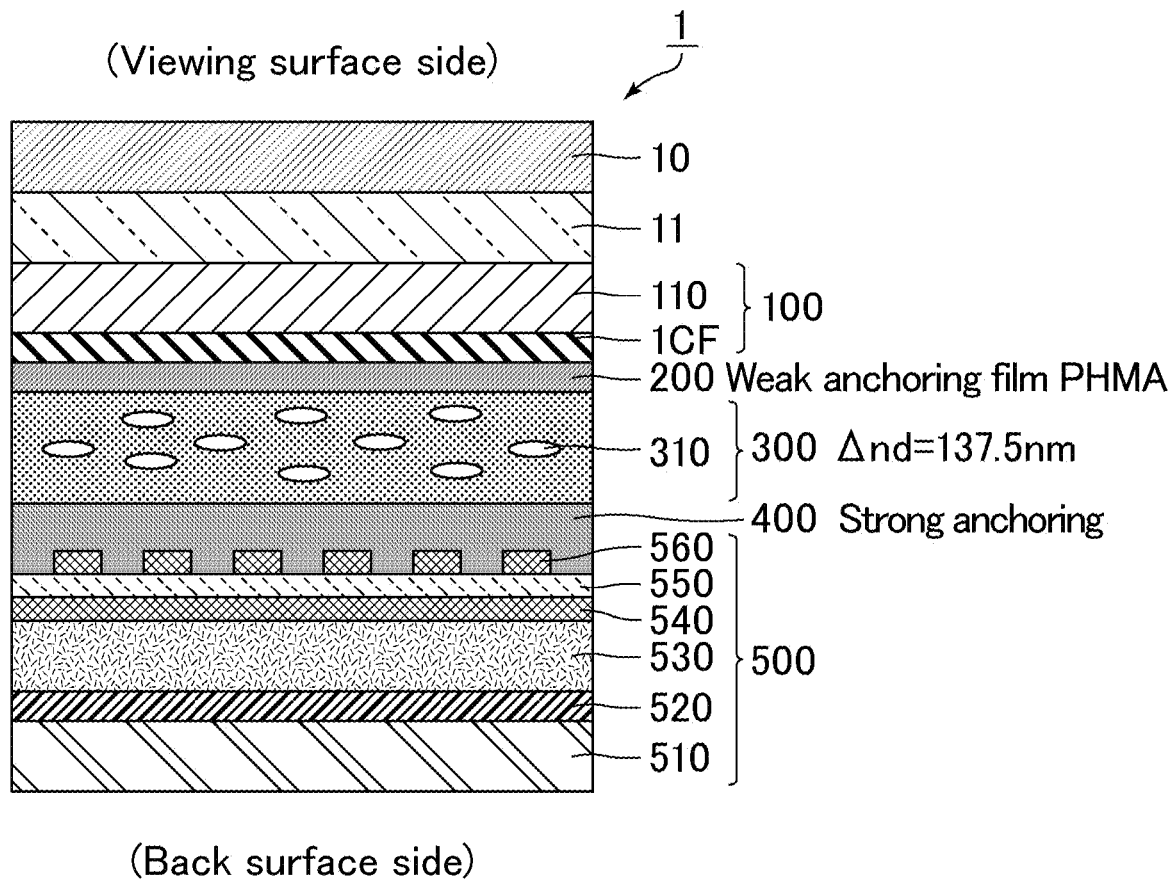
FIG. 34 is a schematic cross-sectional view of the liquid crystal display device of Example 4.

FIG. 34 is a schematic cross-sectional view of the liquid crystal display device of Example 4. The liquid crystal display device 1 of Example 4 as shown in FIG. 33 and FIG. 34 was obtained as in Example 3, except that the first alignment layer 200 (untreated alignment layer) was formed by forming on the first substrate 100 a film of an alignment film material containing PHMA as the polymer for an alignment film and the second alignment layer 400 (rubbed alignment layer) was formed by forming on the second substrate 500 a film of an alignment film material containing polyimide as the polymer for a rubbed alignment layer and performing a rubbing treatment on the film.

In Example 4, the first alignment layer 200 was a weak anchoring alignment layer, and the azimuthal anchoring energy value of the first alignment layer 200 was $6 \times 10^{-6}$ J/m². The second alignment layer 400 was a strong anchoring alignment layer, and the azimuthal anchoring energy value of the second alignment layer 400 was $6 \times 10^{-3}$ J/m². The retardation Δnd of the liquid crystal layer 300 in the reflection region was 137.5 nm.

The liquid crystal display device 1 of Example 4 had a maximum reflectance of 27.0%, a contrast ratio of 91, and an image-sticking luminance ratio of 1.13. Example 4 could improve the reflectance and reduce image sticking by using the first alignment layer 200 and the second alignment layer 400 of Example 2, and could improve the contrast ratio by using the λ/2 plate 11 used in Example 3.

Comparative Example

Figure 35:
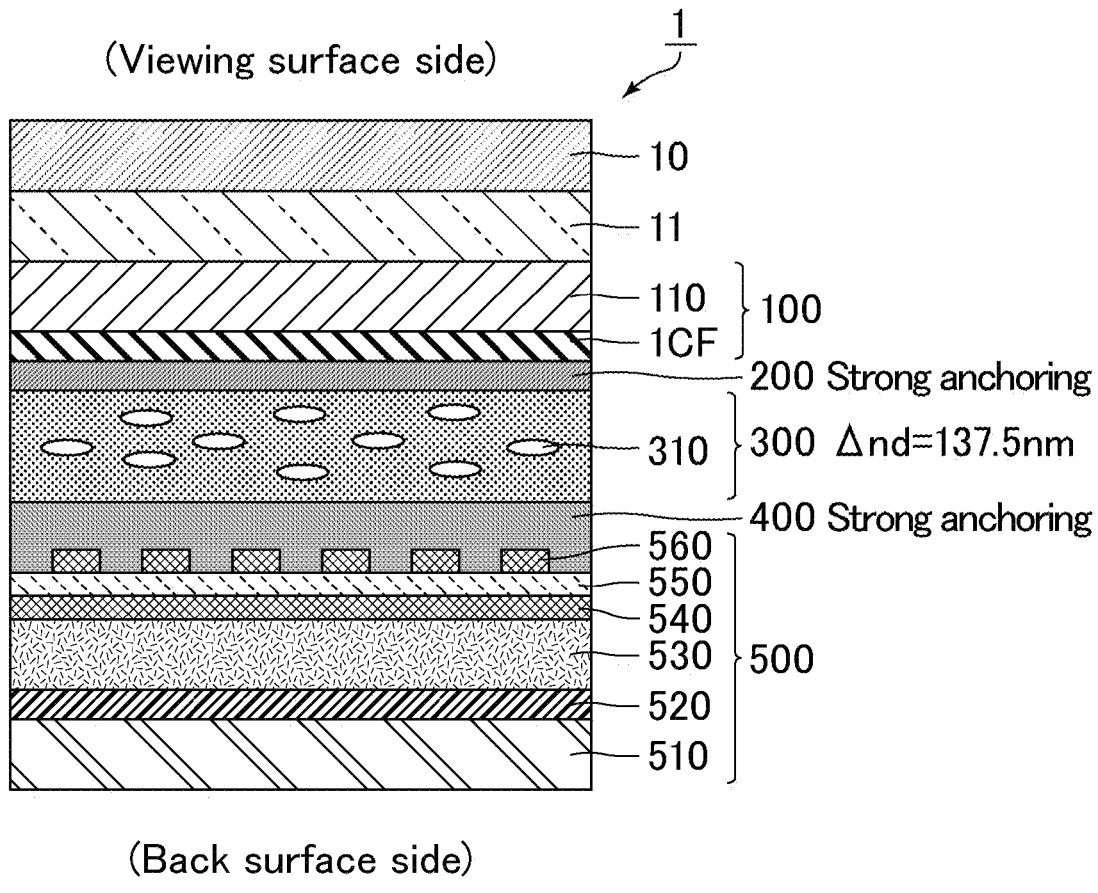
FIG. 35 is a schematic cross-sectional view of a liquid crystal display device of Comparative Example.
Figure 36:
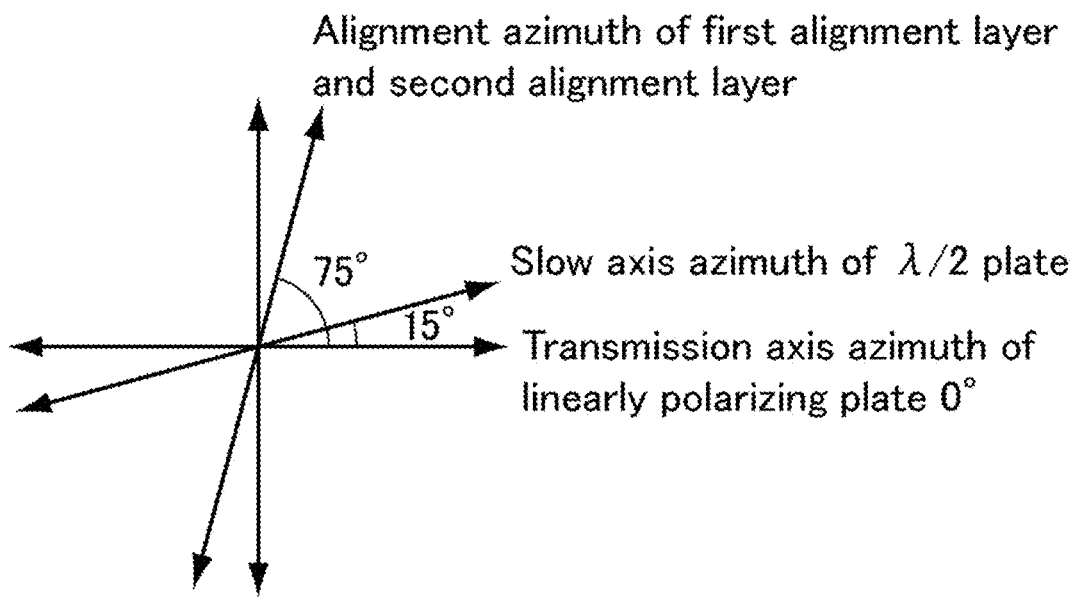
FIG. 36 is a figure showing the transmission axis azimuth of a polarizing plate, the alignment azimuth of first and second alignment layers, and the slow axis azimuth of a $\lambda/2$ plate of the liquid crystal display device of Comparative Example.

FIG. 35 is a schematic cross-sectional view of a liquid crystal display device of Comparative Example. FIG. 36 is a figure showing the transmission axis azimuth of a polarizing plate, the alignment azimuth of first and second alignment layers, and the slow axis azimuth of a λ/2 plate of the liquid crystal display device of Comparative Example. The liquid crystal display device 1R of Comparative Example as shown in FIG. 35 and FIG. 36 was obtained as in Example 3, except that the second alignment layer 400 (rubbed alignment layer) was formed by forming on the second substrate 500 a film of an alignment film material containing polyimide as the polymer for a rubbed alignment layer and performing a rubbing treatment on the film.

In Comparative Example, the first alignment layer 200 and the second alignment layer 400 were both strong anchoring alignment layers, and the azimuthal anchoring energy value thereof was $6 \times 10^{-3}$ J/m². The retardation Δnd of the liquid crystal layer 300 in the reflection region was 137.5 nm.

The liquid crystal display device of Comparative Example had a maximum reflectance of 20.5%, a contrast ratio of 23, and an image-sticking luminance ratio of 1.04.

Evaluation of Examples 3 and 4 and Comparative Example

The maximum reflectance of the liquid crystal display device was 20.5% in Comparative Example, 24.1% in Example 3, and 27.0% in Example 4. The FFS mode reflective liquid crystal display devices in Examples 3 and 4 had a structure in which one of the first alignment layer 200 or the second alignment layer 400 was a weak anchoring (zero in-plane anchoring, slippery interface) alignment layer and thereby the substrate on one side had weak anchoring alignment. This presumably allowed the liquid crystal molecules 310 around the substrate, which had not been conventionally moved, to move and could increase the modulation width of the Δnd of the liquid crystal layer 300. As a result, Examples 3 and 4 could presumably achieve a higher reflectance than Comparative Example and achieve a high reflectance comparable to a vertical electric field mode liquid crystal display device. Examples 3 and 4 could also achieve voltage reduction as well as the high reflectance.

Figure 37:
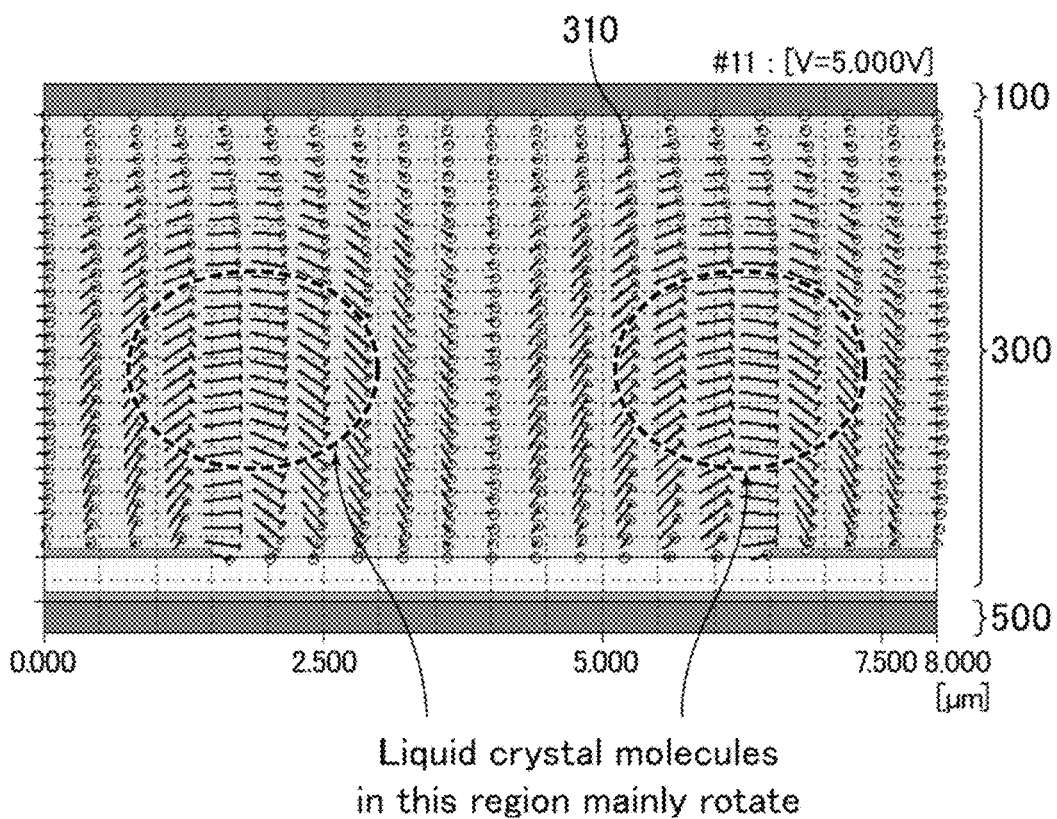
FIG. 37 shows a simulation result obtained by calculating the alignment state of liquid crystal molecules in the liquid crystal display device of Comparative Example.
Figure 38:
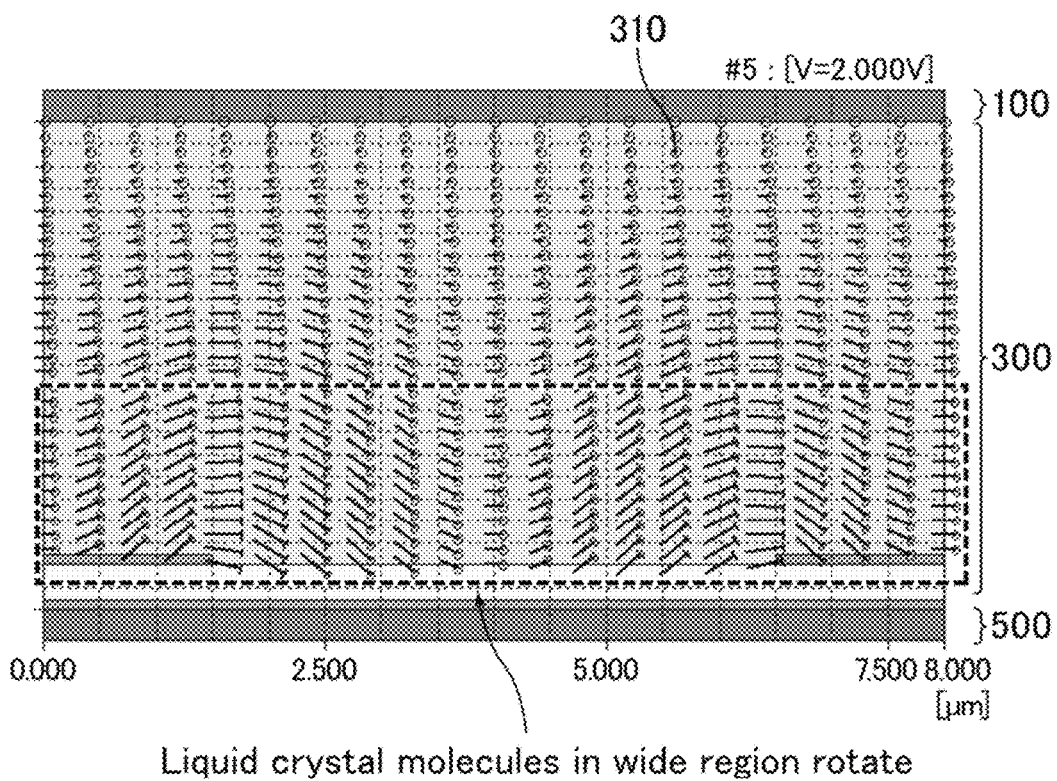
FIG. 38 shows a simulation result obtained by calculating the alignment state of liquid crystal molecules in the liquid crystal display device of Example 3.
Figure 39:
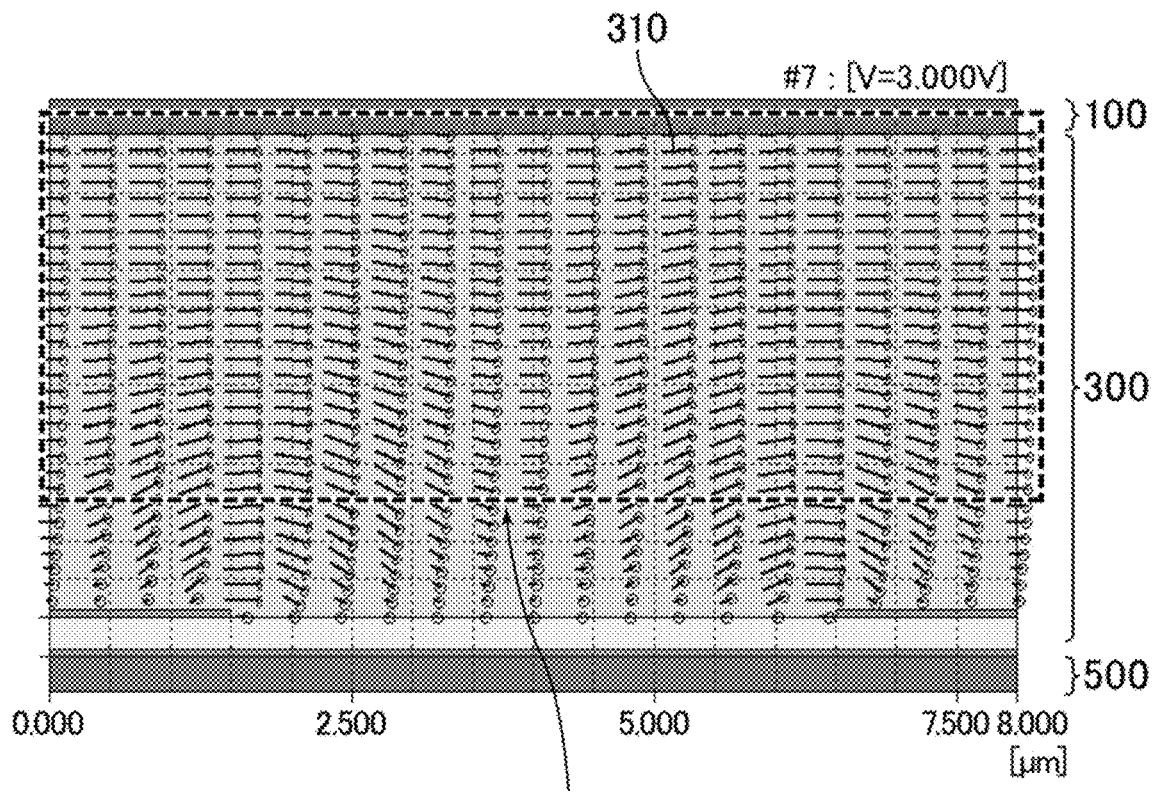
FIG. 39 shows a simulation result obtained by calculating the alignment state of liquid crystal molecules in the liquid crystal display device of Example 4.
Figure 40:
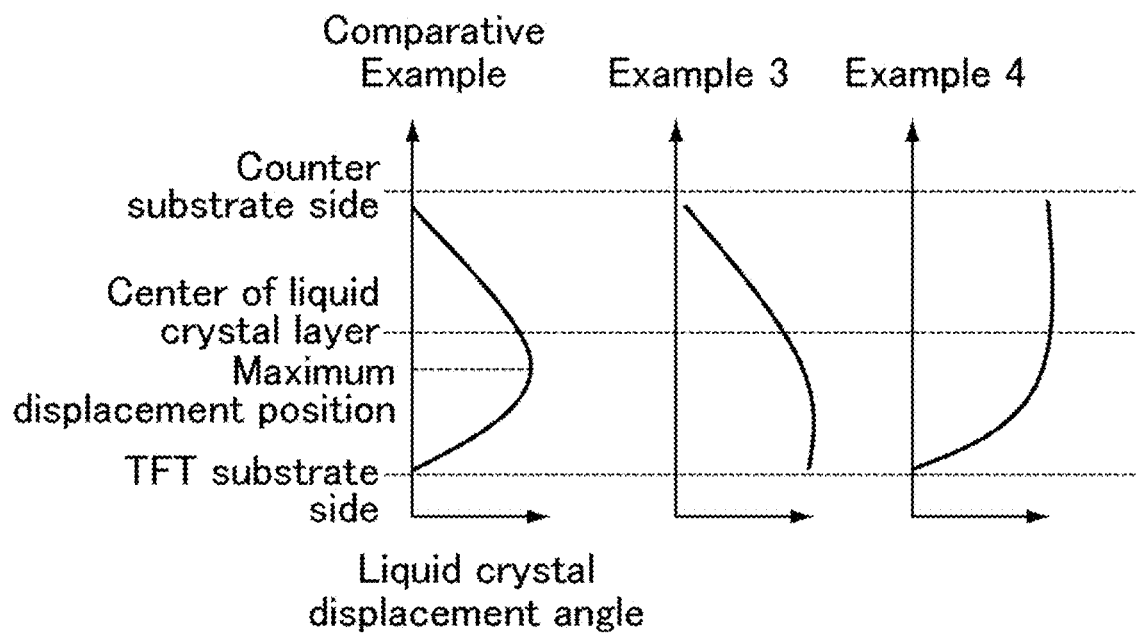
FIG. 40 is a figure showing a simulation result obtained by calculating the displacement angle of liquid crystal molecules relative to the thickness of the liquid crystal layer in each of the liquid crystal display devices of Examples 3 and 4 and Comparative Example.

FIG. 37, FIG. 38, and FIG. 39 show simulation results obtained by calculating the alignment state of liquid crystal molecules in the liquid crystal display devices of Comparative Example, Example 3, and Example 4, respectively. FIG. 40 is a figure showing a simulation result obtained by calculating the displacement angle of liquid crystal molecules relative to the thickness of the liquid crystal layer in each of the liquid crystal display devices of Examples 3 and 4 and Comparative Example.

In each of the liquid crystal display devices of Examples 3 and 4 and Comparative Example, the alignment state of liquid crystal molecules was simulated with an LCD-MASTER available from Shintec Co., Ltd. In Example 3, the azimuthal anchoring energy value of the first alignment layer 200 was set to $1\times10^{-3}$ J/m$^2$, and the azimuthal anchoring energy value of the second alignment layer 400 was set to $1\times10^{-7}$ J/m$^2$. In Example 4, the azimuthal anchoring energy value of the first alignment layer 200 was set to $1\times10^{-7}$ J/m$^2$, and the azimuthal anchoring energy value of the second alignment layer 400 was set to $1\times10^{-3}$ J/m$^2$. In Comparative Example, the azimuthal anchoring energy values of the first alignment layer 200 and the second alignment layer 400 were set to $1\times10^{-3}$ J/m$^2$. The results are shown in FIG. 37 to FIG. 40.

As shown in FIG. 37, the liquid crystal molecules 310 in Comparative Example rotated only in intermediate regions in the thickness direction of the liquid crystal layer 300. Thus, the modulation width of the in-plane retardation $\Delta$nd could not be sufficiently increased. Accordingly, light on the reflective layer 520 was not ideal linearly polarized light, and the reflectance was reduced to cause an insufficient bright state.

In contrast, as shown in FIG. 38, the liquid crystal molecules in Example 3 rotated in plane also in a region near the interface on the second substrate 500 side having weak anchoring. Thus, the modulation width of the in-plane retardation $\Delta$nd could be increased and the reflectance could be improved.

Also, as shown in FIG. 39, the liquid crystal molecules 310 in Example 4 rotated in plane also in a region around the interface on the first substrate 100 side having weak anchoring. Here, as shown in FIG. 40, the liquid crystal display device 1R of Comparative Example had a maximum displacement position of liquid crystal molecules on the FFS electrode side with respect to the center of the liquid crystal layer 300 in the thickness direction. Thus, the liquid crystal molecules 310 can be driven in a wider range in the structure in which the first substrate 100 side has weak anchoring than the structure in which the second substrate 500 side provided with the FFS electrodes has weak anchoring. Accordingly, Example 4 could presumably provide a liquid crystal display device having a better reflectance than Example 3. The structure in which the first substrate 100 side has weak anchoring provides a wider modulation width of the retardation $\Delta$nd of the liquid crystal layer 300. Thus, when a liquid crystal display device includes a transmission region, the thickness of the liquid crystal layer 300 in the transmission region can be made smaller than in a conventional FFS mode liquid crystal display device, which is advantageous in terms of response time.

Figure 41:
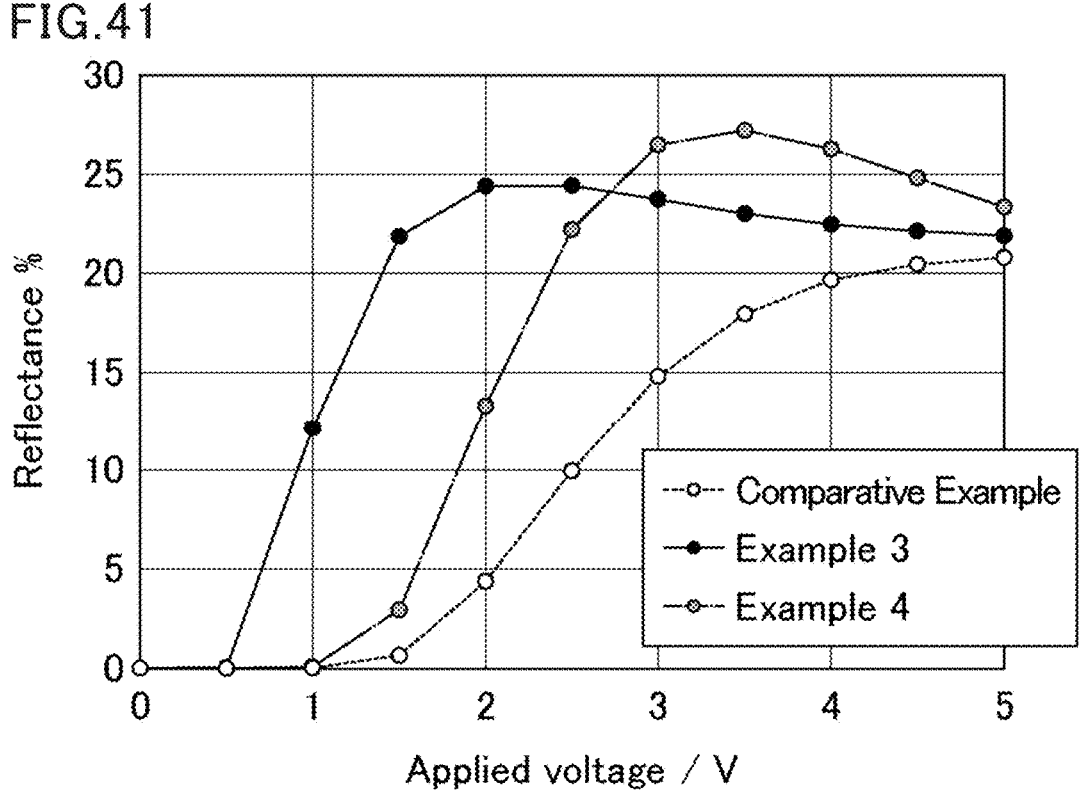
FIG. 41 includes graphs each showing the VR property of each of the liquid crystal display devices of Examples 3 and 4 and Comparative Example.

FIG. 41 is a graph showing the VR property of each of the liquid crystal display devices of Examples 3 and 4 and Comparative Example. The voltage dependency of the reflectance (VR property) of each of the liquid crystal display devices of Examples 3 and 4 and Comparative Example were determined. The determination was performed with CM700d available from KONICA MINOLTA, INC. The results are shown in FIG. 41.

As shown in FIG. 41, Examples 3 and 4 achieved voltage reduction and reflectance improvement in comparison to Comparative Example. Example 3 could provide a liquid crystal display device with lower voltages and low power consumption. Example 4 could provide a liquid crystal display device with a higher reflectance and better brightness.

Example 5

Figure 42:
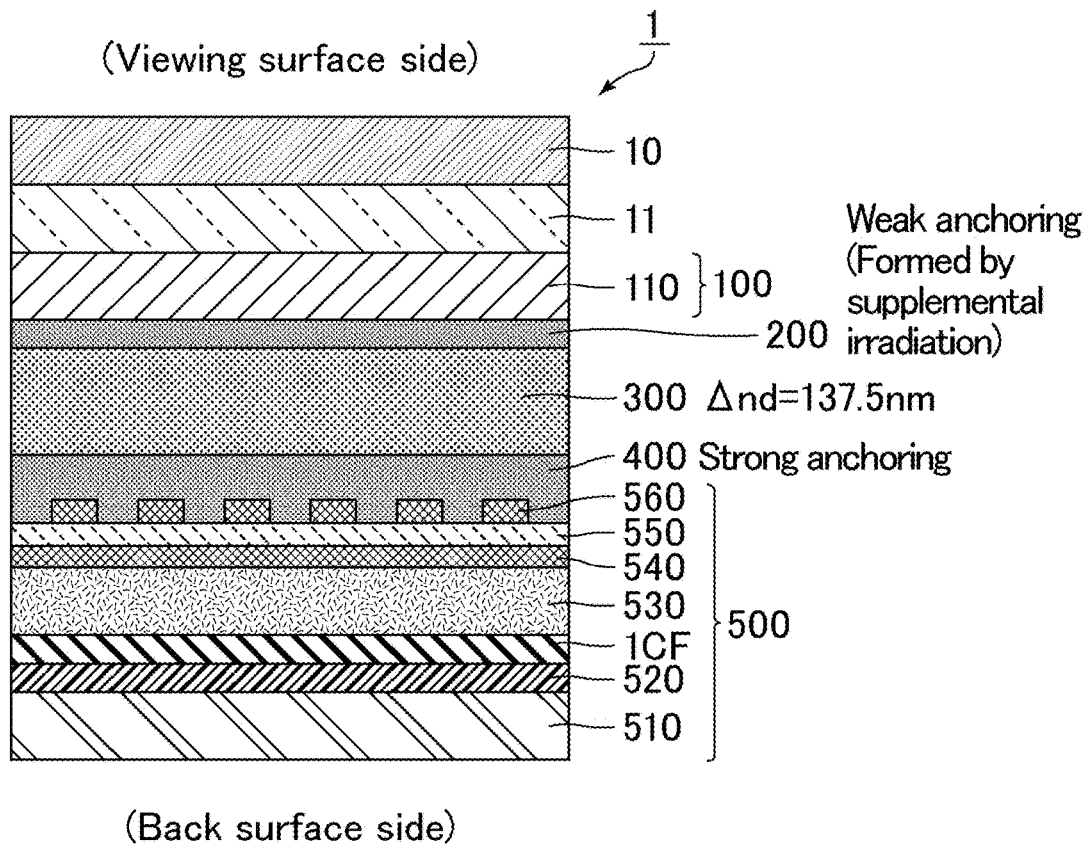
FIG. 42 is a schematic cross-sectional view of a liquid crystal display device of Example 5.
Figure 43:
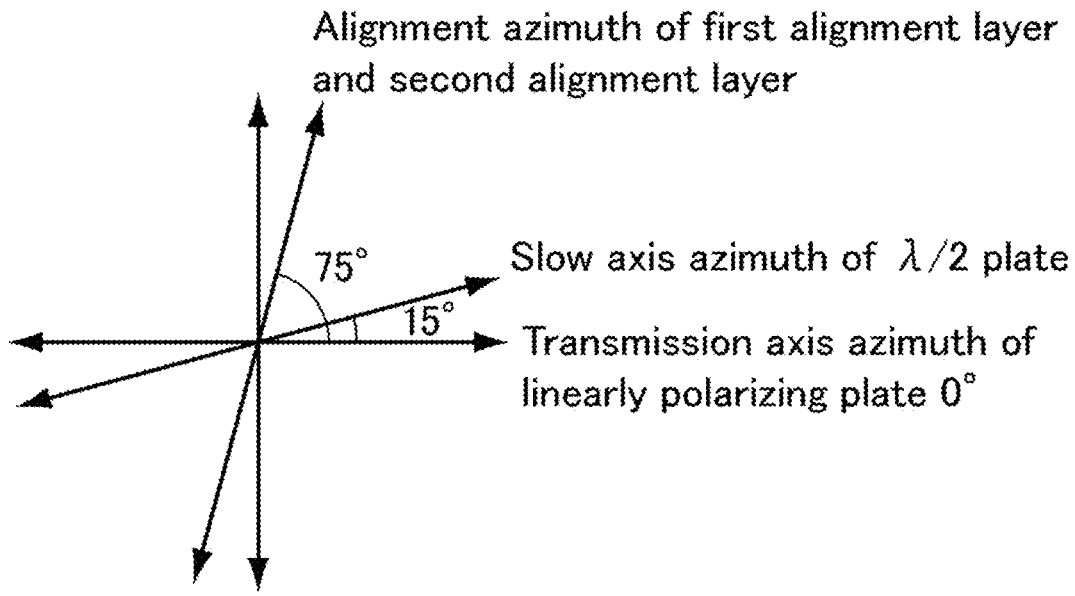
FIG. 43 is a figure showing the transmission axis azimuth of a polarizing plate, the alignment azimuth of first and second alignment layers, and the slow axis azimuth of a $\lambda/2$ plate of the liquid crystal display device of Example 5.

FIG. 42 is a schematic cross-sectional view of a liquid crystal display device of Example 5. FIG. 43 is a figure showing the transmission axis azimuth of a polarizing plate, the alignment azimuth of first and second alignment layers, and the slow axis azimuth of a $\lambda/2$ plate of the liquid crystal display device of Example 5. Prepared were the second substrate 500 including the insulating substrate 510, the reflective layer 520, the color filter layer 1CF, the flattening film 530, the common electrode 540, the insulating film 550, and the pixel electrodes 560, and the first substrate 100 including the insulating substrate 110 and photo spacers. On the first substrate 100 was formed a film of an alignment film material containing as the photo-alignment polymer a polyamic acid represented by the formula (A) (in the formula (A), $R^1$, $R^2$, $R^3$, and $R^4$ are each a hydrogen atom or a hydrocarbon group, $X^1$ is a tetravalent organic group containing a cyclobutane ring, and $Y^1$ is a divalent organic group containing a methacrylate group).

Furthermore, on the second substrate 500 was formed a film of an alignment film material containing a photolysis polymer (degradable photo-alignment film material) as the photo-alignment polymer. After the film formation, the film surface of each substrate was subjected to an alignment treatment by irradiating the film surface with linearly polarized ultraviolet light using a 254-nm bandpass filter and forming the second alignment layer 400 (photo-alignment layer) on the second substrate 500.

Subsequently, a pattern was formed on the second substrate 500 with a sealing material curable by heat and UV light using a dispenser, and the first substrate 100 and the second substrate 500 were attached to each other with the liquid crystal layer 300 in between to produce a cell. The attaching seal was UV cured with the part other than the seal pattern covered with a mask for avoiding UV light. The liquid crystal material used was a material in which 5 wt % of an additive represented by the following formula (L1) was added to positive liquid crystal having a positive anisotropy of dielectric constant ($\Delta\varepsilon$=6.9, $\Delta$n=0.068).

[Chem. 3]

(L1)

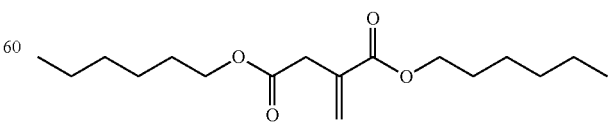

Then, the cell was heated at 130° C. for 40 minutes to realign liquid crystal molecules, whereby an FFS liquid crystal panel was obtained in which liquid crystal molecules were aligned uniformly and uniaxially. The resulting liquid crystal panel was irradiated with UVB having a main wavelength of 313 nm at a dose of 10 J/cm$^2$ from the first substrate 100 side, whereby the first alignment layer 200 (photo-alignment layer) was formed. Thereafter, the λ/2 plate 11 and the linearly polarizing plate 10 were disposed on the viewing surface side of the first substrate 100, whereby the liquid crystal display device of Example 5 as shown in FIG. 42 and FIG. 43 was obtained. When an azimuth is defined to be positive in the counterclockwise direction from the horizontally right direction of the display surface of the liquid crystal display device 1 as a reference azimuth (0°), the transmission axis azimuth of the linearly polarizing plate 10 was 0°, the slow axis azimuth of the λ/2 plate 11 was 15°, the alignment azimuth of the first alignment layer 200 and the alignment azimuth of the second alignment layer 400 were 75°, and the extending direction of the slits in the pixel electrodes 560 was 85°.

In Example 5, the first alignment layer 200 was a weak anchoring alignment layer, and the azimuthal anchoring energy value of the first alignment layer 200 was $2 \times 10^{-7}$ J/m$^2$. The second alignment layer 400 was a strong anchoring alignment layer, and the azimuthal anchoring energy value of the second alignment layer 400 was $1 \times 10^{-3}$ J/m$^2$. The retardation Δnd of the liquid crystal layer 300 in the reflection region was 137.5 nm.

The liquid crystal display device of Example 5 had a maximum reflectance of 29.0%, a contrast ratio of 95, and an image-sticking luminance ratio of 1.07. In Example 5, the first substrate 100 side had a weak anchoring alignment layer, and the second substrate 500 side had strong anchoring. In contrast, both substrate sides had strong anchoring in Comparative Example. Thus, in Example 5, the alignment control force on liquid crystal molecules by the alignment layers was weaker than in Comparative Example, and the movement range of liquid crystal molecules could be increased at a lower voltage. As a result, Example 5 could presumably improve the reflectance at a lower voltage than Comparative Example. Also, in Example 5, the alignment control force on liquid crystal molecules by the alignment layers was weaker than in Comparative Example, which presumably succeeded in achieving a wider movement range of the liquid crystal molecules and a higher reflectance than in Comparative Example.

Examples 3 and 5 employed different materials for forming a weak anchoring layer. Example 5 could achieve less image sticking and a better reflectance than Example 3. In Example 5, the second alignment layer 400 was formed by supplemental irradiation using the additive contained in the liquid crystal layer 300. This demonstrated that, in comparison to Example 3 in which the alignment layer was formed from only an alignment film material, formation of the alignment layer by supplemental irradiation using the additive added to the liquid crystal layer 300 increased the variation of the material and could provide a liquid crystal display device with a better reflectance. The structure in Example 5 requires supplemental irradiation, and the first substrate 100 side needs to transmit ultraviolet light. Thus, the reflective layer 520 and the color filter layer 1CF need to be disposed on the second substrate 500.

Example 6

Figure 44:
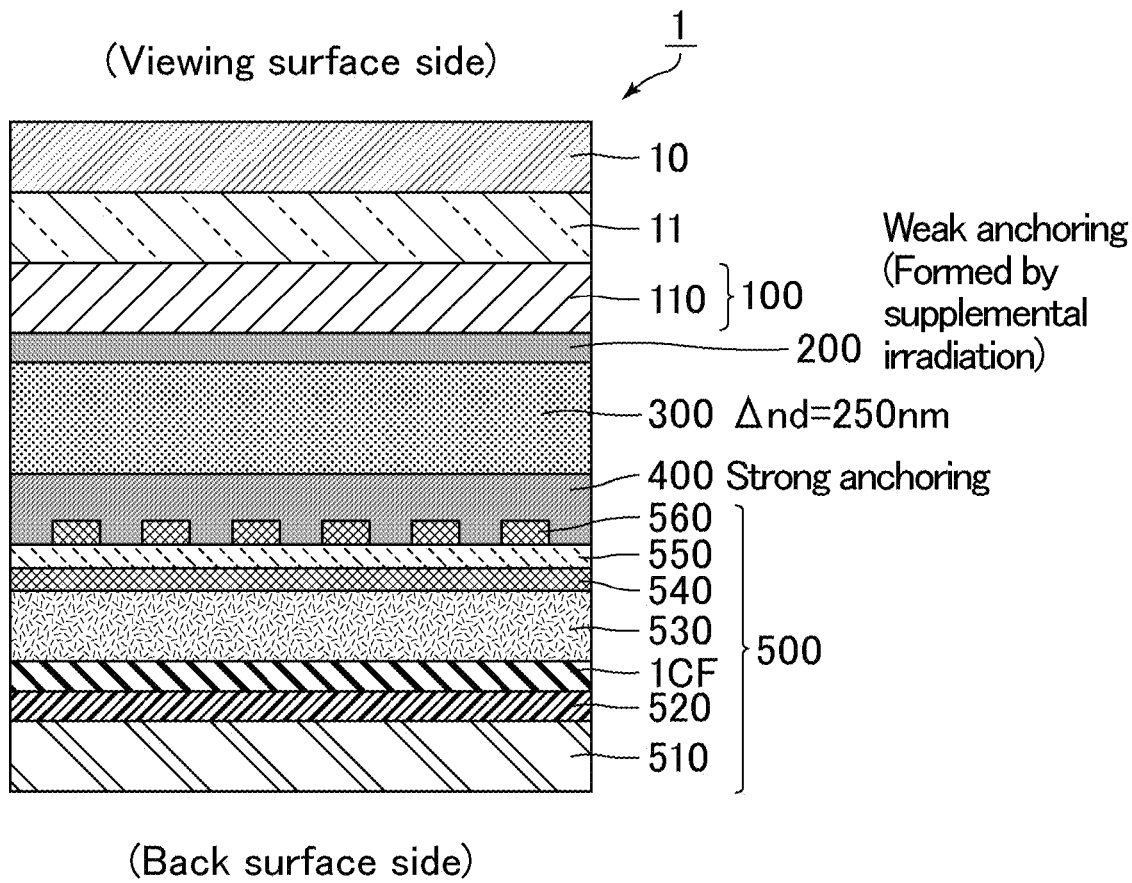
FIG. 44 is a schematic cross-sectional view of a liquid crystal display device of Example 6.
Figure 45:
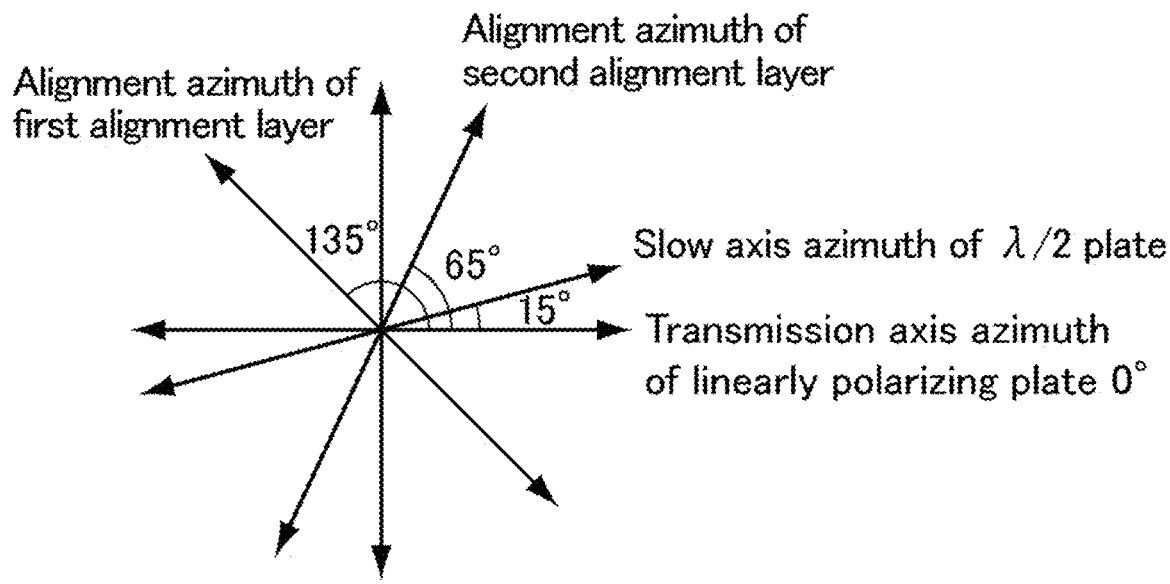
FIG. 45 is a figure showing the transmission axis azimuth of a polarizing plate, the alignment azimuths of first and second alignment layers, and the slow axis azimuth of a $\lambda/2$ plate of the liquid crystal display device of Example 6.

FIG. 44 is a schematic cross-sectional view of a liquid crystal display device of Example 6. FIG. 45 is a figure showing the transmission axis azimuth of a polarizing plate, the alignment azimuths of first and second alignment layers, and the slow axis azimuth of a λ/2 plate of the liquid crystal display device of Example 6. The liquid crystal display device 1 of Example 6 as shown in FIG. 44 and FIG. 45 was obtained as in Example 5, except that the alignment azimuths of the first alignment layer and the second alignment layer and the retardation Δnd of the liquid crystal layer 300 were changed and a chiral agent was added to the liquid crystal layer. When an azimuth is defined to be positive in the counterclockwise direction from the horizontally right direction of the display surface of the liquid crystal display device 1 as a reference azimuth (0°), the transmission axis azimuth of the linearly polarizing plate 10 was 0°, the slow axis azimuth of the λ/2 plate 11 was 15°, the alignment azimuth of the first alignment layer 200 was 135°, the alignment azimuth of the second alignment layer 400 was 65°, and the extending direction of the slits in the pixel electrodes 560 was 110°.

In Example 6, the first alignment layer 200 was a weak anchoring alignment layer, and the azimuthal anchoring energy value of the first alignment layer 200 was $2 \times 10^{-7}$ J/m$^2$. The second alignment layer 400 was a strong anchoring alignment layer, and the azimuthal anchoring energy value of the second alignment layer 400 was $1 \times 10^{-3}$ J/m$^2$. The retardation Δnd of the liquid crystal layer 300 in the reflection region was 250 nm. The chiral pitch of the liquid crystal layer was 13.9 μm. When the alignment azimuth of the first alignment layer 200 is parallel to the alignment azimuth of the second alignment layer 400 as in Examples 1 to 5, the retardation Δnd of the liquid crystal layer 300 is preferably around 137.5 nm. When the alignment azimuth of the first alignment layer 200 is non-parallel to the alignment azimuth of the second alignment layer 400 as in Example 6, the retardation Δnd of the liquid crystal layer 300 is preferably around 250 nm.

The liquid crystal display device of Example 6 had a maximum reflectance of 25.2%, a contrast ratio of 25, and an image-sticking luminance ratio of 1.07. In Example 6, the first substrate 100 side had a weak anchoring alignment layer, and the second substrate 500 side had strong anchoring. In contrast, both substrate sides had strong anchoring in Comparative Example. Thus, in Example 6, the alignment control force on liquid crystal molecules by the alignment layers was weaker than in Comparative Example, and the movement range of liquid crystal molecules could be increased at a lower voltage. As a result, Example 6 could presumably improve the reflectance at a lower voltage than Comparative Example. Also, in Example 6, the alignment control force on liquid crystal molecules 310 by the alignment layers was weaker than in Comparative Example, which presumably succeeded in achieving a wider movement range of the liquid crystal molecules 310 and a higher reflectance than in Comparative Example.

Also, even if the cell has an uneven thickness and thereby the retardation Δnd of the liquid crystal layer 300 has variation, Example 6 uses the liquid crystal molecules 310 aligned in a twisted manner and thus can restrict variation in polarization state of light on the reflective layer 520 and provide a liquid crystal display device with an excellent product quality.

Also, the response time can be improved by using a chiral agent that causes counterrotation to the rotation direction of the liquid crystal molecules 310 contained in the liquid crystal layer 300 in a voltage applied state.

In addition to the embodiment of the present example, embodiments with an appropriately inserted λ/2 plate or λ/4 plate may be applicable.

(VR Property of Examples 1 to 6, Comparative Example, and Reference Example)

Figure 46:
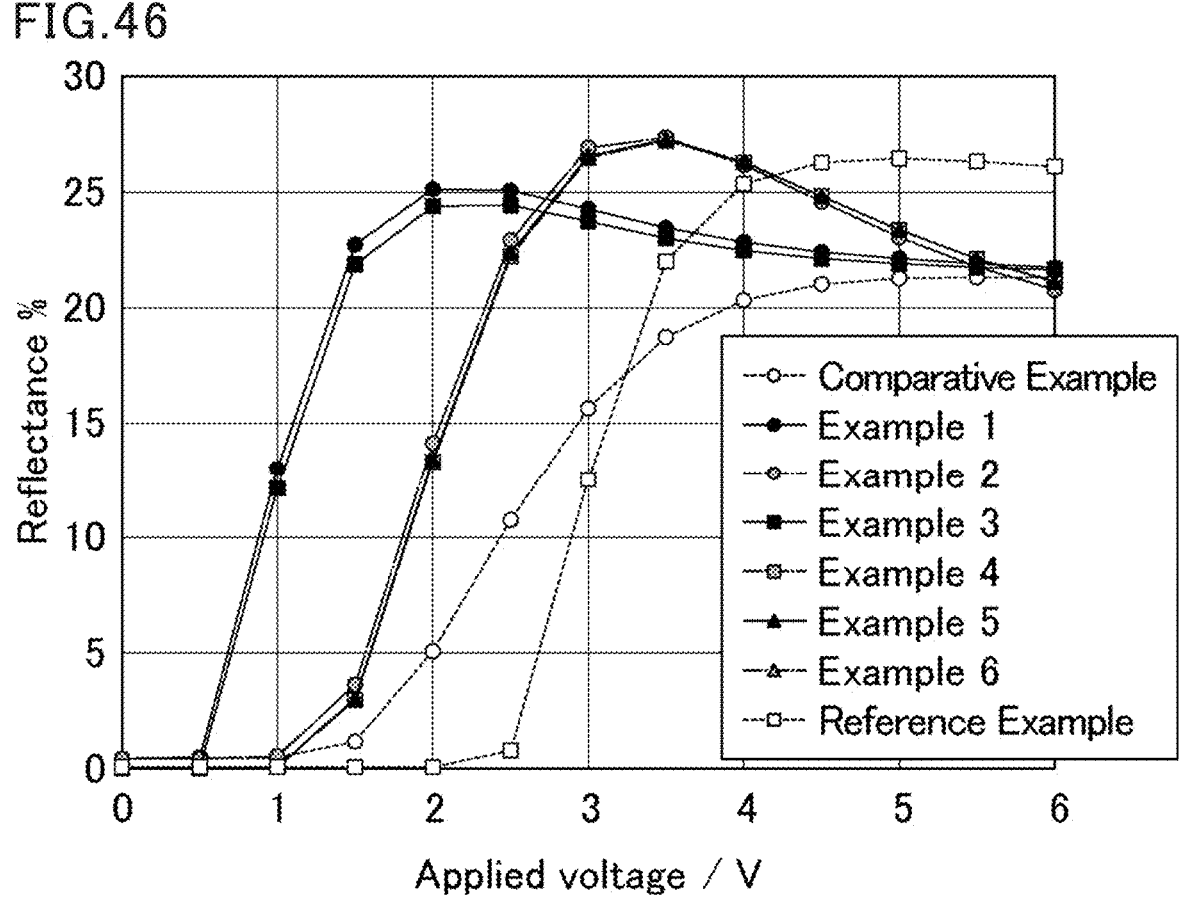
FIG. 46 includes graphs each showing the VR property of each of the liquid crystal display devices of Examples 1 to 6, Comparative Example, and Reference Example.

FIG. 46 is a graph showing the VR property of each of the liquid crystal display devices of Examples 1 to 6, Comparative Example, and Reference Example. In addition to the liquid crystal display devices of Examples 1 to 6 and Comparative Example, the VR property of a vertical electric field mode liquid crystal display device used for a current reflective liquid crystal display device was also determined, and the results are shown in FIG. 46.

The conventional horizontal electric field mode reflective liquid crystal display device (Comparative Example) had a lower reflectance than the current vertical electric field mode reflective liquid crystal display device (Reference Example) and was unsuitable for products. In contrast, Examples 1 to 6 all achieved a reflectance comparable to the vertical electric field mode liquid crystal display device of Reference Example.

Example 7

Figure 47:
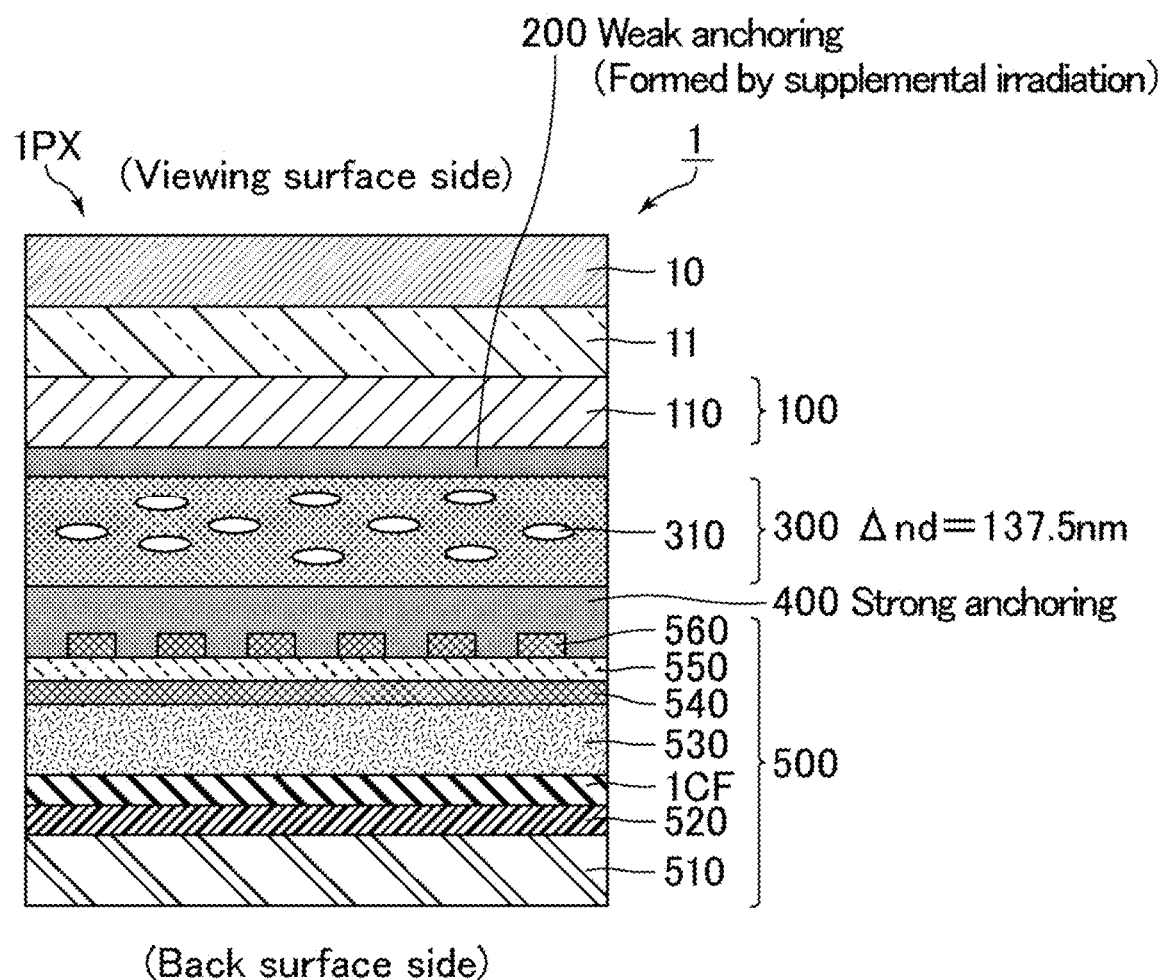
FIG. 47 is a schematic cross-sectional view of a liquid crystal display device of Example 7.

FIG. 47 is a schematic cross-sectional view of a liquid crystal display device of Example 7. The liquid crystal display device 1 of Example 7 that corresponds to Modified Example 10 was produced. Specifically, as shown in FIG. 47, an MIP-driven TFT substrate was prepared as the second substrate 500, including the reflective layer 520, the color filter layer 1CF, photo spacers, the common electrode 540, and the pixel electrodes 560. The common electrode 540 and the pixel electrodes 560 constituted an FFS electrode structure. Each pixel 1PX included the memory circuit (memory circuit portion) 30M and the display voltage supplying circuit (display voltage supplying circuit portion) 30D.

Each pixel 1PX was divided into three sub-pixels (a first sub-pixel 21PX, a second sub-pixel 22PX, and a third sub-pixel 23PX) as shown in FIG. 21. Here, in each pixel, the first sub-pixel 21PXR and the third sub-pixel 23PX were connected to each other, whereby the area of each pixel was substantially divided into two sections at an area ratio of 1:2. Thereby, 64 colors could be displayed based on the calculation: 4 scale patterns×4 scale patterns×4 scale patterns=64 colors.

Furthermore, on the first substrate 100 was formed a film of an alignment film material containing a polyamic acid containing a structure represented by the formula (A) (in the formula (A), $R^1$, $R^2$, $R^3$, and $R^4$ are each a hydrogen atom or a hydrocarbon group, $X^1$ is a tetravalent organic group containing a cyclobutane ring, and $Y^1$ is a divalent organic group containing a methacrylate group). Also, on the second substrate 500 was formed a film of the same degradable photo-alignment film material as that of Example 5.

Subsequently, a pattern was formed on the second substrate 500 with a sealing material curable by heat and UV light using a dispenser, and the first substrate 100 and the second substrate 500 were attached to each other with the liquid crystal layer 300 in between to produce a cell. The attaching seal was UV cured with the part other than the seal pattern covered with a mask for avoiding UV light. The liquid crystal material used was a material in which 0.5 wt % of hexyl methacrylate represented by the formula (L1) was added to positive liquid crystal having a positive anisotropy of dielectric constant ($\Delta\varepsilon=6.9$, $\Delta n=0.068$).

Then, the cell was heated at 130° C. for 40 minutes for realigning liquid crystal molecules, whereby an FFS liquid crystal panel was obtained in which liquid crystal molecules were aligned uniformly and uniaxially. The resulting liquid crystal panel was irradiated with UVB having a main wavelength of 313 nm at a dose of 1 $J/cm^2$ from the first substrate 100 side, whereby the first alignment layer 200 (photo-alignment layer) was formed. Thereafter, the λ/2 plate 11 and the linearly polarizing plate 10 were disposed on the viewing surface side of the first substrate 100, whereby the liquid crystal display device of Example 7 as shown in FIG. 47 was obtained. The arrangement of the axes of the polarizing plate and the λ/2 plate was set to be the same as in Example 5.

In Example 7, the first alignment layer 200 was a weak anchoring alignment layer, and the azimuthal anchoring energy value of the first alignment layer 200 was $2\times10^{-7}$ $J/m^2$. The second alignment layer 400 was a strong anchoring alignment layer, and the azimuthal anchoring energy value of the second alignment layer 400 was $1\times10^{-3}$ $J/m^2$. The retardation Δnd of the liquid crystal layer 300 in the reflection region was 137.5 nm.

Also, the liquid crystal display device of Example 7 had a maximum reflectance of 28.2%, a contrast ratio of 91, and an image-sticking luminance ratio of 1.04.

Here, the image-sticking luminance ratio of the liquid crystal display device of Example 7 was determined by performing a current test by displaying on a half of the screen of the liquid crystal display device a minimum scale image (black/black/black) and on the other half of the screen a maximum scale image (white/white/white) for 24 hours, displaying on the whole screen a gray scale image (black/white/black), and then calculating the luminance ratio between the portion having displayed the maximum scale image and the portion having displayed the minimum scale image. The image sticking test for TFT-driven reflective liquid crystal display devices was performed as described in Example 1. However, the present example used an MIP-driven device does not have a sale value of 32. Thus, the image-sticking luminance ratio was determined by the above-described method.

In area coverage modulation driving in Example 7, each sub-pixel provides only one of white display or black display (an intermediate scale image is displayed using a ratio between black and white). Both white display and black display are each positioned at a saturation point in a graph of VR property. Thus, no luminance difference is caused even after image sticking, whereby image sticking is less likely to be observed.

Figure 48:
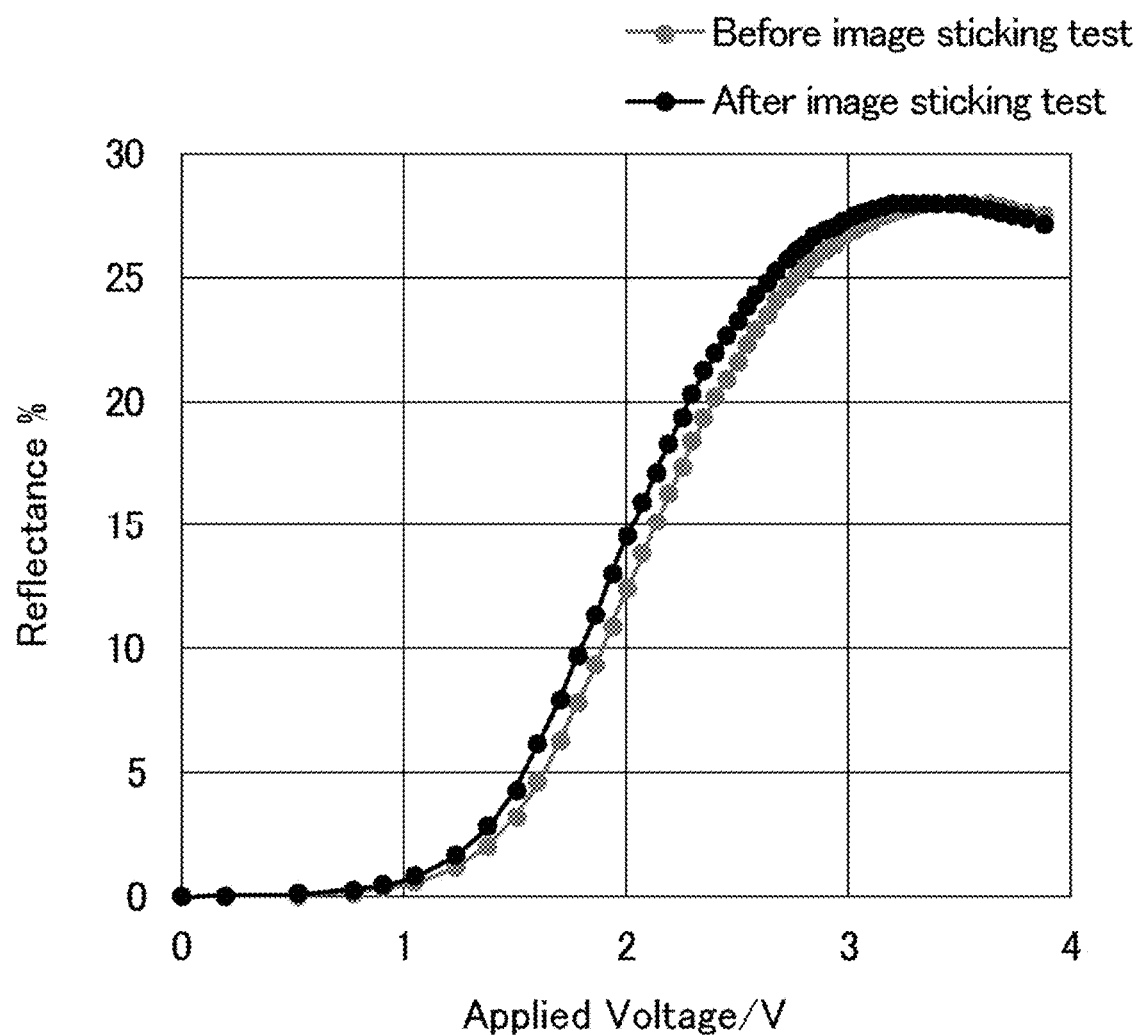
FIG. 48 includes graphs each showing the VR property of an MIP mode liquid crystal display device.

In order to confirm this principle, a liquid crystal element was separately prepared whose reflected luminance could be measured under frequent alternation of the voltage. The material for the alignment layers and the arrangement of the optical axes were the same as in Example 7. In the liquid crystal element, the evaluation results of the VR property before and after the image sticking test were as shown in FIG. 48. FIG. 48 is a graph showing the VR property of an MIP mode liquid crystal display device. The graph shows that the reflectance difference is large around an applied voltage of 2 V. Meanwhile, almost no reflectance difference is caused around 0 V and 3 V. The results presumably show that the MIP mode reflective element of the present example provides an intermediate scale image using a combination of black (0 V) and white (3.2 V) and thus could restrict image sticking.

Also, in terms of the magnitude of driving voltage, Comparative Example requires voltage application at 5 V, while a weak anchoring liquid crystal element, including the present example, requires as low as about 3 to 3.5 V. A lower driving voltage can more reduce accumulation of electric charge and thereby can restrict the change in VR property, which can restrict image sticking. In order to achieve such a low-voltage driving, a high Δε liquid crystal having Δε≥5 can be suitably used.

In Example 7, the first alignment layer 200 was a weak anchoring alignment layer and the second alignment layer 400 was a strong anchoring alignment layer, which corresponds to Embodiment 1. Still, Embodiment 2 in which the first alignment layer 200 is a strong anchoring alignment layer and the second alignment layer 400 is a weak anchoring alignment layer and Embodiment 3 in which the first alignment layer 200 and the second alignment layer 400 are each a weak anchoring alignment layer also can achieve the same effects as in Example 7 by employing an MIP mode device as in Example 7.

(Discussion on Azimuthal Anchoring Energy)

Using an LCD-MASTER available from Shintec Co., Ltd., how the reflectance of a liquid crystal display device having the structure of Example 2 (the first alignment layer 200 was a weak anchoring alignment layer) changed depending on the azimuthal anchoring energy value of the weak anchoring alignment layer was simulated. The results are shown in Table 1. The vertical electric field mode reflective liquid crystal display device of Reference Example had a maximum reflectance of 26%. In Table 1, the cases where the maximum reflectance exceeded 26% were evaluated as OK (Good), and the cases where the maximum reflectance was 90% or more of Reference Example, i.e., a reflectance of 23.4% or more, and less than 26% were evaluated as OK (applicable) which means applicable to practical use.

TABLE 1

| | Azimuthal anchoring energy of second alignment layer | Azimuthal anchoring energy of first alignment layer | Maximum reflectance | Evaluation |
|---|---|---|---|---|
| Corrsponding to Comparative Example | $1 \times 10^{-3}$ J/m$^2$ | $1 \times 10^{-3}$ J/m$^2$ | 21.3% | NG (Poor) |
| | $1 \times 10^{-3}$ J/m$^2$ | $1 \times 10^{-4}$ J/m$^2$ | 21.5% | NG (Poor) |
| | $1 \times 10^{-3}$ J/m$^2$ | $1 \times 10^{-5}$ J/m$^2$ | 24.2% | OK (Applicable) |
| Corrsponding to Example 2 | $1 \times 10^{-3}$ J/m$^2$ | $1 \times 10^{-6}$ J/m$^2$ | 27.1% | OK (Good) |
| | $1 \times 10^{-3}$ J/m$^2$ | $1 \times 10^{-7}$ J/m$^2$ | 27.2% | OK (Good) |
| | $1 \times 10^{-3}$ J/m$^2$ | $1 \times 10^{-8}$ J/m$^2$ | 27.3% | OK (Good) |

Table 1 demonstrates that the structure in which the azimuthal anchoring energy value of one alignment layer is set to less than $1 \times 10^{-4}$ J/m$^2$ can improve the reflectance, and the structure in which the azimuthal anchoring energy is set to less than $1 \times 10^{-5}$ J/m$^2$ can more improve the reflectance.

REFERENCE SIGNS LIST

1, 1R: liquid crystal display device
1CF: color filter layer
1PX: pixel
1PXB: blue pixel
1PXG: green pixel
1PXR: red pixel
21PX, 21PXB, 21PXG, 21PXR: first sub-pixel
22PX, 22PXB, 22PXG, 22PXR: second sub-pixel
23PX, 23PXB, 23PXG, 23PXR: third sub-pixel
2PX: sub-pixel
10, 20: linearly polarizing plate
11: λ/2 plate
12: λ/4 plate
21: retardation layer
30: backlight
30D: display voltage supplying circuit (display voltage supplying circuit portion)
30M: memory circuit (memory circuit portion)
33, 34: analog switch
33*a*, 34*a*: PMOS transistor
33*b*, 34*b*: NMOS transistor
35, 36, 441, 442: inverter
41, 42, 43, 443: switching element
44: latch
45: liquid crystal cell
100: first substrate
110, 510: insulating substrate
200: first alignment layer
300: liquid crystal layer
310: liquid crystal molecule
400: second alignment layer
500: second substrate
501: gate line
502: source line
503: thin film transistor (TFT)
505: gate electrode
506: source electrode
507: semiconductor layer
508: drain electrode
509: contact hole
520: reflective layer
530: flattening film
531: unevenness control layer
540: common electrode
550: insulating film
560: pixel electrode
CLc: liquid crystal capacity
FRP, XFRP: control pulse
GL: gate line output
Nout: output node
OUT: polarity output
R: reflection region
SIG: data
SL: source line output
T: transmission region
VA: output for white polarity
VB: output for black polarity
Vcom: common output (common potential)
VDD, VSS: power
φV (φV1 to φVm): operation signal

What is claimed is:
1. A reflective liquid crystal display device sequentially comprising:
a first substrate;
a first alignment layer;
a liquid crystal layer containing liquid crystal molecules horizontally aligned with no voltage applied;
a second alignment layer; and
a second substrate including a pixel electrode and a common electrode, the reflective liquid crystal display device further comprising a reflective layer and a linearly polarizing plate, wherein:

the reflective layer is disposed in at least part of a pixel at a position closer to a back surface of the reflective liquid crystal display device than the first alignment layer, the liquid crystal layer, the second alignment layer, the pixel electrode, and the common electrode, the first alignment layer has an azimuthal anchoring energy value of less than $1 \times 10^{-4}$ J/m$^2$, the second alignment layer has an azimuthal anchoring energy value of $1 \times 10'$ J/m$^2$ or more, the pixel includes a reflection region for a reflective display and does not include a transmission region for a transmissive display, the linearly polarizing plate is disposed on a viewing surface side of the first substrate, an angle between a transmission axis azimuth of the linearly polarizing plate and an alignment azimuth of the first alignment layer is 65° or greater and 85° or smaller, and an angle between the transmission axis azimuth of the linearly polarizing plate and an alignment azimuth of the second alignment layer is 65° or greater and 85° or smaller.

2. The reflective liquid crystal display device according to claim 1, wherein the first alignment layer has an azimuthal anchoring energy value of less than $1 \times 10^{-5}$ J/m$^2$.

3. The reflective liquid crystal display device according to claim 1, further comprising a λ/4 plate, wherein an alignment azimuth of the first alignment layer is parallel to an alignment azimuth of the second alignment layer, and the liquid crystal layer has a retardation of 80 nm or greater and 180 nm or smaller in a region superimposed with the reflective layer.

4. The reflective liquid crystal display device according to claim 1, wherein an alignment azimuth of the first alignment layer is parallel to an alignment azimuth of the second alignment layer, and the liquid crystal layer has a retardation of 130 nm or greater and 145 nm or smaller in a region superimposed with the reflective layer.

5. The reflective liquid crystal display device according to claim 1, wherein an alignment azimuth of the first alignment layer is non-parallel to an alignment azimuth of the second alignment layer, and the liquid crystal layer has a retardation of 240 nm or greater and 260 nm or smaller in a region superimposed with the reflective layer.

6. The reflective liquid crystal display device according to claim 1, further comprising a λ/2 plate disposed on a viewing surface side of the first substrate, wherein an angle between a slow axis azimuth of the λ/2 plate and an alignment azimuth of the first alignment layer is 50° or greater and 70° or smaller, and an angle between the slow axis azimuth of the λ/2 plate and an alignment azimuth of the second alignment layer is 50° or greater and 70° or smaller.

7. The reflective liquid crystal display device according to claim 1, further comprising a λ/2 plate disposed between the first substrate and the linearly polarizing plate, wherein an angle between the transmission axis azimuth of the linearly polarizing plate and a slow axis azimuth of the λ/2 plate is 5° or greater and 25° or smaller, an angle between the slow axis azimuth of the λ/2 plate and the alignment azimuth of the first alignment layer is 50° or greater and 70° or smaller, an angle between the slow axis azimuth of the λ/2 plate and the alignment azimuth of the second alignment layer is 50° or greater and 70° or smaller, and the alignment azimuth of the first alignment layer is parallel to the alignment azimuth of the second alignment layer.

8. A reflective liquid crystal display device sequentially comprising:

a first substrate;

a first alignment layer;

a liquid crystal layer containing liquid crystal molecules horizontally aligned with no voltage applied;

a second alignment layer; and a second substrate including a pixel electrode and a common electrode, the reflective liquid crystal display device further comprising a reflective layer, a linearly polarizing plate, and a λ/2 plate, wherein:

the reflective layer is disposed in at least part of a pixel at a position closer to a back surface of the reflective liquid crystal display device than the first alignment layer, the liquid crystal layer, the second alignment layer, the pixel electrode, and the common electrode, the first alignment layer has an azimuthal anchoring energy value of less than $1 \times 10'$ J/m$^2$, the second alignment layer has an azimuthal anchoring energy value of $1 \times 10'$ J/m$^2$ or more the pixel includes a reflection region for a reflective display and does not include a transmission region for a transmissive display, the linearly polarizing plate is disposed on a viewing surface side of the first substrate and the λ/2 plate disposed between the first substrate and the linearly polarizing plate, and an angle between a transmission axis azimuth of the linearly polarizing plate and a slow axis azimuth of the λ/2 plate is 5° or greater and 25° or smaller.

9. The reflective liquid crystal display device according to claim 8, wherein the first alignment layer has an azimuthal anchoring energy value of less than $1 \times 10^{-5}$ J/m$^2$.

10. The reflective liquid crystal display device according to claim 8, further comprising a λ/4 plate, wherein an alignment azimuth of the first alignment layer is parallel to an alignment azimuth of the second alignment layer, and the liquid crystal layer has a retardation of 80 nm or greater and 180 nm or smaller in a region superimposed with the reflective layer.

11. The reflective liquid crystal display device according to claim 8, wherein an alignment azimuth of the first alignment layer is parallel to an alignment azimuth of the second alignment layer, and the liquid crystal layer has a retardation of 130 nm or greater and 145 nm or smaller in a region superimposed with the reflective layer.

12. The reflective liquid crystal display device according to claim 8, wherein an alignment azimuth of the first alignment layer is non-parallel to an alignment azimuth of the second alignment layer, and the liquid crystal layer has a retardation of 240 nm or greater and 260 nm or smaller in a region superimposed with the reflective layer.

13. The reflective liquid crystal display device according to claim 8, wherein the λ/2 plate is disposed on the viewing surface side of the first substrate, an angle between a slow axis azimuth of the λ/2 plate and an alignment azimuth of the first alignment layer is 50° or greater and 70° or smaller, and an angle between the slow axis azimuth of the λ/2 plate and an alignment azimuth of the second alignment layer is 50° or greater and 70° or smaller.

14. The reflective liquid crystal display device according to claim 8, wherein an angle between a transmission axis azimuth of the linearly polarizing plate and an alignment azimuth of the first alignment layer is 65° or greater and 85° or smaller, an angle between the transmission axis azimuth of the linearly polarizing plate and an alignment azimuth of the second alignment layer is 65° or greater and 85° or smaller, an angle between the transmission axis azimuth of the linearly polarizing plate and a slow axis azimuth of the λ/2 plate is 5° or greater and 25° or smaller, an angle between the slow axis azimuth of the λ/2 plate and the alignment azimuth of the first alignment layer is 50° or greater and 70° or smaller, an angle between the slow axis azimuth of the λ/2 plate and the alignment azimuth of the second alignment layer is 50° or greater and 70° or smaller, and the alignment azimuth of the first alignment layer is parallel to the alignment azimuth of the second alignment layer.

15. A transflective liquid crystal display device sequentially comprising:

a first substrate;

a first alignment layer;

a liquid crystal layer containing liquid crystal molecules horizontally aligned with no voltage applied;

a second alignment layer; and a second substrate including a pixel electrode and a common electrode, the transflective liquid crystal display device further comprising a reflective layer disposed in at least part of a pixel at a position closer to a back surface of the transflective liquid crystal display device than the first alignment layer, the liquid crystal layer, the second alignment layer, the pixel electrode, and the common electrode, wherein the pixel has a reflection region with the reflective layer and a transmission region without the reflective layer, the first alignment layer has an azimuthal anchoring energy value of less than 1×10' J/m², the second alignment layer has an azimuthal anchoring energy value of 1×10' J/m² or more, the azimuthal anchoring energy value in the reflection region of the first alignment layer is substantially the same as the azimuthal anchoring energy value in the transmission region of the first alignment layer, and the azimuthal anchoring energy value in the reflection region of the second alignment layer is substantially the same as the azimuthal anchoring energy value in the transmission region of the second alignment layer.

16. The transflective liquid crystal display device according to claim 15, further comprising a linearly polarizing plate disposed on a viewing surface side of the first substrate, wherein an angle between a transmission axis azimuth of the linearly polarizing plate and an alignment azimuth of the first alignment layer is 125° or greater and 145° or smaller, and an angle between the transmission axis azimuth of the linearly polarizing plate and an alignment azimuth of the second alignment layer is 55° or greater and 75° or smaller.

17. The transflective liquid crystal display device according to claim 15, further comprising a linearly polarizing plate disposed on a viewing surface side of the first substrate and a λ/2 plate disposed between the first substrate and the linearly polarizing plate, wherein an angle between a transmission axis azimuth of the linearly polarizing plate and a slow axis azimuth of the λ/2 plate is 5° or greater and 25° or smaller.

18. The transflective liquid crystal display device according to claim 15, further comprising a λ/2 plate disposed on a viewing surface side of the first substrate, wherein an angle between a slow axis azimuth of the λ/2 plate and an alignment azimuth of the first alignment layer is 110° or greater and 130° or smaller, and an angle between the slow axis azimuth of the λ/2 plate and an alignment azimuth of the second alignment layer is 40° or greater and 60° or smaller.

19. The transflective liquid crystal display device according to claim 15, wherein an angle between an alignment azimuth of the first alignment layer and an alignment azimuth of the second alignment layer is 60° or greater and 80° or smaller.

20. The transflective liquid crystal display device according to claim 19, wherein the liquid crystal layer has a retardation of 240 nm or greater and 260 nm or smaller in a region superimposed with the reflective layer.

21. The transflective liquid crystal display device according to claim 15, further comprising a linearly polarizing plate disposed on a viewing surface side of the first substrate and a λ/2 plate disposed between the first substrate and the linearly polarizing plate, wherein an angle between a transmission axis azimuth of the linearly polarizing plate and an alignment azimuth of the first alignment layer is 125° or greater and 145° or smaller, an angle between the transmission axis azimuth of the linearly polarizing plate and an alignment azimuth of the second alignment layer is 55° or greater and 75° or smaller, an angle between the transmission axis azimuth of the linearly polarizing plate and a slow axis azimuth of the λ/2 plate is 5° or greater and 25° or smaller, an angle between the slow axis azimuth of the λ/2 plate and the alignment azimuth of the first alignment layer is 110° or greater and 130° or smaller, an angle between the slow axis azimuth of the λ/2 plate and the alignment azimuth of the second alignment layer is 40° or greater and 60° or smaller, an angle between the alignment azimuth of the first alignment layer and the alignment azimuth of the second alignment layer is 60° or greater and 80° or smaller, and the liquid crystal layer has a retardation of 240 nm or greater and 260 nm or smaller in a region superimposed with the reflective layer.

\* \* \* \* \*